(12) United States Patent  
Churchill

(10) Patent No.: US 9,561,562 B2  
(45) Date of Patent: Feb. 7, 2017

(54) HARDFACED WEARPART USING BRAZING AND ASSOCIATED METHOD AND ASSEMBLY FOR MANUFACTURING

(75) Inventor: Robin Kerry Churchill, Aloha, OR (US)

(73) Assignee: ESCO CORPORATION, Portland, OR (US)

( * ) Notice: Subject to any disclaimer, the term of this patent is extended or adjusted under 35 U.S.C. 154(b) by 993 days.

(21) Appl. No.: 13/440,273

(22) Filed: Apr. 5, 2012

(65) Prior Publication Data

US 2012/0258273 A1 Oct. 11, 2012

Related U.S. Application Data

(60) Provisional application No. 61/472,470, filed on Apr. 6, 2011.

(51) Int. Cl.
*B22D 25/00* (2006.01)
*B23K 31/02* (2006.01)
*B23K 1/00* (2006.01)
*B23K 35/365* (2006.01)
(Continued)

(52) U.S. Cl.
CPC ............... *B23K 31/02* (2013.01); *B23K 1/00* (2013.01); *B23K 1/0008* (2013.01); *B23K 1/20* (2013.01); *B23K 31/025* (2013.01); *B23K 35/365* (2013.01); *C23C 24/103* (2013.01); *B23K 2201/20* (2013.01); *B23K 2203/04* (2013.01);
(Continued)

(58) Field of Classification Search
None
See application file for complete search history.

(56) References Cited

U.S. PATENT DOCUMENTS

| 1,939,991 | A | 12/1933 | Krusellm |
| 1,978,319 | A | 10/1934 | Mowery |
| 2,130,684 | A | 9/1938 | Hintermeyer |

(Continued)

FOREIGN PATENT DOCUMENTS

| AU | 2012240099 | 10/2012 |
| GB | 2041427 | 9/1980 |

(Continued)

OTHER PUBLICATIONS

Huggett, Paul, "Production and Analysis of Alloy Composites Exhibiting Improved Bonding Using a Novel Vacuum Casting Process", University of Technology Sydney, pp. 331, 2008.

(Continued)

*Primary Examiner* — Daniel J Schleis
(74) *Attorney, Agent, or Firm* — John Anderton

(57) ABSTRACT

An article, such as a hardfaced wearpart, includes a substrate, a sheet metal shell connected to the substrate to define a cavity between the surface of the substrate and the shell, and a composite material filling the cavity and forming a coating on at least a portion of the surface of the substrate, the composite material including a hard particulate material infiltrated with a metallic brazing material. The shell may be connected to the substrate by welding or brazing to the substrate, and may wear away during use. The shell and the substrate may be used as part of an assembly for producing the article, where the shell is used as a mold for forming the composite material by filling the shell with the hard particulate material and subsequently infiltrating with the brazing material.

53 Claims, 36 Drawing Sheets

(51) Int. Cl.
*B23K 1/20* (2006.01)
*C23C 24/10* (2006.01)

(52) U.S. Cl.
CPC ....... *Y10T 428/23* (2015.01); *Y10T 428/24917* (2015.01)

(56) References Cited

U.S. PATENT DOCUMENTS

| | | | |
|---|---|---|---|
| 2,260,593 A | 10/1941 | Wittlinger et al. | |
| 2,363,272 A | 11/1944 | Taeyaerts et al. | |
| 2,603,985 A | 7/1952 | Vidmar | |
| 2,714,245 A | 8/1955 | Goetzel | |
| 2,731,711 A | 1/1956 | Lucas | |
| 2,833,638 A | 5/1958 | Owen | |
| 3,149,411 A | 9/1964 | Smiley et al. | |
| 3,168,767 A | 2/1965 | Lutz | |
| 3,175,260 A | 3/1965 | Bridwell et al. | |
| 3,258,817 A | 7/1966 | Smiley | |
| 3,608,170 A | 9/1971 | Larson et al. | |
| 3,777,517 A * | 12/1973 | Shwayder et al. | 70/53 |
| 3,790,353 A | 2/1974 | Jackson et al. | |
| 3,882,594 A | 5/1975 | Jackson et al. | |
| 3,889,093 A * | 6/1975 | Fawcett et al. | 219/77 |
| 3,894,575 A | 7/1975 | Baum | |
| 3,932,952 A | 1/1976 | Helton et al. | |
| 3,955,855 A | 5/1976 | Massieon et al. | |
| 3,972,570 A | 8/1976 | Massieon | |
| 3,977,227 A | 8/1976 | Noble | |
| 4,013,453 A | 3/1977 | Patel | |
| 4,017,480 A | 4/1977 | Baum | |
| 4,024,902 A | 5/1977 | Baum | |
| 4,052,802 A | 10/1977 | Moen et al. | |
| 4,096,002 A | 6/1978 | Ikawa et al. | |
| 4,119,459 A | 10/1978 | Ekemar et al. | |
| 4,136,230 A * | 1/1979 | Patel | 428/564 |
| 4,156,374 A | 5/1979 | Shwayder | |
| 4,187,626 A | 2/1980 | Greer et al. | |
| 4,274,769 A | 6/1981 | Multakh | |
| 4,327,156 A | 4/1982 | Dillon et al. | |
| 4,450,019 A | 5/1984 | Satou et al. | |
| 4,452,325 A | 6/1984 | Radd et al. | |
| 4,499,795 A | 2/1985 | Radtke | |
| 4,526,220 A | 7/1985 | Scherer | |
| 4,529,042 A | 7/1985 | Wetmore | |
| 4,605,157 A | 8/1986 | Barr et al. | |
| 4,608,318 A | 8/1986 | Makrides et al. | |
| 4,638,847 A | 1/1987 | Day | |
| 4,676,124 A | 6/1987 | Fischer | |
| 4,705,123 A | 11/1987 | Dennis | |
| 4,719,076 A | 1/1988 | Geczy et al. | |
| 4,743,137 A | 5/1988 | Bucher et al. | |
| 4,884,477 A | 12/1989 | Smith et al. | |
| 4,916,869 A | 4/1990 | Oliver | |
| 4,923,665 A | 5/1990 | Andersen et al. | |
| 4,933,240 A | 6/1990 | Barber, Jr. | |
| 4,938,991 A | 7/1990 | Bird | |
| 4,944,559 A | 7/1990 | Sionnet et al. | |
| 4,949,598 A | 8/1990 | Griffin | |
| 5,027,878 A | 7/1991 | Revankar et al. | |
| 5,030,519 A | 7/1991 | Scruggs et al. | |
| 5,066,546 A | 11/1991 | Materkowski | |
| 5,090,491 A | 2/1992 | Tibbitts et al. | |
| 5,111,600 A | 5/1992 | Lukavich et al. | |
| 5,113,924 A | 5/1992 | Green et al. | |
| 5,178,647 A | 1/1993 | Komatsu et al. | |
| 5,190,092 A | 3/1993 | Revankar | |
| 5,271,547 A | 12/1993 | Carlson | |
| 5,299,620 A | 4/1994 | Revankar et al. | |
| 5,316,851 A | 5/1994 | Brun et al. | |
| 5,337,801 A | 8/1994 | Materkowski | |
| 5,355,750 A | 10/1994 | Scott et al. | |
| 5,375,350 A | 12/1994 | Maybon | |
| 5,375,759 A | 12/1994 | Hiraishi et al. | |
| 5,441,121 A | 8/1995 | Tibbitts | |
| 5,445,231 A | 8/1995 | Scott et al. | |
| 5,502,905 A | 4/1996 | Cornelius et al. | |
| 5,589,268 A | 12/1996 | Kelley et al. | |
| 5,733,649 A | 3/1998 | Kelley et al. | |
| 5,737,980 A | 4/1998 | Keith et al. | |
| 5,746,281 A | 5/1998 | Hulkkonen | |
| RE35,812 E | 6/1998 | Oliver | |
| 5,765,624 A | 6/1998 | Hathaway et al. | |
| 5,837,069 A | 11/1998 | Deards et al. | |
| 5,880,382 A | 3/1999 | Fang et al. | |
| 6,024,804 A | 2/2000 | Ferra et al. | |
| 6,033,791 A | 3/2000 | Smith et al. | |
| 6,039,641 A | 3/2000 | Sung | |
| 6,073,518 A * | 6/2000 | Chow et al. | 76/108.2 |
| 6,089,123 A | 7/2000 | Chow et al. | |
| 6,220,117 B1 | 4/2001 | Butcher | |
| 6,258,180 B1 | 7/2001 | Wilde et al. | |
| 6,347,676 B1 | 2/2002 | Vuyk, Jr. | |
| 6,470,558 B1 | 10/2002 | Russell et al. | |
| 6,571,493 B2 | 6/2003 | Amano et al. | |
| 6,592,304 B1 | 7/2003 | Kammerer | |
| 6,601,789 B1 | 8/2003 | Bajadali et al. | |
| 6,719,948 B2 | 4/2004 | Lorenz et al. | |
| 6,984,454 B2 | 1/2006 | Majagi | |
| 7,017,677 B2 | 3/2006 | Keshavan et al. | |
| 7,250,069 B2 | 7/2007 | Kembaiyan et al. | |
| 7,261,752 B2 | 8/2007 | Sung | |
| 7,445,294 B2 | 11/2008 | Hall et al. | |
| 7,510,032 B2 | 3/2009 | Kirk et al. | |
| 7,510,034 B2 | 3/2009 | Curry et al. | |
| 7,513,295 B2 | 4/2009 | Poncin et al. | |
| 7,523,794 B2 | 4/2009 | Hall et al. | |
| 7,568,770 B2 | 8/2009 | Hall et al. | |
| 7,597,159 B2 | 10/2009 | Overstreet | |
| 7,673,785 B2 | 3/2010 | Weaver | |
| 7,824,605 B2 | 11/2010 | Lemke et al. | |
| 7,846,381 B2 | 12/2010 | Braga | |
| 7,897,204 B2 | 3/2011 | Usherenko | |
| 8,025,112 B2 | 9/2011 | Mirchandani et al. | |
| 8,136,571 B2 | 3/2012 | Debruin | |
| 8,241,761 B2 | 8/2012 | Garber et al. | |
| 8,800,848 B2 | 8/2014 | Mirchandani et al. | |
| 8,839,887 B2 | 9/2014 | Xia et al. | |
| 9,050,656 B2 | 6/2015 | Glass et al. | |
| 2003/0213861 A1 | 11/2003 | Condon et al. | |
| 2006/0165973 A1 | 7/2006 | Dumm et al. | |
| 2008/0029310 A1 | 2/2008 | Stevens et al. | |
| 2008/0223575 A1 | 9/2008 | Oldham et al. | |
| 2010/0101866 A1 | 4/2010 | Bird | |
| 2010/0143742 A1 | 6/2010 | Tsypine et al. | |
| 2010/0170121 A1 | 7/2010 | Vanderpoorten et al. | |
| 2010/0181116 A1 | 7/2010 | Stauffer | |
| 2010/0187018 A1 | 7/2010 | Choe et al. | |
| 2010/0224418 A1 | 9/2010 | Eason et al. | |
| 2010/0275473 A1 | 11/2010 | Maher | |
| 2012/0258273 A1 | 10/2012 | Churchill | |

FOREIGN PATENT DOCUMENTS

| | | |
|---|---|---|
| JP | 52-009635 | 1/1977 |
| JP | 57-88966 | 6/1982 |
| JP | 57-171563 | 10/1982 |
| JP | 61-190353 | 11/1986 |
| JP | 6-240710 | 8/1994 |
| JP | 2001-248127 | 9/2001 |
| RU | 2220851 | 5/2003 |
| RU | 2228409 | 5/2004 |
| UA | 15945 | 7/2006 |
| WO | WO 02/13996 | 2/2002 |
| WO | WO 2007/059568 | 5/2007 |
| WO | WO 2009/155655 | 12/2009 |

OTHER PUBLICATIONS

Hewett, Catherine, "Declaration in the matter of Australian Patent Application 2012240099 in the name of ESCO Corporation and Opposition thereto", pp. 38., May 12, 2015.

(56) References Cited

OTHER PUBLICATIONS

Hewett, Catherine, "Declaration in the matter of Australian Patent Application 2012240099 in the name of ESCO Corporation and Opposition thereto", pp. 18, Apr. 16, 2015.
Amended Statement of Opposition submitted by Caterpillar Inc. in the matter of Australian Patent Application 2012240099 in the name of ESCO Corporation and Opposition thereto.
"Patent Applicants Outline of Submissions in the matter of Australian Patent Application 2012240099 in the name of ESCO Corporation and Opposition thereto", pp. 29, Mar. 4, 2.
"Patent Applicants Supplementary Submissions in the matter of Australian Patent Application 2012240099 in the name of ESCO Corporation and Opposition thereto", pp. 29, Mar. 1.
Anderson, Rory "Declaration in the matter of Australian Patent Application 2012240099 in the name of ESCO Corporation and Opposition thereto", pp. 34, Oct. 14, 2015.
Ductile Iron Society, "Ductile Iron Data for Design Engineers (Section V)—Alloy ductile irons", pp. 1-18, Jan. 1990, http://www.ductile.org/didata/pdf/data5.pdf.
Hewett, Catherine, "[3rd] Declaration in the matter of Australian Patent Application 2012240099 in the name of ESCO Corporation and Opposition thereto", pp. 22, Oct. 9, 2015.
Huggett, Paul, "[1st] Declaration in the matter of Australian Patent Application 2012240099 in the name of ESCO Corporation and Opposition thereto", pp. 1-9, Aug. 4, 2015.
Huggett, Paul, "[2nd] Declaration in the matter of Australian Patent Application 2012240099 in the name of ESCO Corporation and Opposition thereto", pp. 1-9, Aug. 11, 2015.
Huggett, Paul, "[3rd] Declaration in the matter of Australian Patent Application 2012240099 in the name of ESCO Corporation and Opposition thereto", pp. 1-4, Aug. 13, 2015.
Robert Covert, et al., Nickel Institute, "Properties and Applications of Ni-Resist and Ductile Ni-Resist Alloys", pp. 1-40, (1998); https://www.nickelinstitute.org/~/Media/File.
"Decision by Australian Patent Office", in the matter of Australian Patent Application 2012240099 in the name of ESCO Corporation and Opposition thereto, pp. 31, May 23, 2016.
Dcirovi, "Filler metal", Mar. 12, 2011, Wikipedia—the Free Encyclopedia available at: https://en.wikipedia.org/w/index.php?title=Filler_metal&oldid=418532176.

* cited by examiner

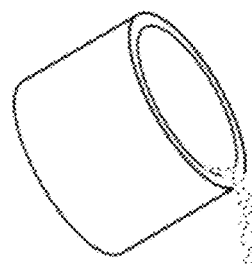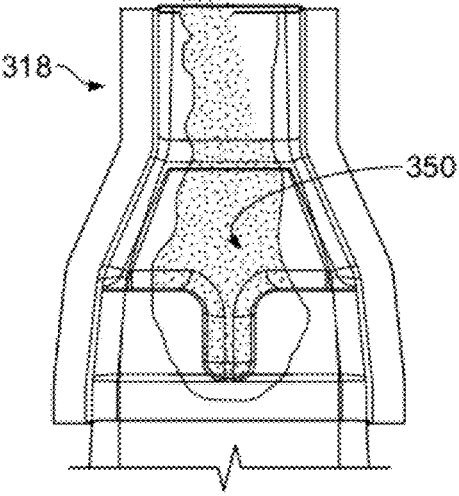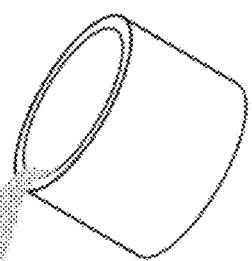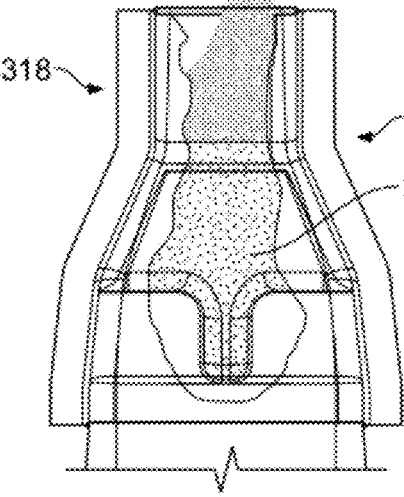
FIG. 25E    FIG. 25F
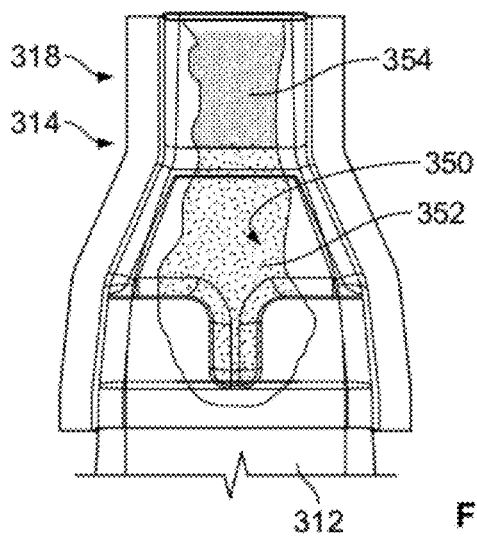
FIG. 25G

HARDFACED WEARPART USING BRAZING AND ASSOCIATED METHOD AND ASSEMBLY FOR MANUFACTURING

CROSS-REFERENCE TO RELATED APPLICATION

The present application claims priority to U.S. Provisional Application No. 61/472,470, filed Apr. 6, 2011, which application is incorporated by reference herein in its entirety and made part hereof.

TECHNICAL FIELD OF THE DISCLOSURE

This disclosure relates to various embodiments of a hardfaced part for use in abrasive environments formed using infiltration brazing or another brazing technique. More particularly, the disclosure relates to products, systems and methods that pertain to such hardfaced parts. For example, such hardfaced parts can include wear-resistant tools used for ground-engaging machinery (e.g., a point for an excavator), mineral processing equipment such as a tip for a dual roll crusher, trommel screens, or other abrasive applications.

BACKGROUND

Examples of wear parts produced by infiltration of hard particles are disclosed in U.S. Pat. Nos. 4,884,477, 4,949,598, and 6,073,518, and in the publications US20100278604, GB2041427, and WO2008103688. Older publications more generally describing manufacturing cemented carbides by an infiltration process include U.S. Pat. No. 1,512,191 and DE420689C (Schröter, 1925, Deutsches Reich). The disclosures of these and all other publications referenced herein are incorporated by reference in their entirety for all purposes. The present invention seeks to overcome certain limitations of these devices and other existing devices, and to provide new features not heretofore available.

BRIEF SUMMARY

Economical and effective hardfaced wearparts are provided, formed from a substrate, a thin shell, hard particles held within a cavity defined between the substrate and the shell, and infiltration brazing material that binds these elements into a composite wearpart. The thin metal shell is expendable, because it typically erodes quickly during use of these hardfaced wearparts. Methods for making such wearparts using infiltration brazing and expendable thin shells also are provided.

Aspects of the invention relate to a hardfaced wear part that includes a steel substrate, a steel shell joined to the substrate to define a cavity between the substrate and the shell, and a hard composite filling the cavity, the composite including hardened particles infiltrated with metal brazing. This hardfaced wear part preferably is one where the shell weighs substantially less than the substrate. Furthermore, the shell preferably defines a reservoir outside of the cavity, and more specifically, a flared reservoir outside of the cavity. In some embodiments, the shell defines a funnel-shaped reservoir outside of the cavity. In some of the embodiments, this shell is welded to the substrate.

Aspects of the invention also relate to an article, such as a hardfaced wearpart, that includes a substrate, a sheet metal shell connected to the substrate to define a cavity between the surface of the substrate and the shell, and a composite material filling the cavity and forming a coating on at least a portion of the surface of the substrate, the composite material including a hard particulate material infiltrated with a metallic brazing material.

According to one aspect, the shell has an opening to provide access to the cavity to facilitate the insertion of the hardfacing material and the feeding in of the brazing material. The shell may also include a reservoir connected to the shell and positioned outside the cavity in communication with the opening to initially hold the brazing material during manufacture.

According to another aspect, the shell may be connected to the surface of the substrate by welding or brazing. The shell may further include a conformal band in surface-to-surface contact with a portion of the surface of the substrate around an entire periphery of the shell, such that the shell is connected to the substrate by welding or brazing at least at the conformal band. In this configuration, the substrate may have a bonding surface in surface-to-surface contact with the conformal band, and at least a portion of the substrate within the cavity may be inset with respect to the bonding surface, such that the composite material has an outer surface that is flush with the bonding surface.

According to a further aspect, the brazing material may be bonded to the surface of the substrate, and may further be bonded to the shell as well.

According to yet another aspect, the shell may include a front piece having a front flange extending transversely from a back edge of the front piece and a back piece having a back flange extending transversely from a front edge of the back piece, where the front piece and the back piece are joined together to form the shell by welding or brazing the front flange to the back flange.

According to an additional aspect, the particulate material may be or include tungsten carbide, and the metallic brazing material may be or include Ni—Cr—Si—B brazing alloy powder.

According to a still further aspect, the substrate may have a hole in the surface, and an insert rod may be received in the hole, such that the hole is covered by the composite material.

Additional aspects of the invention relate to a tool having a surface at a point of the tool and a bonding surface located proximate the surface, a composite hardfacing material forming a coating on at least a portion of the surface, and a sheet metal shell in contact with the composite material and surrounding the composite material. The composite hardfacing material includes a hard particulate material infiltrated with a metallic brazing material, where the metallic brazing material is bonded to the surface to connect the composite hardfacing material to the tool. The shell has a conformal band in contact with the bonding surface of the tool, and the shell is connected to the tool by welding or brazing at least between the conformal band and the bonding surface. A cavity is defined between the surface of the substrate and the shell, and the composite hardfacing material fills the shell.

Other aspects of the invention relate to a composite wear-resistant tool, comprising a steel shell that defines a cavity, a steel substrate partially filling the cavity to define a void between the shell and the substrate, and a hard composite at least partially filling the void and including hardened particles infiltrated with metal brazing.

Other aspects of the invention relate to a hardfaced wear part comprising a steel shell that defines a cavity, a steel substrate only partially filling the cavity, and a hard composite in close contact with both the shell and the substrate to define a hard layer protecting the substrate from wear, the composite including hardened particles infiltrated with metal brazing.

Still other aspects of the invention relate to a hardfaced wear part for earth-moving equipment, comprising a steel substrate, a steel shell generally conforming to at least a portion of the surface of the substrate, defining a cavity between the surface and the shell, and a hard composite at least partially filling the cavity and bonding to both the substrate and the shell, the composite including hardened particles infiltrated with metal brazing. Preferably, the shell has an average shell thickness, the substrate has an average substrate thickness, and the average shell thickness is substantially less than the average substrate thickness.

Further aspects of the invention relate to a composite wear resistant tool comprising a thin metal shell defining an outer perimeter for a hard composite, a thick metal substrate defining a primary body for a tool, the substrate at least partially surrounded by the shell, and a layer of hard particulate material infiltrated with a brazing alloy defining a hard composite bonded to both the shell and the substrate;

Still further aspects of the invention relate to an article that includes a substrate, a metal shell connected to the substrate to define a cavity between the surface of the substrate and the shell, a hard material positioned within the cavity, and a metallic brazing material bonding the hard material to the surface of the substrate. As described above, the hard material and the metallic brazing material may form a composite hardfacing material covering the surface of the substrate. In one configuration, the hard material may have a porous structure, such as a particulate material or a porous preform, that is infiltrated by the metallic brazing material to form the composite hardfacing material. In another configuration, the hard material may have a monolithic structure.

Aspects of the invention also relate to a method for use with a substrate, including connecting a sheet metal shell to the surface of the substrate to define a cavity between the shell and the surface, placing a hard particulate material within the cavity, in close proximity to the surface, placing a metallic brazing material in communication with the cavity, heating the brazing material to a temperature above a melting point of the brazing material and holding the temperature for a time sufficient for the brazing material to infiltrate the particulate material in molten form and contact the surface of the substrate, and cooling the brazing material to solidify the brazing material and form a wear resistant composite coating on the surface of the substrate. The brazing material may be bonded to the surface and/or the shell after the brazing material is solidified.

According to one aspect, the shell has an opening to an exterior of the shell and a flared reservoir is connected to the shell and positioned outside the cavity in communication with the opening, and the brazing material is placed within the reservoir to be in communication with the cavity. The reservoir may be integrally formed with the shell.

According to another aspect, connecting the shell to the substrate includes welding or brazing the shell to the surface of the substrate. The shell may further include a conformal band extending around a periphery of the shell. In this configuration, connecting the shell to the substrate may include welding or brazing the conformal band to the surface of the substrate, such that the conformal band is in surface-to-surface contact with a portion of the surface of the substrate around the entire conformal band.

According to a further aspect, the shell includes a front piece having a front flange extending transversely from a back edge of the front piece and a back piece having a back flange extending transversely from a front edge of the back piece. The method may further include joining the front piece and the back piece together to form the shell by welding or brazing the front flange to the back flange.

According to yet another aspect, the brazing material is heated to a temperature sufficient to melt the brazing material, for sufficient time to allow the brazing material to infiltrate the spaces between the hard particles, bonding them together and to the substrate. For example, if using tungsten monocarbide (WC) hard particles and pure copper or AWS BNi-2, the brazing material may be heated to a temperature of approximately 2050° F. for 30 minutes to 1 hour in many applications. This heating may be done in a vacuum furnace in one configuration.

According to an additional aspect, the method also includes forming the shell, such as by welding or brazing pieces of sheet metal together to form the shell. Other techniques may additionally or alternately be used.

Other aspects of the invention relate to a method for producing a composite wear-resistant tool that includes the step of infiltrating a layer of hard particles confined between a substrate and an expendable sheet-metal shell. The shell may be constructed such that it confines the hard particles to desired locations on the substrate, with specific thicknesses and shapes defined by contours of both the substrate and the shell. The shell may also be constructed such that it defines a reservoir for containing infiltrating material which will be melted during the step of infiltrating. Almost any type of tool or component that is hardfaced now by welding could be hardfaced by the disclosed methods. These methods may include a step where the particulate material is selected with a type and size distribution so as to give the desired degree of wear resistance for the intended application. These methods may include a step where the particulate material and its size distribution, as well as the type of infiltrating material employed are selected so as to give a desired degree of wear resistance for an intended application, while at the same time accommodating the thermal and transformation expansion differences between the infiltrated layer and the substrate so as to minimize or eliminate cracking and spelling.

Other aspects of the invention relate to a method of hardfacing metal parts to produce wear-resistant composite products that involves surrounding the part or a portion of the part to be hardfaced with a sheet metal shell, leaving a cavity, welding or high-temperature brazing the shell to the substrate so that the cavity will retain molten metal when heated, at least partially filling the cavity with granular or powdered particles of a wear-resisting material, and then infiltrating the particles with a suitable low-melting material to bond the particles to each other and to the substrate by heating. More specific embodiments of a method include providing a reservoir that is integral to the shell, placing a brazing alloy in the reservoir, heating a combined assembly of substrate, shell, particles of wear-resisting material, reservoir and brazing alloy so that the brazing alloy melts and flows into interstices within the particles of wear-resisting material, and cooling the assembly so that the substrate, the shell, the particles of wear-resisting material, and the brazing alloy are bonded together to form a composite wear-resistant wearpart.

Other aspects of the invention relate to a method that includes connecting a metal shell to a surface of a substrate to define a cavity between the shell and the surface, placing a hard material within the cavity, placing a metallic brazing material in communication with the cavity, heating the brazing material to a temperature above a melting point of the brazing material and holding the temperature for a time sufficient for the brazing material to contact the hard material and the surface of the substrate in molten form, and then cooling the brazing material to solidify the brazing material and bond the hard material to the surface of the substrate. As described above, the shell may be formed of sheet metal. As also described above, the hard material may be infiltrated by the molten brazing material to form a wear resistant composite material.

Aspects of the invention also relate to an assembly that includes a tool having an surface configured for engaging earth to move the earth, and a sheet metal shell connected to the tool and having a conformal band conforming to at least a portion of the surface to define a cavity between the surface and the shell. The shell may further have an opening to an exterior of the shell. The shell is connected to the tool by welding or brazing the conformal band to the at least a portion of the surface.

According to one aspect, the assembly is configured for forming a wear resistant composite coating on the surface by at least partially filling the cavity through the opening with a hard particulate material, placing a metallic brazing material in communication with the cavity, heating the assembly to a temperature above a melting point of the brazing material and holding the temperature for a time sufficient for the brazing material to infiltrate the particulate material in molten form and contact the surface of the tool, and cooling the assembly to solidify the matrix material and form the wear resistant composite coating on the surface. The assembly may also include a flared reservoir connected to the shell and positioned outside the cavity in communication with the opening, where the reservoir is configured to have the brazing material placed therein to be in communication with the cavity. After this process, the assembly may include the composite material filling (or partially filling) the cavity and forming a coating on at least a portion of the surface of the tool, where the composite material includes a hard particulate material infiltrated with a metallic brazing material. The brazing material may be bonded to the surface and/or the shell.

According to another aspect the assembly also includes a flared reservoir connected to the shell and positioned outside the cavity in communication with the opening. The flared reservoir may be integrally formed with the shell.

According to a further aspect, the conformal band extends around an entire periphery of the shell and around an entire periphery of the surface.

According to yet another aspect, the shell may include a front piece having a front flange extending transversely from a back edge of the front piece and a back piece having a back flange extending transversely from a front edge of the back piece, where the front piece and the back piece are joined together to form the shell by welding or brazing the front flange to the back flange.

According to an additional aspect, the tool has a hole in the surface, and the assembly further includes an insert rod received in the hole. In this configuration, spaces may be defined between the insert rod and an interior wall of the hole.

Still further aspects of the invention relate to an assembly that includes a tool having an operating surface, a sheet metal shell covering at least a portion of the operating surface and defining a cavity between the shell and the operating surface, and a plurality of spacers engaging the tool and the shell and separating the tool from the shell. The shell has an opening to an exterior of the shell.

According to one aspect, the assembly is configured for forming a wear resistant composite coating on the operating surface by at least partially filling the cavity with a hard particulate material, placing a metallic brazing material in communication with the cavity, heating the assembly to a temperature above a melting point of the brazing material and holding the temperature for a time sufficient for the brazing material to infiltrate the particulate material in molten form and contact the operating surface of the tool, and cooling the assembly to solidify the matrix material and form the wear resistant composite coating on the operating surface. After this process, the assembly may include a composite material at least partially filling the cavity and forming a coating on at least a portion of the operating surface of the tool, the composite material comprising a hard particulate material infiltrated with a metallic brazing material, wherein the brazing material is bonded to the operating surface.

According to another aspect, the assembly may also include a wall extending from the shell and defining a reservoir connected to the shell and positioned outside the cavity in communication with the opening, where the reservoir is configured to have the brazing material placed therein to be in communication with the cavity.

Still further aspects of the invention relate to an assembly that may be usable for forming a hardfacing material on the surface of a tool or other substrate. A metal shell is connected to the substrate and has a conformal band conforming to at least a portion of the surface of the substrate to define a cavity between the surface and the shell. The shell further has an opening to an exterior of the shell. The shell may be formed of sheet metal in one configuration, and may be welded or brazed to the substrate, as mentioned above.

Advantages of the present disclosure will be more readily understood after considering the drawings and the Detailed Description.

DETAILED DESCRIPTION

Figure 1:
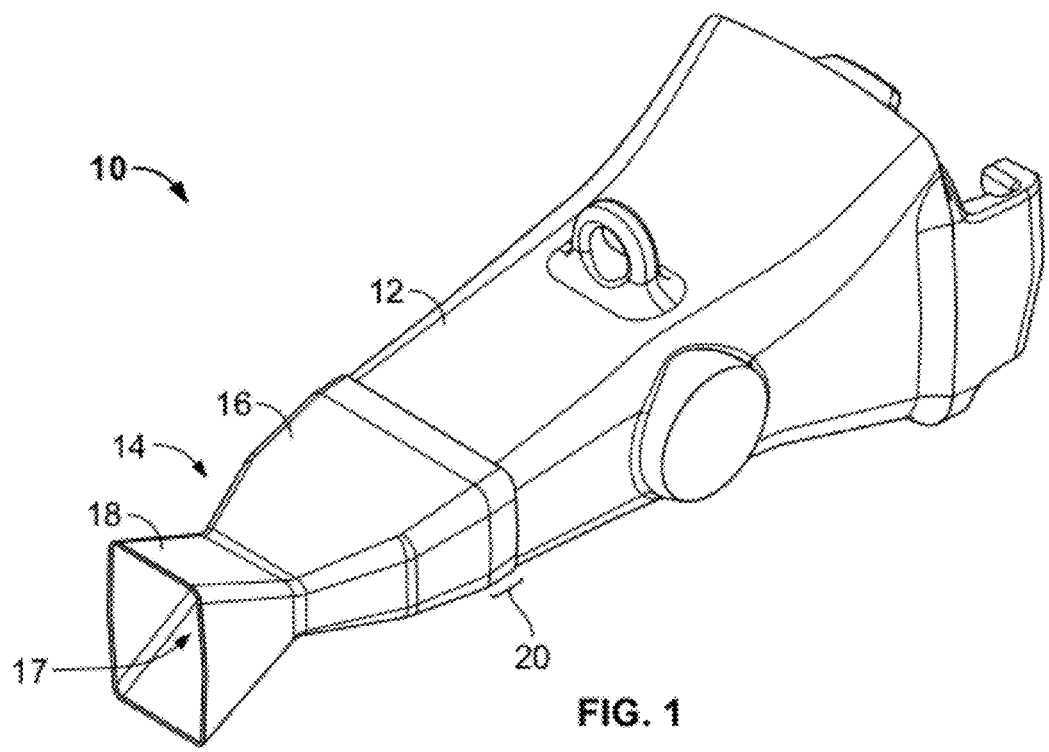
FIGS. 1-4 are perspective views of one embodiment of wearpart with an attached shell.
Figure 2:
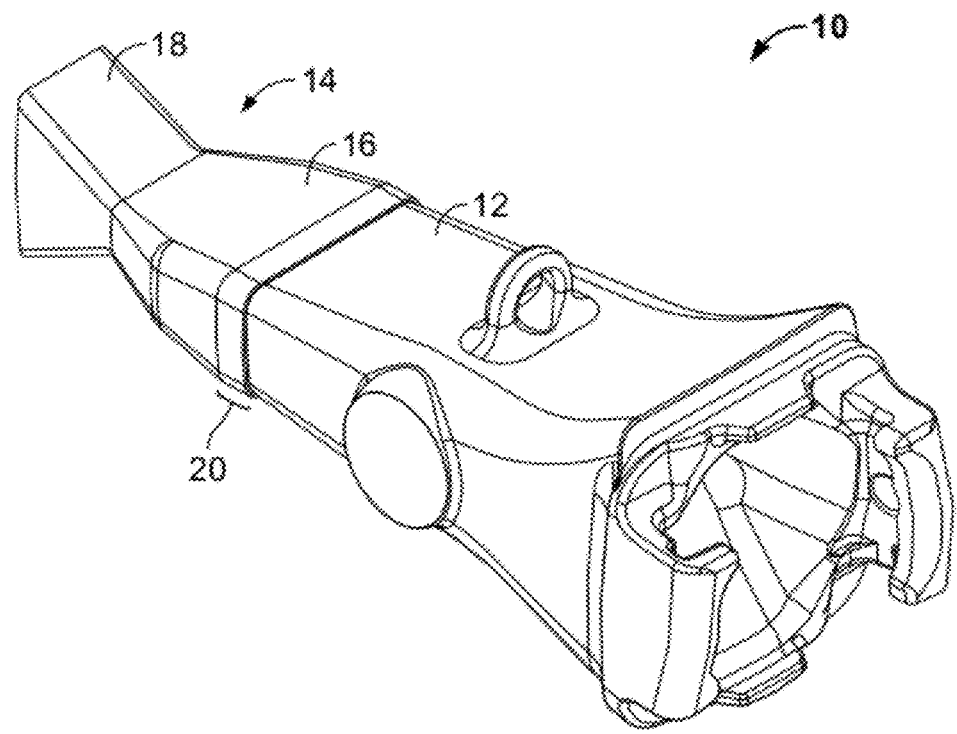
Figure 3:
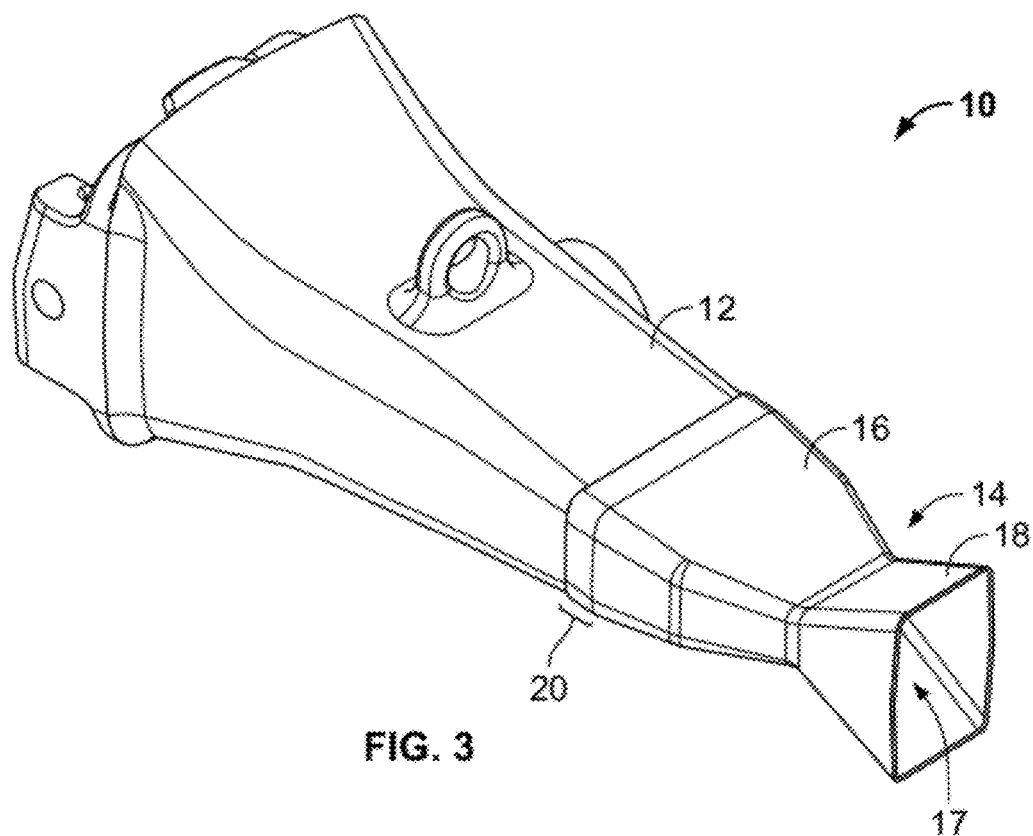
Figure 4:
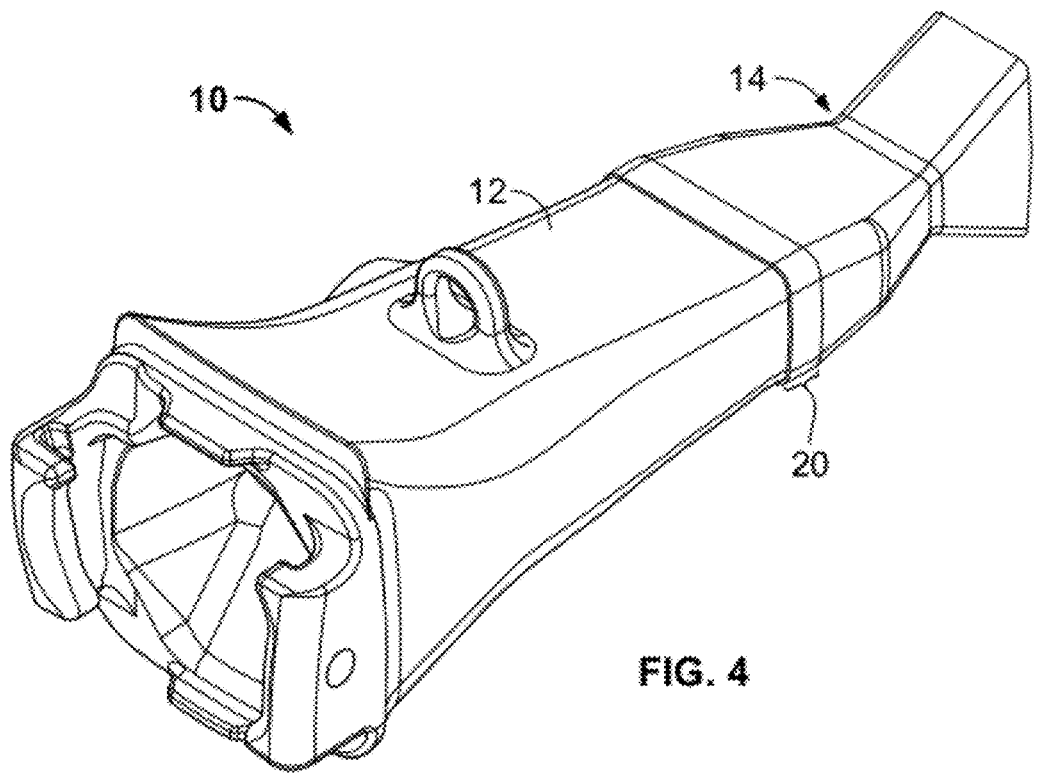
Figure 5:
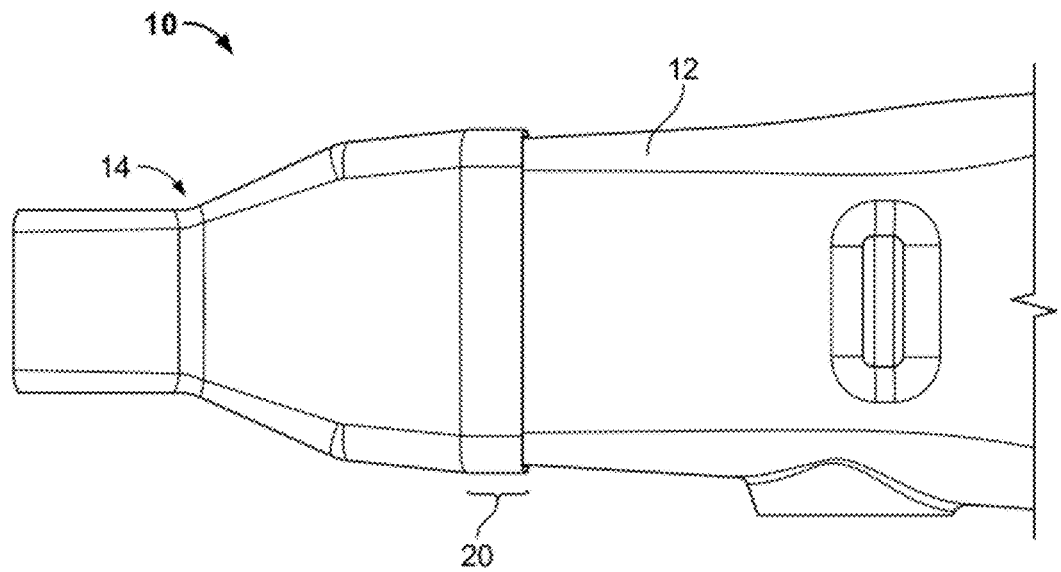
FIG. 5 is a top plan view of the embodiment of a wearpart with an attached shell, as shown in FIGS. 1-4.
Figure 6:
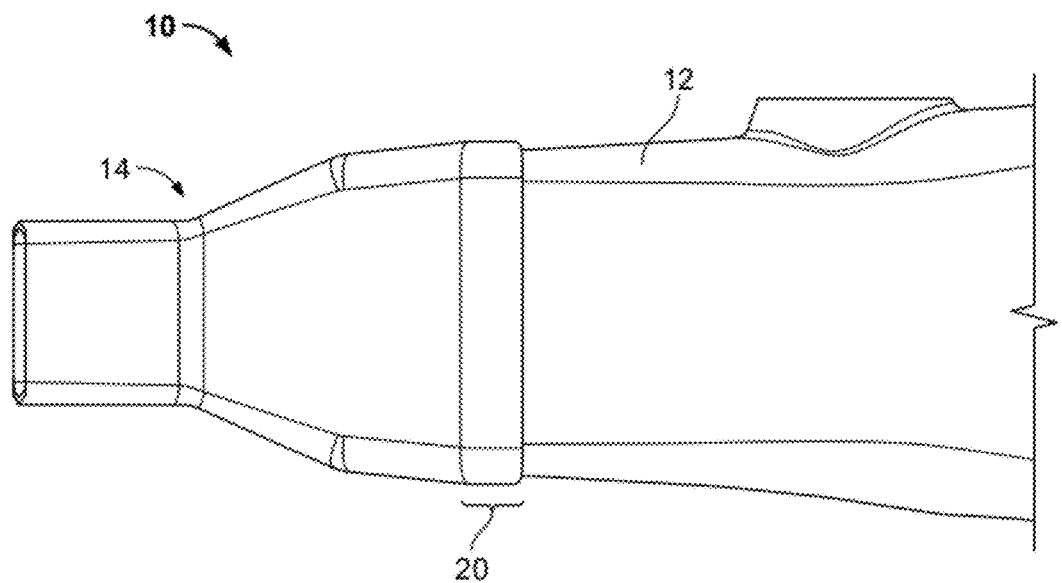
FIG. 6 is a bottom plan view of the embodiment of a wearpart with an attached shell, as shown in FIGS. 1-5.
Figure 7:
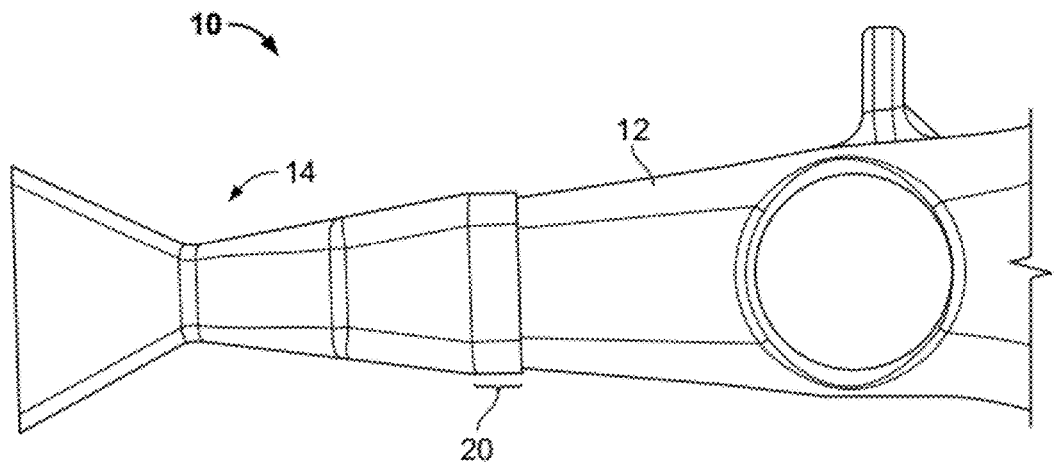
FIG. 7 is a left side elevation of the embodiment of a wearpart with an attached shell, as shown in FIGS. 1-6.
Figure 8:
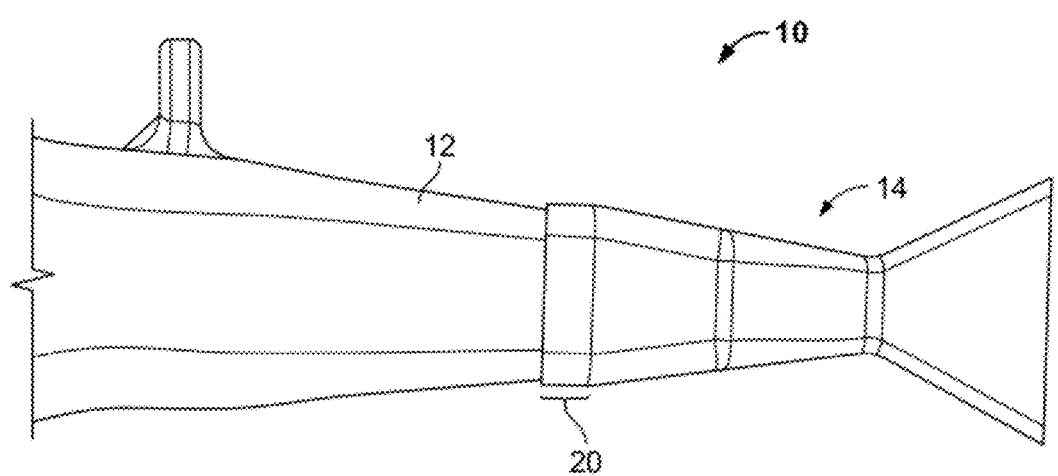
FIG. 8 is a right side elevation of the embodiment of a wearpart with an attached shell, as shown in FIGS. 1-7.

While this invention is susceptible of embodiment in many different forms, there are shown in the drawings, and will herein be described in detail, preferred embodiments of the invention with the understanding that the present disclosure is to be considered as an exemplification of the principles of the invention and is not intended to limit the broad aspects of the invention to the embodiments illustrated and described.

In general, the disclosure relates to the use of a metal shell in forming a composite material or other wear resistant material on the surface of a substrate, such as a wearpart, using brazing and/or infiltration techniques, as well as articles formed using such techniques and methods and equipment incorporating such techniques. For example, an article (e.g. a hardfaced wearpart) formed using such techniques may include a substrate, a sheet metal shell connected to the substrate to define a cavity between the surface of the substrate and the shell, and a composite material filling (or partially filling) the cavity and forming a coating on at least a portion of the surface of the substrate, the composite material including a hard particulate material infiltrated with a metallic brazing material. In a more general example, an article formed using such techniques may include a substrate, a metal shell connected to the substrate to define a cavity between the surface of the substrate and the shell, a hard and/or wear resistant material positioned within the cavity, and a metallic brazing material bonding the hard material to the surface of the substrate.

One embodiment of an article in the form of a hardfaced wearpart 10 is shown in FIGS. 1-9 in the form of a mining point. Unless otherwise specified, a hardfaced wearpart may contain at least one of the structure, components, functionality, and/or variations described, illustrated, and/or incorporated herein. Two basic components of hardfaced wearpart 10 include a primary tool, forming a structural component 12, or more generally a substrate 12, and an outer expendable metal shell 14 forming a mold for hardfacing material. Preferably, substrate 12 is made of metal, such as a steel alloy as is known in the art for ground-engaging tools, and shell 14 is made of sheet metal, such as low-carbon "mild" steel. The sheet metal of shell 14 may be made of any material capable of being formed or fabricated to a particular desired shape and capable of withstanding dissolution, melting, or undue weakening by the infiltrating material, or generally by the temperatures required for infiltration brazing, during the infiltrating process. A variety of other parts and structures may be used to form the substrate 12 and produce the hardfaced wearpart 10 having the hardfacing material thereon. Examples of such parts and structures include other types of points, shrouds, or runners; teeth for buckets or dredge cutter heads; blades for graders, scrapers, etc.; wear liners for various applications such as for chutes or truck bodies; earth engaging equipment used, e.g., in mining, construction, or drilling; parts for mineral processing equipment such as a tip for a dual roll crusher or a trammel screen; and nearly any other desired parts and structures. The invention may also be used to renew worn parts; the worn parts may be wear parts such as a ground engaging tool or a supporting structure such as a lip of a bucket.

Hardfacing material bonds to and protects substrate 12, but this hardfacing material is not readily visible in FIGS. 1-8, because the hardfacing material is enclosed by shell 14. In general, the hardfacing material includes a hard material and a metallic brazing material bonding the hard material to the substrate 12. The hard material generally has a higher hardness than the surface of the substrate 12 that is hardfaced. The hard material may also have greater wear resistance than the surface of the substrate 12. As discussed in more detail below, the hardfacing material may be a composite formed from a hard material in the form of hard particles, typically available in particulate (e.g. granular or powdered) form such as tungsten carbide particles, infiltrated with an infusing metallic brazing material typically available in granular or powdered form such as a copper-base or nickel-base brazing alloy. It is understood that "metallic" materials may include pure metals, as well as alloys and other materials including one or more metals. In another embodiment, the hard material may be in the form of a porous material, which includes particulate material, porous preforms (e.g. sintered preforms), or other porous structure that can be infiltrated by the brazing material. Preferably, such a porous material may have a porosity of 5-50%, but may have a different porosity in other embodiments. In a further embodiment, the hard material may be a solid, monolithic structure (or multiple structures), such as a tile, plate, or other monolithic structure that is bonded to the surface of the substrate 12 by the brazing material. In each of these embodiments, the shell 14 is used to hold the hard material in a cavity 50 defined between the shell 14 and the outer surface of the substrate 12, in position for brazing, such as in close proximity to the surface of the substrate 12.

Shell 14 includes a shell body 16, with an opening 17 to the exterior of the shell body 16 and the cavity 50 defined by the shell body 16, as well as a reservoir 18 in communication with the opening 17. In one embodiment, the reservoir 18 may be integrally formed with the shell body 16, or the reservoir 18 may be formed separately and joined to the shell body 16 in another embodiment. Reservoir 18 is only used during fabrication of wearpart 10, and may be removed (e.g. cut off) or simply allowed to erode away during operational use of wearpart 10, as discussed in more detail below. Shell 14 is joined to substrate 12 by a conformal band 20, by which shell 14 may be welded to substrate 12. The conformal band 20 may be in surface-to-surface contact with a portion of the substrate 12 around part or all of the periphery of the shell and the substrate, as discussed below. Alternatively, shell 14 may be brazed to substrate 12, provided that any brazing material used to braze shell 14 to substrate 12 has a melting temperature that is higher than a melting temperature for the infusing brazing material. In further embodiments, the shell may be connected to the substrate 12 in another manner. For example, the shell may be placed over the substrate 12 using a gasket of ceramic felt or cloth to seal the cavity and prevent leaking of the brazing material during brazing.

Figure 9:
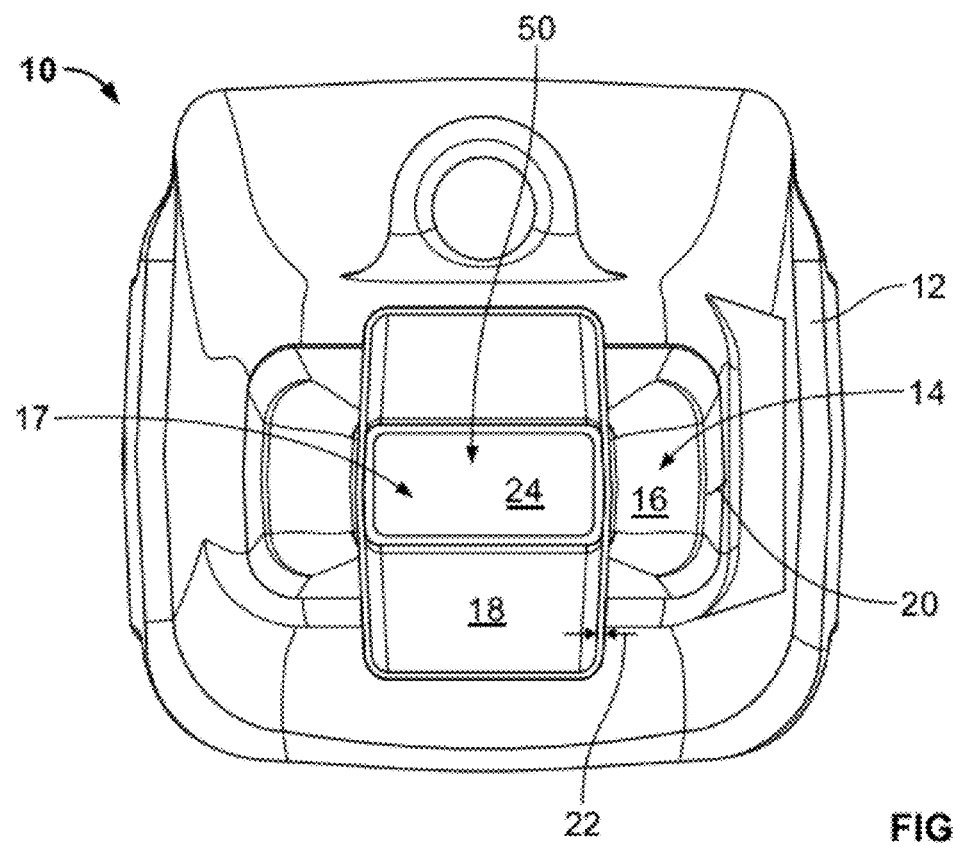
FIG. 9 is a front elevation of the embodiment of a wearpart with an attached shell, as shown in FIGS. 1-8, with hardfacing material visible inside the shell, protecting a substrate.

FIG. 9 most clearly shows an example embodiment where that shell 14 has a shell thickness 22 that is substantially less than a nominal thickness of substrate 12. For example, shell 14 may have an average shell thickness of approximately 0.105 in., whereas substrate 12 in FIGS. 1-9 may have a thickness ranging from 1.000 to 3.450 in. in the region covered by the shell. In one embodiment, the shell 14 may be made of sheet metal in the range of 16 Ga (0.060 in. thick) to 10 Ga (0.135 in. thick), which may be useful for a wide range of applications. In other embodiments, the shell 14 may have any other suitable thickness. For example, in further embodiments, the shell 14 may be made of a steel or other metallic plate having a thickness of approximately 0.25 inches, or may be cast, machined from bar stock, or formed in a different manner. It is understood that different portions of the shell 14 may have different thicknesses. Also visible in FIG. 9 is a layer of composite hardfacing material, indicated generally at 24.

The relative thinness of shell 14 when compared to substrate 12 means that shell 14 may be formed easily, relatively inexpensively. For simple shapes of a shell, a relatively low-cost shell 14 may be made by cutting pieces of sheet metal, and welding or brazing those pieces together. Slightly more complicated shapes may be made by bending pieces of sheet metal in particular configurations, and then welding the bent sheet metal pieces together. Complex shapes can be made by sheet metal forming processes such as deep drawing, forming by the Guerin process (rubber pad forming), hydroforming, and/or explosive forming. Precision ('lost wax") casting could be used as well, although the cost of the lost wax process would often be uneconomical. For particularly complicated shapes, pieces of the shell could be formed by one or more of these processes, and then joined by welding or brazing.

Very little material is required to form an effective mold, even for relatively large substrates. For example, in the case of mining point 10, the weight of shell 14 would be only about 4½ pounds whereas the weight of the substrate 12 would be 224 pounds. This particular weight of a mining point and shell is merely one example, for one particular sized point. Large variations are possible as to the size of different points in use for different operations. However, all of the embodiments disclosed herein include a substrate and shell, in which the shell weighs substantially less than the substrate.

The shell is expendable, performing no structural function in the finished product and usually wearing away quickly during use of the resulting hardfaced wearpart. Accordingly, the particular metal used to form shell 14 need only be strong enough and sufficiently resistant to dissolution to survive the high temperatures of infiltration brazing. Many readily available, relatively low-cost sheet steels will meet this standard. The combination of a minimal amount of material, for example less than 5-pounds of sheet steel for a 224-pound substrate, the use of readily available sheet steel, and the use of relatively easy fabrication techniques to make thin metal shell 14 means that the cost of shell 14 is often minimal, when compared to a market value of the resulting hardfaced wearpart 10.

In many applications, the tool substrate can be quite large and heavy, and the tool substrate is often transported or handled with the substrate in a particular orientation relative to gravity. For example, a very heavy substrate may be held securely on a skip or in a fixture, with a region to be hardfaced facing upward. Other substrates may be supported by a base or specific surface, with a region to be hardfaced facing upward, sideways, or downward. Yet other substrates may have multiple separate regions to be hardfaced, facing in multiple different orientations.

The light sheet metal shell of the present disclosure may be readily moved for precise alignment on a substrate, and then welded to the substrate, regardless of most orientations of the substrate. The thin metal shell is easy to attach reliably to the underlying substrate by welding or high temperature brazing, without the need for clamping or fixtures, and the joint created is fluid-tight even at the high temperatures required for infiltration brazing. In any type of infiltration hardfacing involving molds, the molten metal brazing material should remain inside the mold. With the thin metal shells of the present disclosure, reliable attachment to a substrate is achieved without extra clamping or fixtures. The resulting assembly is therefore more easily placed in a furnace for infiltration brazing, allowing substantially greater ease of infiltration hardfacing heavy items.

Furthermore, the thin metal shell that defines the mold for the infiltration hardfacing may be assembled reliably from multiple parts, and with side-ways-facing opening and/or downward-facing openings that are later sealed by the underlying substrate in combination with welding or high temperature brazing. This is very different from conventional graphite or ceramic molds for infiltration brazing, which are more difficult to seal to an underlying substrate, typically requiring extensive overlapping surfaces as shown in U.S. Pat. No. 4,933,240. Even if such conventional graphite or ceramic molds are sealed to a substrate at room temperature, such seals may be likely to fail at the high temperatures needed for infiltration brazing, particularly if the substrate and the mold have different coefficients of thermal expansion. Accordingly, conventional graphite or ceramic molds often are made with upward-facing openings, into which the substrate must be placed. This means that the substrate in such prior art molds must be supported by the mold, or suspended by jigs or framework over the mold.

Supporting a heavy substrate from a mold may be difficult, and may require substrate-to-mold contact in locations that would be better coated with hard facing material. The use of jigs and framework can create an even heavier and larger assembly, making it more difficult to put the combination of a mold and substrate into a furnace. The thin metal shell of the present disclosure does not need to support the substrate, allowing numerous embodiments, with various alternative orientations of substrate and mold, and even multiple different orientations of molds on a single substrate.

Figure 10:
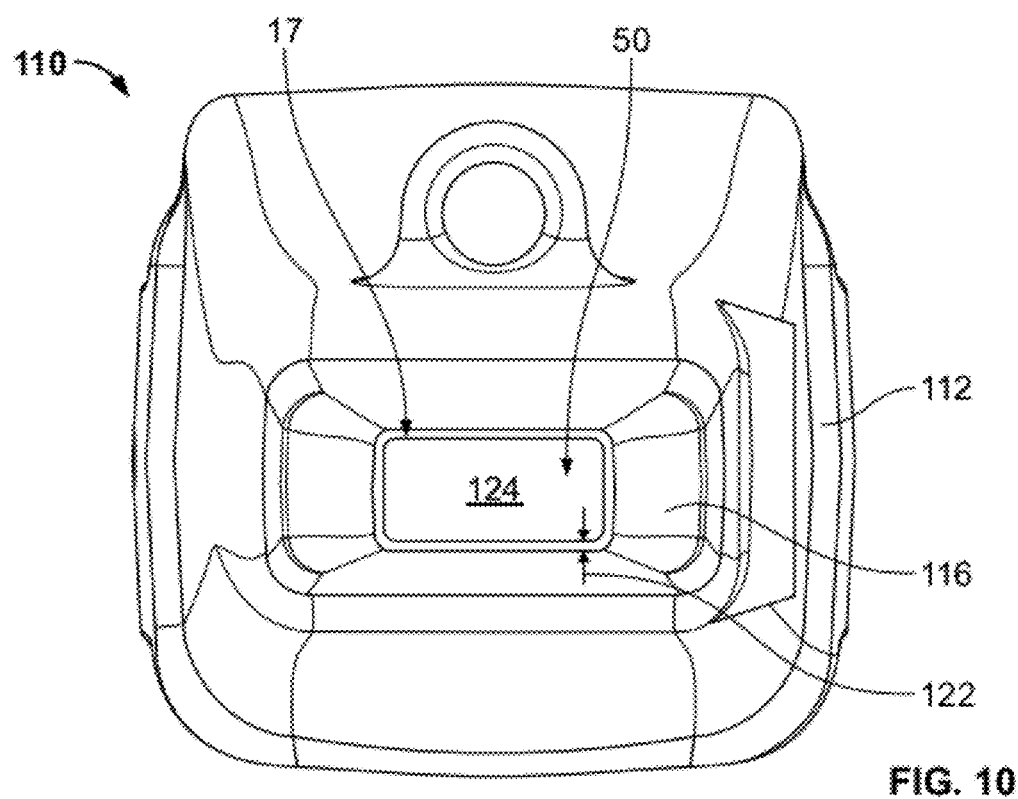
FIG. 10 is a front elevation of an alternate embodiment of a wearpart, in the form of a finished hardfaced wearpart with an attached shell, viewed similarly to the embodiment of FIG. 9. Portions of the shell seen in FIG. 9 have been removed.
Figure 11:
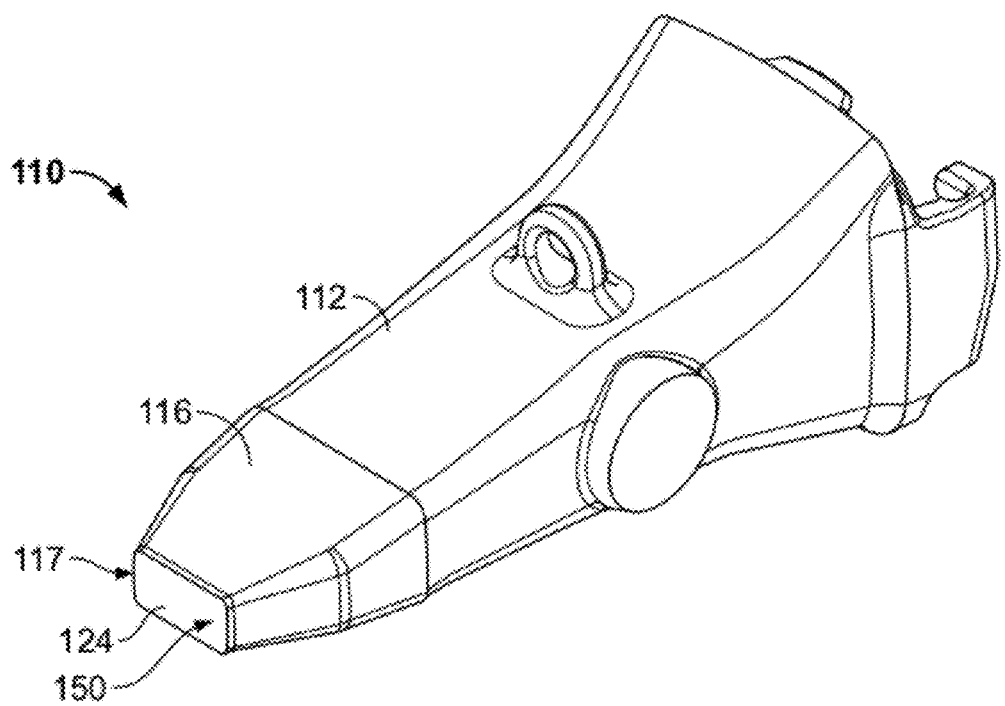
FIGS. 11-17 are views corresponding to the views of FIGS. 1-7, respectively, but showing the finished hardfaced wearpart of FIG. 10.
Figure 12:
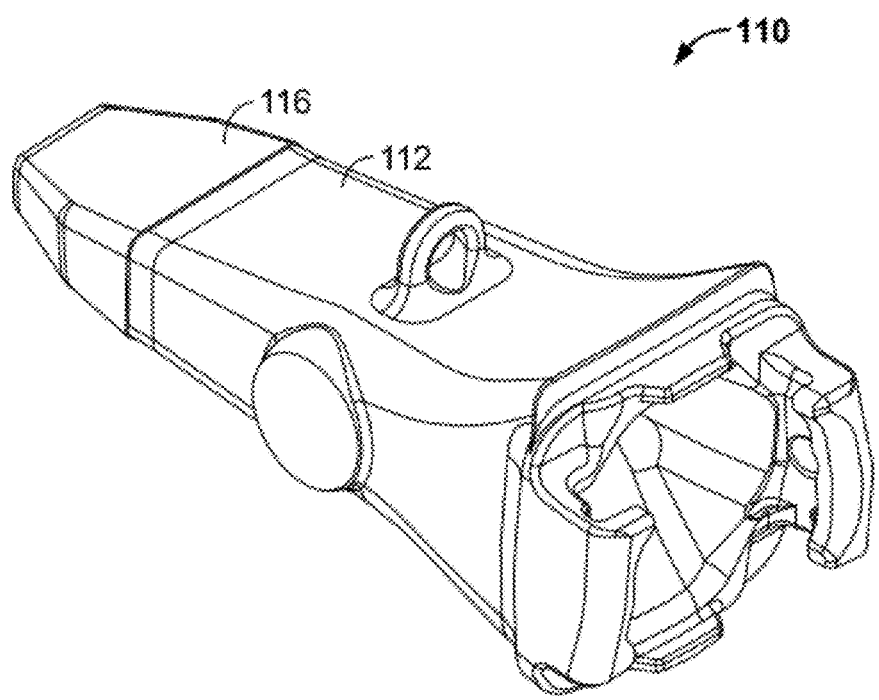
Figure 13:
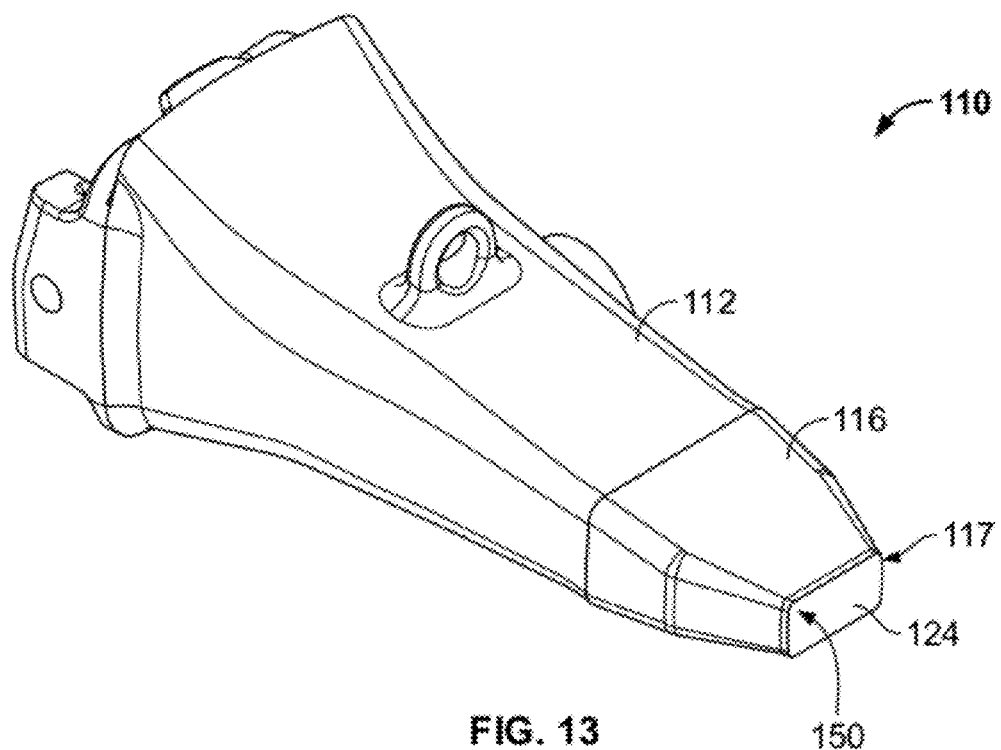
Figure 14:
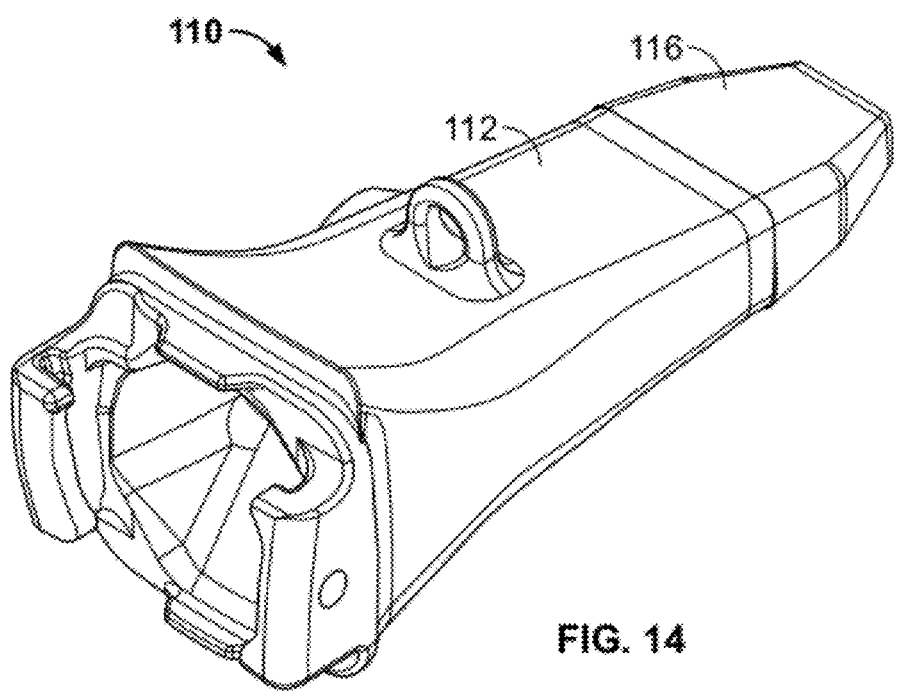
Figure 15:
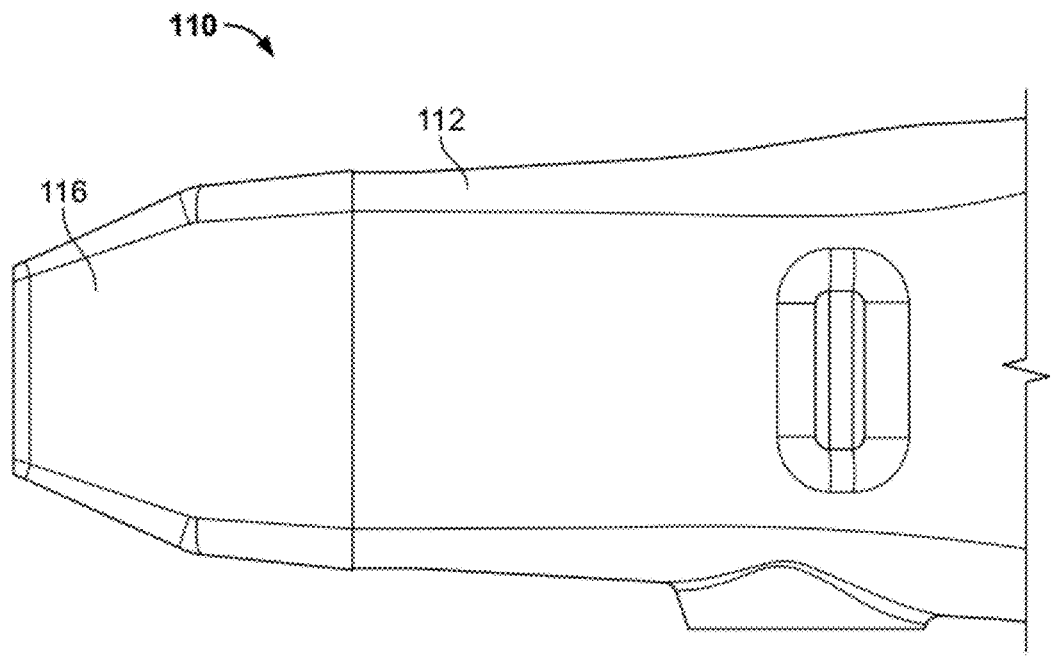
Figure 16:
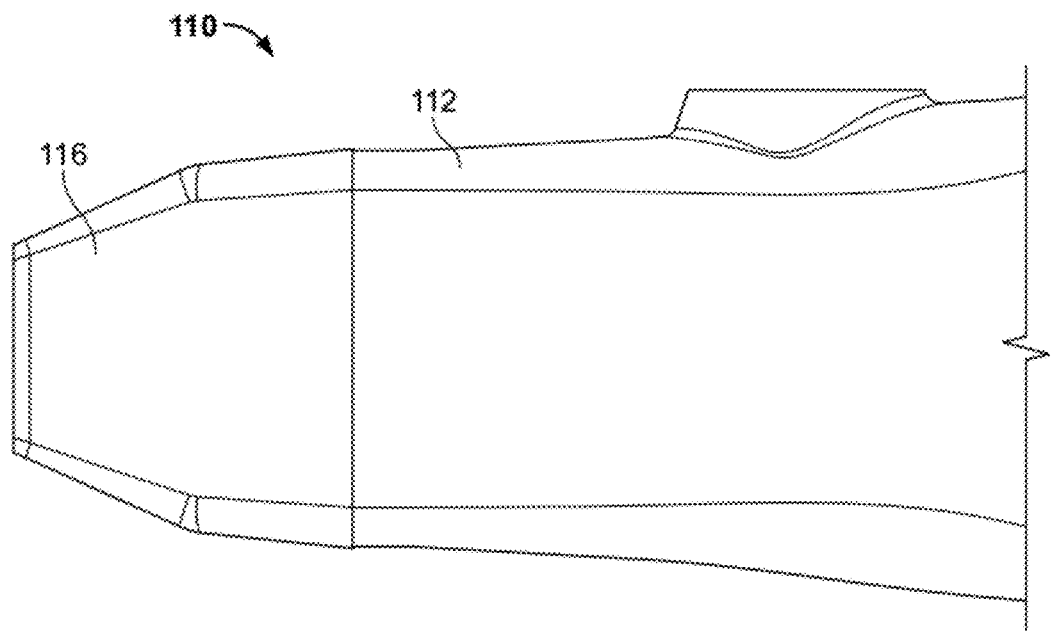
Figure 17:
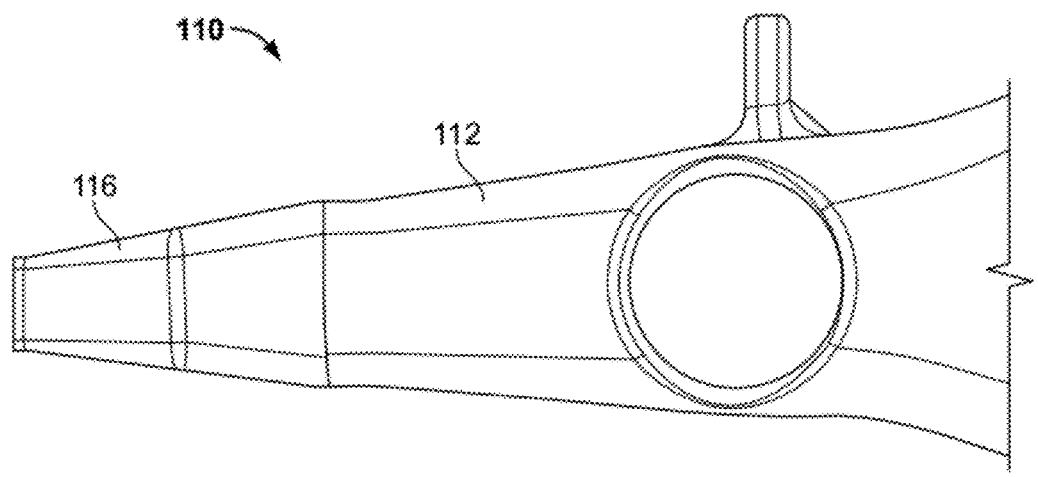

FIG. 10 shows a wearpart 110, representing wearpart 10 of FIG. 9, after removal of reservoir 18. This allows transport and handling of wearpart 110 without any interference from reservoir 18. FIGS. 11-17 correspond to FIGS. 1-7, again without reservoir 18. For clarity, part numbers have been used in FIGS. 10-17 that correspond to the part numbers of FIGS. 1-9, but with an added leading "1," including a substrate 112, a shell 114, and a layer of hardfacing material 124.

It will be seen from FIGS. 10-17 that the thinness of shell 114 results in a finished wearpart 110 that closely matches a desired final shape and weight of a wearpart for operational use. For example, mining points are sized and shaped for digging into particular types of earthen material. The thinness of shell 114 is particularly advantageous because a new, unused point 110, enclosed with an expendable shell 114, has an outer shape that will penetrate earthen material almost identically to an outer shape of such a wearpart 110, after shell 114 wears away. Similarly, mining equipment operates in particular ways based on the weight of any attached ground engaging tools, such as points on a bucket. A new, unused point 110, enclosed with an expendable shell 114, has a weight that is almost identical to a weight of such a wearpart 110, after shell 112 wears away. In the example discussed above, the shell has a weight that is approximately only 2% of the weight of the substrate. After adding the weight of the hardfacing material, the difference in weight of a finished wearpart according to this embodiment, with and without the expendable shell, will vary less than 2%.

Figure 18:
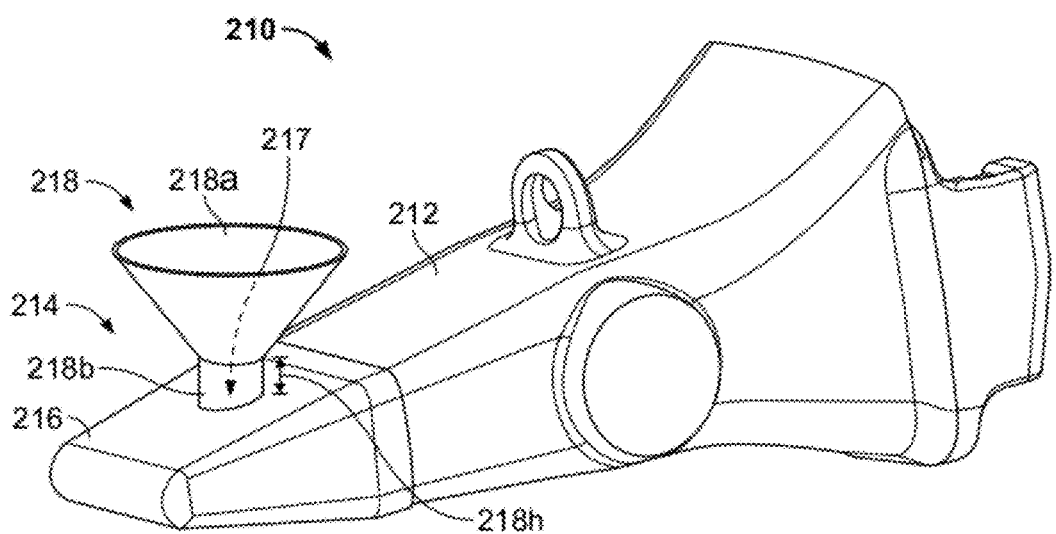
FIG. 18 is a perspective view of another embodiment of wearpart with an attached shell, including a reservoir formed as a funnel.

In the embodiment of FIGS. 1-9, reservoir 18 is shown as a flared opening, generally coaxial to a long axis of substrate 12, as well as a long axis of shell body 16 and of shell 14. Another embodiment may include a reservoir that is generally perpendicular to a long axis of a substrate, as well as a long axis of a shell body and of a shell. Such an embodiment is shown in FIG. 18, in which part numbers have been used that correspond to the part numbers of FIGS. 1-9, but with an added leading "2," including a substrate 212, a shell 214, and a reservoir 218 in communication with an opening 217 of the shell 212. Reservoir 218 preferably is substantially funnel shaped, with a large mouth 218a, but a relatively small neck 218b. This minimizes any resulting blemish in shell 214, after removal of reservoir 218, which may make for a more visually appealing wear part 210, when new. It also allows for different orientation of substrate 212 and shell 214 during infusion brazing, as discussed below, so that various shapes of substrates and shells may be accommodated in particular processing facilities, also discussed below. Finally, it may allow for a slightly different composite structure, after infusion brazing, because of a different orientation of substrate 212, shell 214, and reservoir 218 during infusion brazing, relative to gravity, when compared to a normal orientation of substrate 12, shell 14, and reservoir 18 during infusion brazing.

It is usually simplest to locate any such reservoir portion of a shell above the body of the shell. This arrangement is generally the most favorable as it allows gravity to assist capillary action during the infiltration process. The effect of gravity may be captured by increasing a height 218H of the neck of a funnel, increasing the effective "head" of molten brazing material contained in a corresponding funnel shaped reservoir. However, capillary action alone may be sufficient in some cases, between hardened particles and melted brazing material, even allowing the melted brazing material to "run uphill" for moderate distances.

Figure 19:
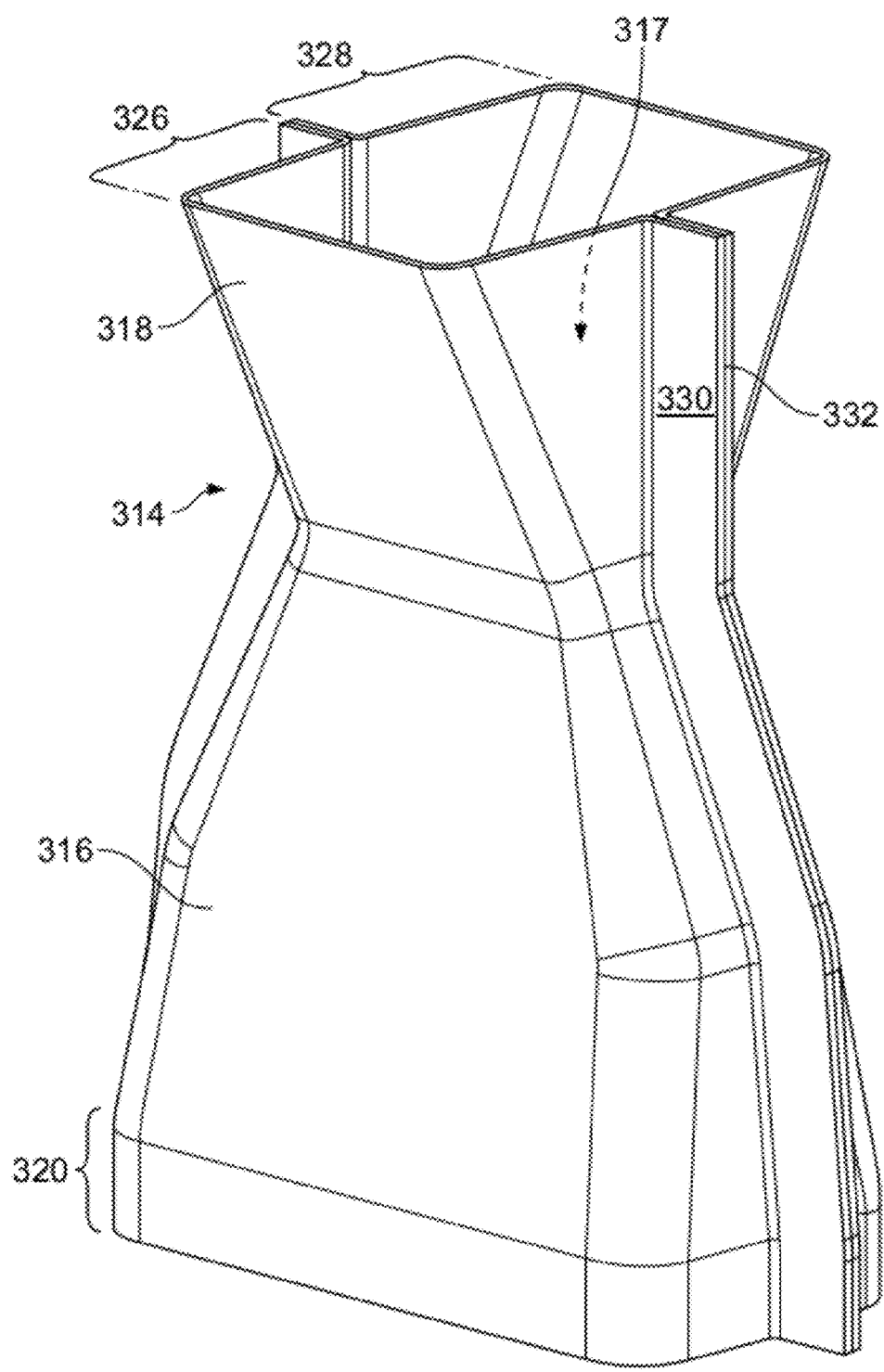
FIG. 19 shows a perspective view of a two-part shell for yet another embodiment, with the shell shown in a vertical orientation.

Yet another embodiment of a shell is shown in FIG. 19, as a two-part shell 314, having a two-part conformal band 320. A two-part shell body 316 of shell 314 may be initially formed from a front half piece 326 and a back half piece 328, having a front flange 330 or a rear flange 332, respectively. Front flange 330 extends transversely from the back edge of the front half 326 and rear flange 332 extends transversely from the front edge of the back half 328. Front flange 330 may be joined to rear flange 332 by welding or brazing with a brazing material having a higher melting temperature than the material intended for infiltration. Two-part shell 314 may be more easily formed than a corresponding one-part shell, in certain configurations. Two-part shell 314 may also be more easily joined to a corresponding substrate, in certain configurations, when compared to such joining with a corresponding one-part shell.

Figure 20:
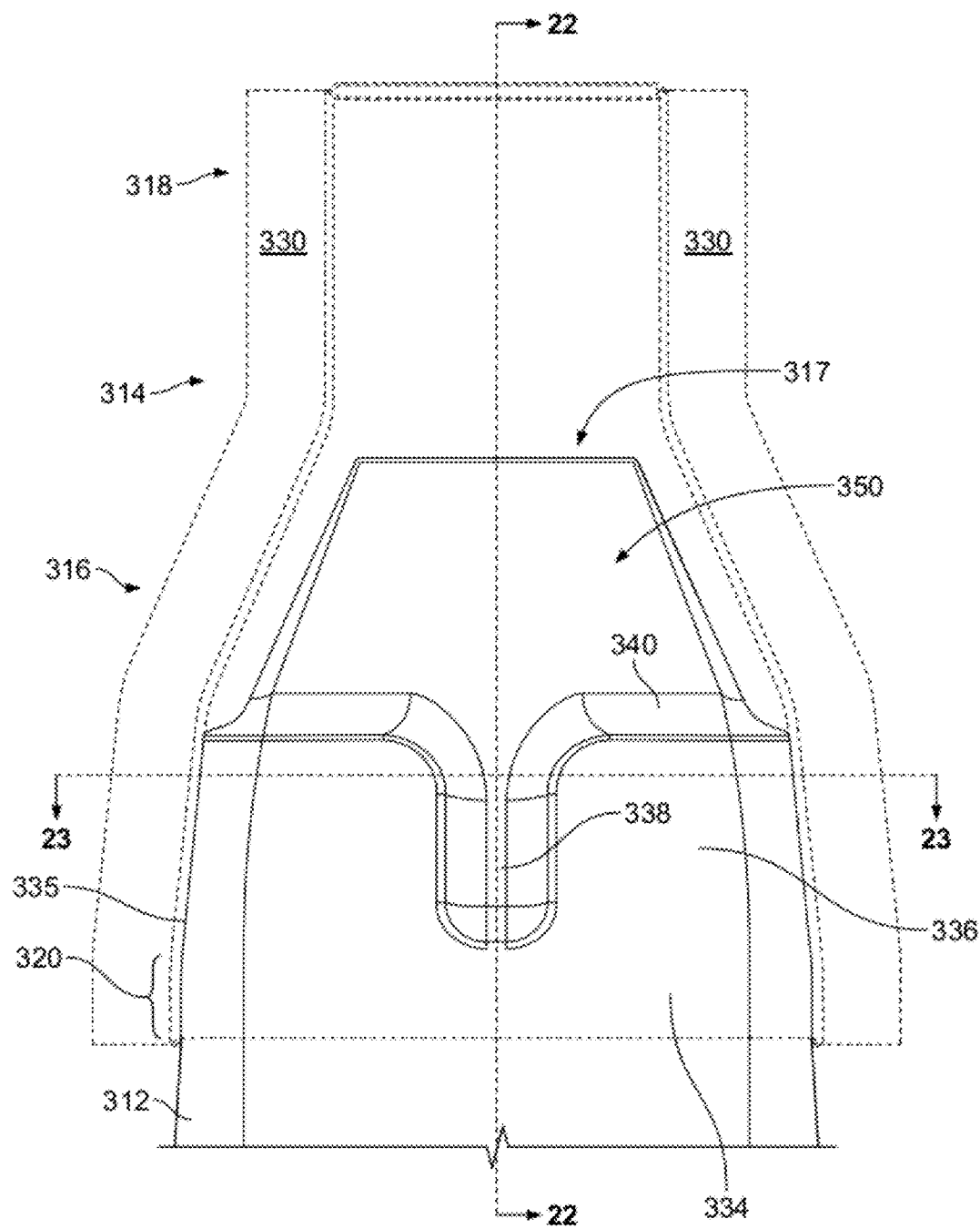
FIG. 20 is a top plan view of the embodiment of a shell according to FIG. 19, but including a wearpart with an attached two-part shell, and with the wearpart and the shell shown in a vertical orientation.
Figure 21:
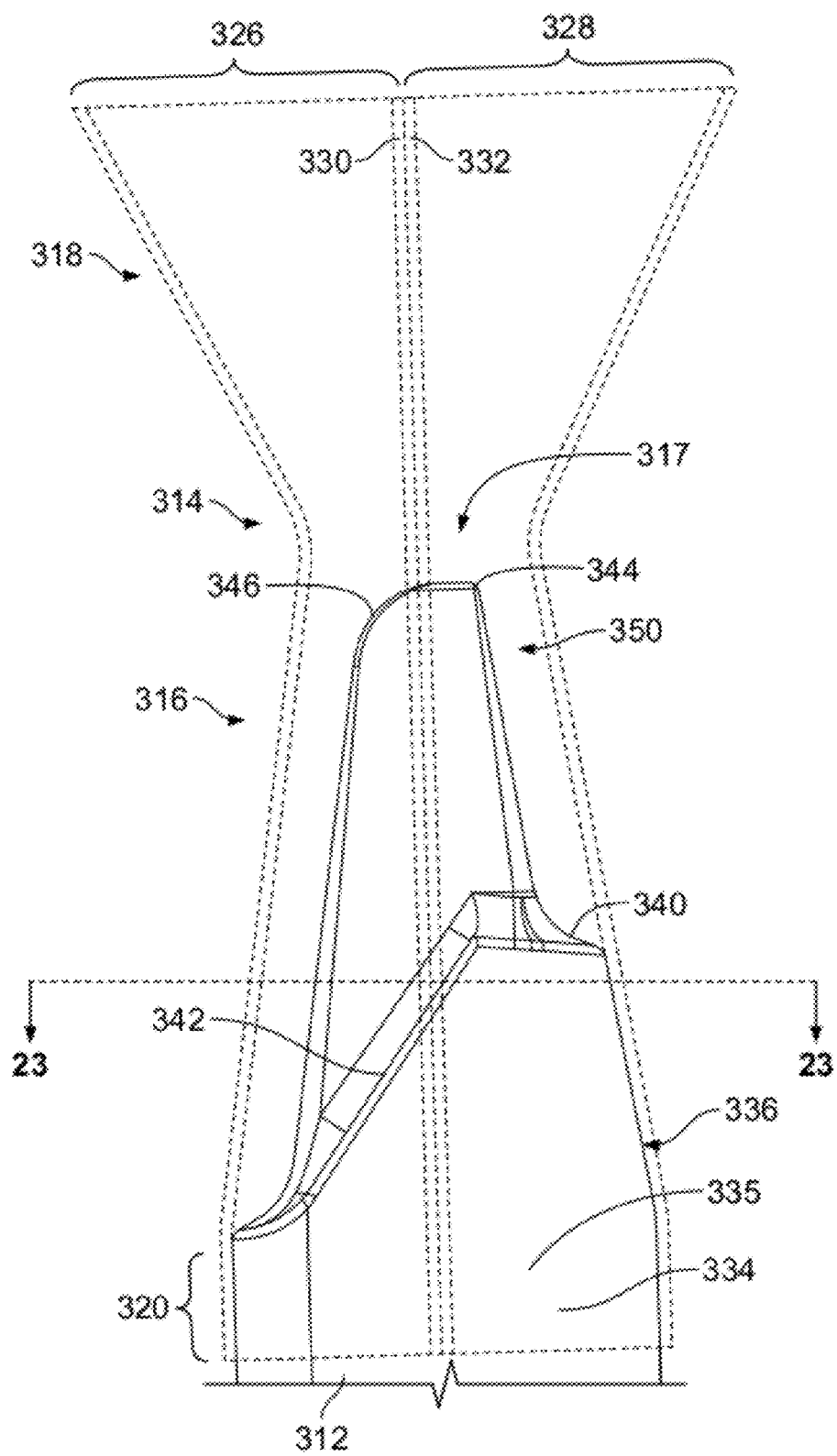
FIG. 21 is a left side elevation of the embodiment shown in FIG. 20 of a wearpart with an attached two-part shell.

Two-part shell 314 is shown joined to a portion of a corresponding substrate 312 in the form of a point, in FIGS. 20 and 21. Details of an outer geometry for substrate 312 are visible, because shell 314 is represented as partially transparent. An outer geometry for substrate 312 may include, a primary body 334 that defines a bonding surface 335 for welding or brazing to conformal band 320. The substrate 312 may provide at least some recess or other relief for the bonding of the hard material. For example, in the embodiment shown in FIGS. 20 and 21, the substrate 312 has a plateau 336 slightly inset from an outer surface of primary body 334, and further inset is a valley 338. Plateau 336 may define a ledge 340, and a ramp 342. A distal end of substrate 312 may be shaped to define an angular edge 344, and/or a rounded face 346. In another embodiment, the substrate 312 may not provide any recess or other relief for the hard material.

Figure 21A:
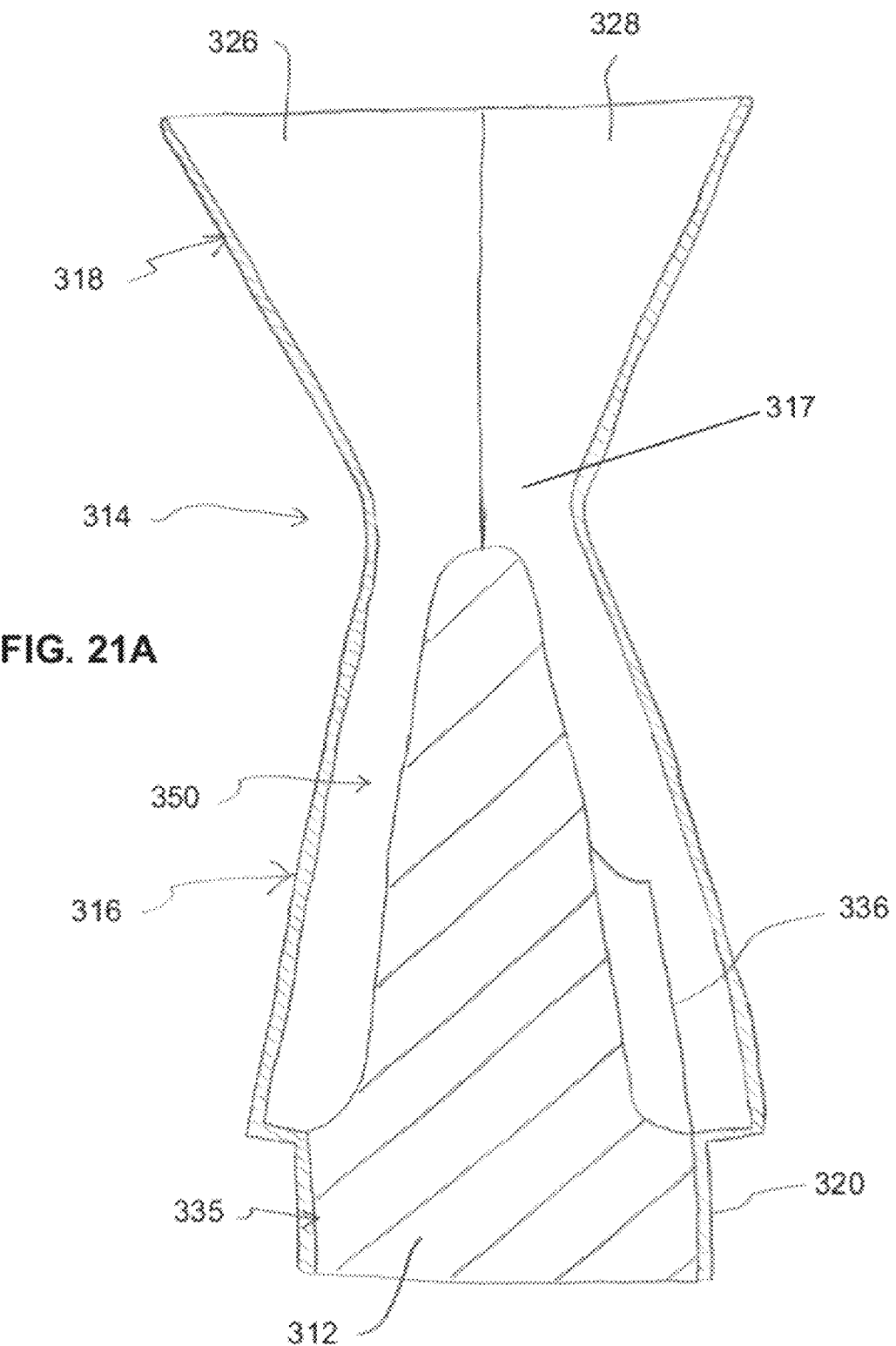
FIG. 21a is a left side cross-sectional view of the wearpart of FIGS. 20 and 21, shown with an attached two-part shell having another configuration.
Figure 22:
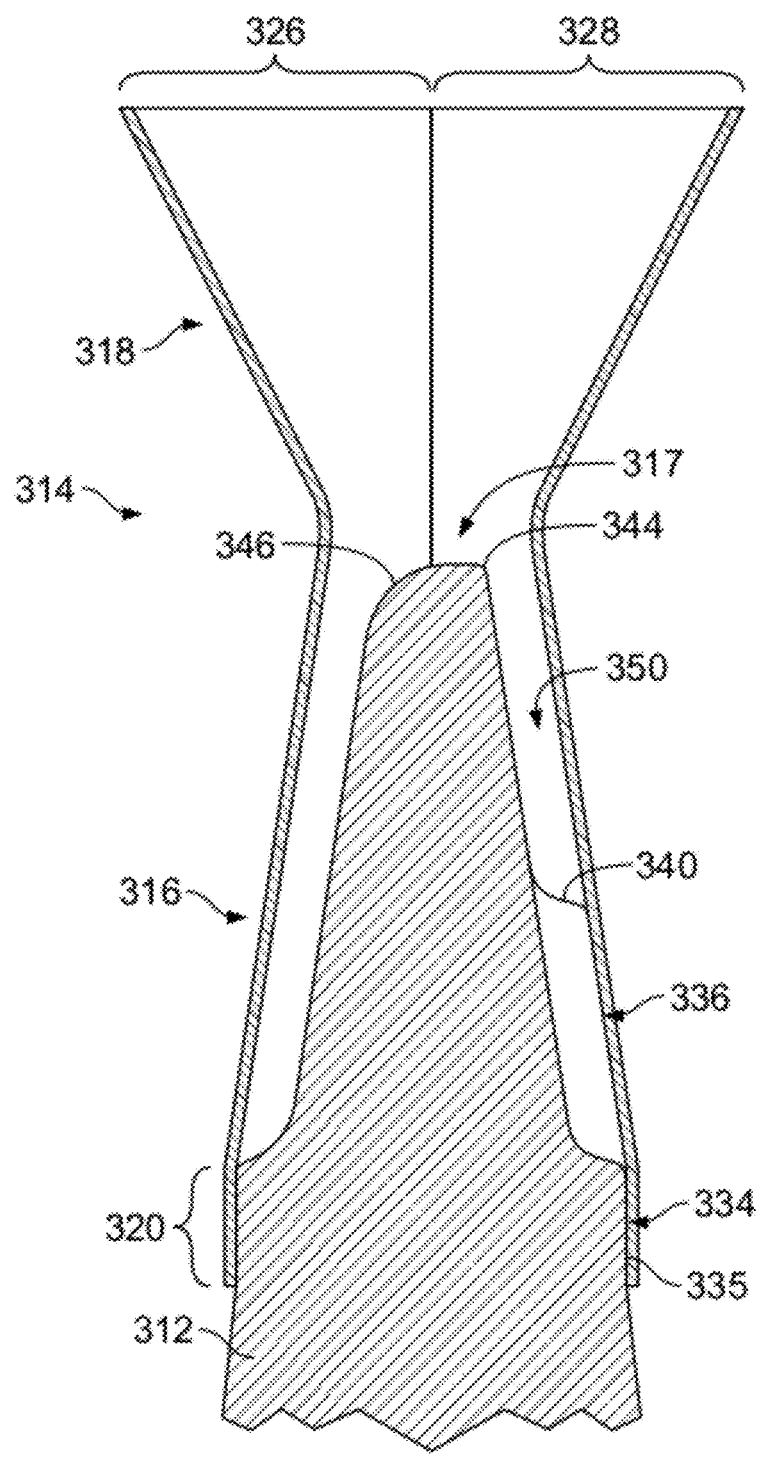
FIG. 22 is a cross sectional view of the embodiment of FIGS. 20 and 21, taken generally along line 22-22 in FIG. 20.
Figure 23:
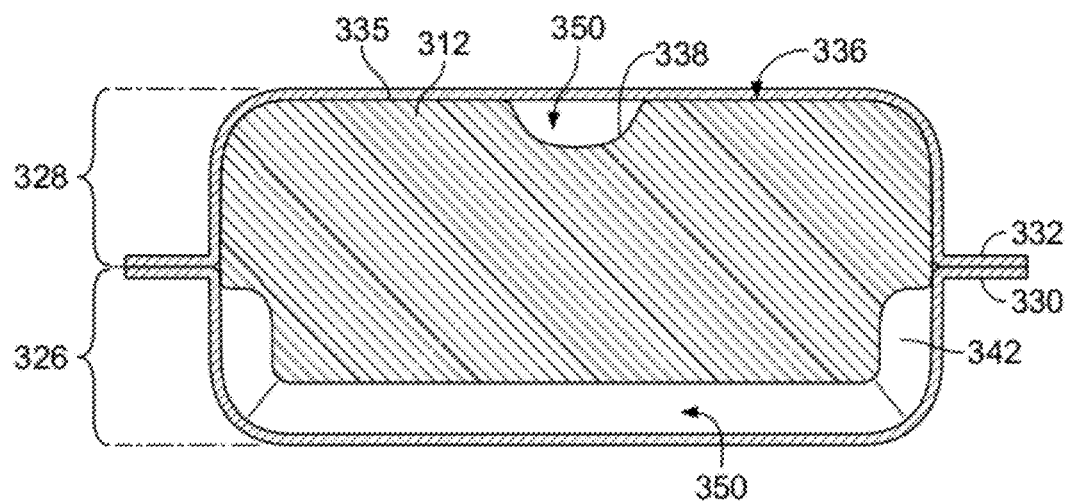
FIG. 23 is a cross sectional view of the embodiment of FIGS. 20 and 21, taken generally along line 23-23 in FIGS. 20 and 21.

Cross sectional views of the embodiment of FIGS. 20 and 21 are shown in FIGS. 22 and 23. Shell 314 extends smoothly away from conformal band 320, defining a cavity 350 between substrate 312 and shell 314. Cavity 350 includes the recess defined by valley 338, and other relative recesses where the distal end of substrate 312 is formed with a reduced thickness relative to shell 314. Cavity 350 defines a resulting thickness of hardfacing material bonded to substrate 312, and the inner geometry of shell 314 defines an ultimate outer geometry of a finished point. In the embodiment of FIGS. 20-23, the hardfacing material that will be bonded to substrate 312 generally extends fairly smoothly from adjacent portions of substrate 312, approximately even with the outer surface of substrate 312, rearward of the resulting hardfacing material. In FIGS. 22 and 23, inside surfaces of shell 314 are flush with portions of substrate 312. For example, at conformal band 320 this provides a close fit with the bonding surface 335 to locate shell 314 precisely, relative to substrate 312. At other locations, such as plateau 336, this flush mounting is simply because hardfacing material is not needed, or even because hardfacing material is undesired at such locations. The resultant hardfacing material 324 is flush with adjacent portions of the substrate 12. For example, in the embodiment illustrated, the hardfacing material 324 is flush with the bonding surface 335, as well as other surfaces of substrate 312 that contact the inside surfaces of the shell 314 (e.g. plateau 336). By not having hardfacing material 324 stand up higher than the adjacent surface of substrate 312, the force required to push point 310 into earthen material is lowered. The aesthetics of hardfaced point 310 are also better without a visually thick hardfacing layer protruding above surrounding surfaces of substrate 312. However, in another embodiment, shown in FIG. 21a, a shell 314 may flare out from a conformal band 320, so that the hardfacing material that will be bonded to the substrate adds substantially to a thickness of the point, enlarging the distal end of the point relative to the adjacent portions of the substrate 312, including relative to the bonding surface(s) 335.

Figure 24:
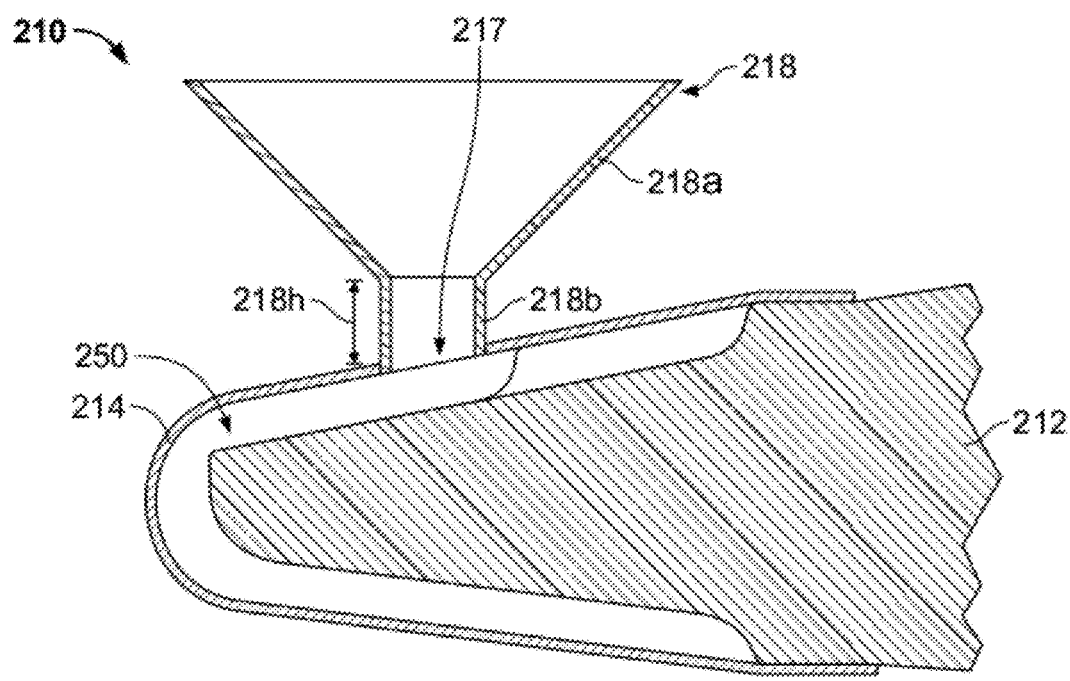
FIG. 24 shows a cross-sectional view of the embodiment of FIG. 18, taken generally along a plane similarly to the plane used to define the cross-sectional view of FIG. 22, but with a substrate and shell shown in a horizontal orientation.

FIG. 24 shows a cross-sectional view of the embodiment of FIG. 18, viewed similarly to the cross-sectional view of FIG. 22, but with substrate 212 shown in a horizontal orientation.

FIG. 25 shows multiple views, a-j, as part of manufacturing a wearpart 310. The different drawings 25a-25j illustrate selected processing steps as part of infiltration hardfacing a mining bucket point. FIG. 25a shows a substrate in the form of a point 312, of a type used for mining buckets, before attachment of any shell, and before forming any layer of hardfacing material on substrate 312.

Figure 25A:
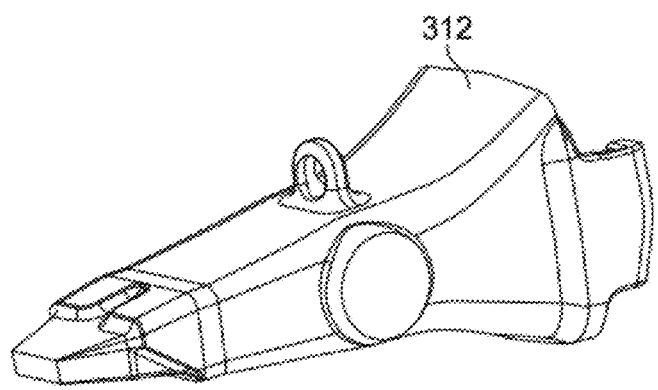
FIG. 25 shows multiple views, a-j, as part of manufacturing a wearpart, generally according to the embodiment of FIGS. 19-23.
Figure 25B:
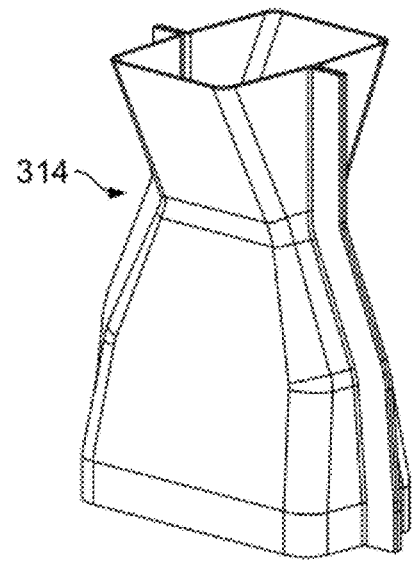
Figure 25C:
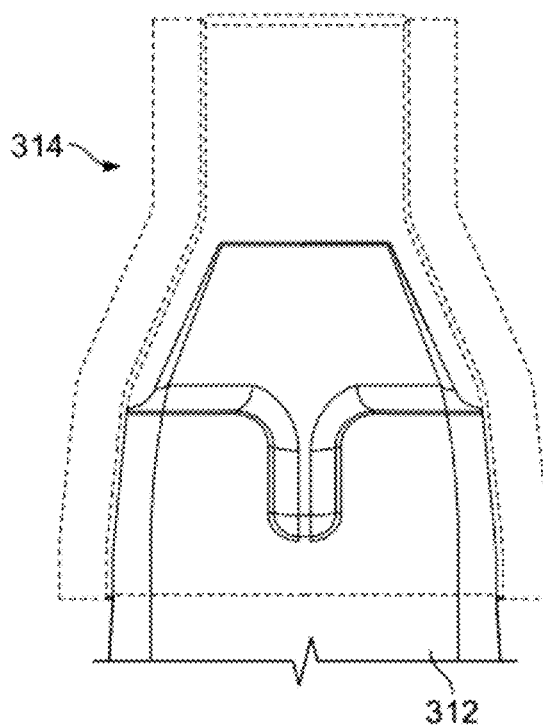
Figure 25D:
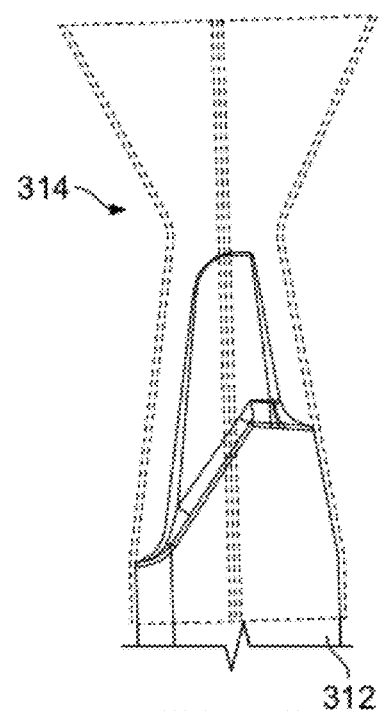

FIGS. 25b, 25c, and 25d correspond directly to FIGS. 19, 20, and 21. Substrate 312 is referred to above more generally as substrate 312. Only a portion of substrate 312 is shown in FIGS. 25c and 25d, and that portion is oriented generally vertically, when compared to a generally horizontal orientation of substrate 312 in FIG. 25a. Shell 314 is formed in two halves, and then welded together along flanges, as discussed above. Shell 314 is installed on substrate 312 and then welded in place along its bottom edge, discussed above as conformal band 320. Alternatively, the two halves of shell 314 may first be clamped in place or otherwise held on substrate 312, and then welded together, and/or welded to substrate 312, to better accommodate various surface geometries of substrate 312 and shell 314. When steel shell 314 is joined to substrate 312, the steel shell and the substrate define a cavity 350 between the substrate and the shell.

In FIG. 25e a hard material in the form of hard particles 352 is introduced into the defined cavity 350 by pouring through the opening 317 in communication with the cavity 350, with the flare of reservoir 318 making it easier to pour in hard particles 352. These hard particles 352 may be allowed to simply fill cavity 350 with gravity feed, or the hard particles 352 may be tamped and/or vibrated, or otherwise packed into place inside the defined cavity 350. In another embodiment, a different type of hard material may be used, including those described above. Additionally, the particles 352 may not completely fill the cavity 350 in another embodiment, as desired. As shown in FIG. 25f, an infiltrant brazing material 354 in powder form may then be poured above the hard particle layer, held in reservoir 318 of shell 314. The brazing material 354 may be in a different (i.e. non-powdered) form in another embodiment, as described below. As shown in FIG. 25g, reservoir 318 may be sized to define a correct volume of infiltrant brazing material 354, relative to the defined volume of cavity 350 and the hard particle layer 352 held in cavity 350, provided that infiltrant brazing powder 354 is used to substantially fill reservoir 318. The entire assembly in FIG. 25g, including substrate 312, shell 314, the layer of hard particles 352, and the layer of infiltrant brazing powder 354, is ready for an infiltration cycle, as described below.

Figure 25H:
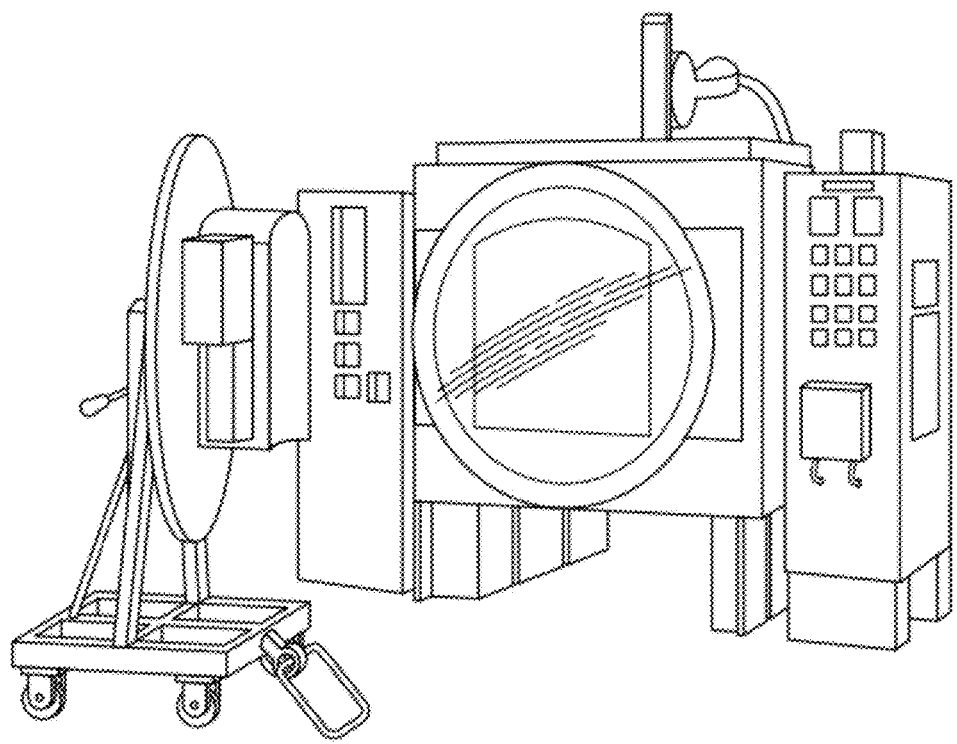
Figure 25I:
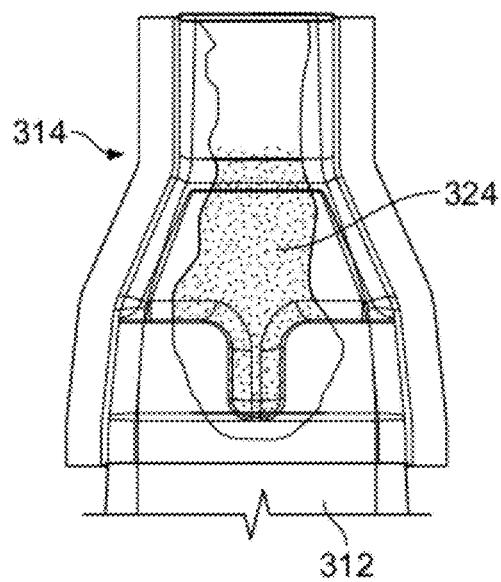

The infiltration cycle is carried out in a furnace, of the type represented in FIG. 25h. Preferably, the furnace is a vacuum furnace, although other types of furnaces may be used. The entire assembly of FIG. 25g is placed in such a furnace for the infiltration cycle, during which time the entire assembly is heated to a temperature high enough to melt infiltrant brazing powder 354. This causes molten brazing material to infiltrate the layer of hard particles 352, forming a composite 324, made up of hard particles 352 infused with an infusing metallic brazing material 354. The infusing brazing material bonds to substrate 312 and hard particles 352.

The infusing brazing material may also bond to shell 314, although this is not essential. After infiltration, therefore, shell 314 typically is permanently bonded to substrate 312. When the resulting wear-resistant point is used for digging, shell 314 simply wears away, exposing infiltrated layer 324 to perform its wear-resisting function.

Figure 25J:
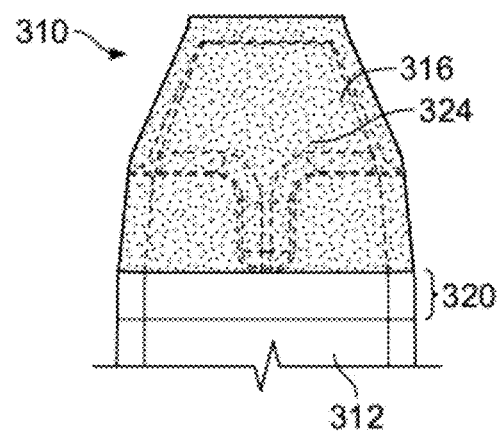

In FIG. 25j, the reservoir portion 318 of shell 314 has been removed, leaving a finished product as a hardfaced wearpart 310, and more specifically, a hardfaced point 310.

Figure 26:
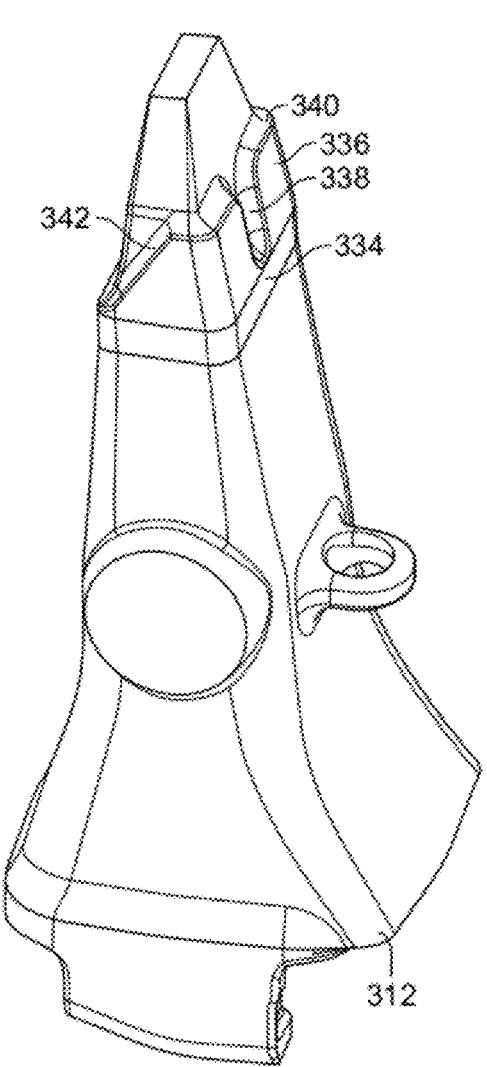
FIGS. 26 and 27 show a perspective view of two different embodiments of an underlying substrate that may be used to manufacture a hardfaced wearpart. In both FIGS. 26 and 27, the substrate, more specifically a point, is oriented vertically.
Figure 27:
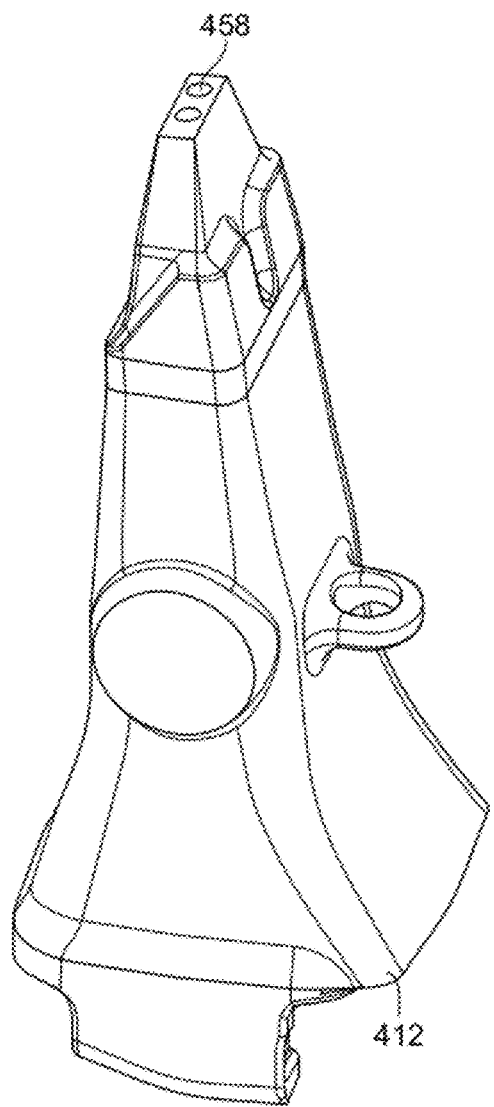

FIGS. 26 and 27 show two different embodiments of an underlying substrate that may be used to manufacture a hardfaced wearpart. FIG. 26 shows substrate 312 of FIG. 25a, oriented vertically. FIG. 27 shows an alternative embodiment of a substrate in the form of a point 412, with two holes 458 formed near a digging end of substrate 412.

In this embodiment, holes 458 provide surface intrusions that help improve bonding between substrate 412 and the resulting composite of hard particles and brazing material. The resulting infiltrated hard material in holes 458 modifies how the resulting hardfaced wearpart wears in service. In some embodiments, the resulting infiltrated hard material in holes 458 helps maintain "sharpness" and digging efficiency. Further benefits of this nature may be obtained by installing pre-manufactured hard metal inserts in holes 458.

Figure 28:
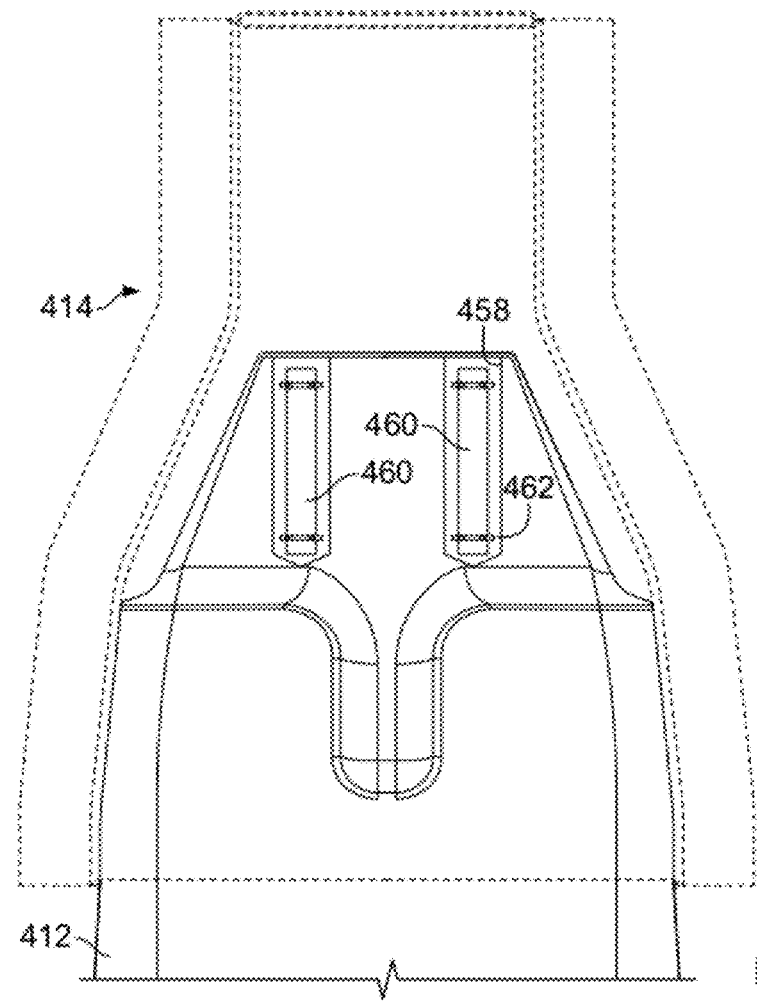
FIG. 28 is front elevation of a substrate and an attached shell, viewed similarly to FIGS. 20 and 25c, with a schematic representation of two holes each including a hardened insert and two spacers.

FIG. 28 represents the embodiment of FIG. 27, with a shell 414 welded to substrate 412. An insert 460 is shown schematically, held in each hole 458. Proper spacing between inner walls of holes 458 and each such insert 460 may be provided by one or more spacers 462. Two spacers 462 are shown mounted on each insert 460. In another embodiment, no spacers 462 may be used. The spacing created by the spacers 462 can provide a transition between the substrate 412 and the insert 460 to resist cracking of the insert 460 due to expansion differences. The brazing material that forms in the spacing can deform to accommodate such differences in expansion and contraction if necessary. In an additional embodiment, the coefficient of thermal expansion of the infiltrated material may be selected to be between the coefficient of thermal expansion of the insert 460 and the coefficient of thermal expansion of the substrate 412 to help reduce cracking due to expansion differences, as similarly described below.

Figure 29:
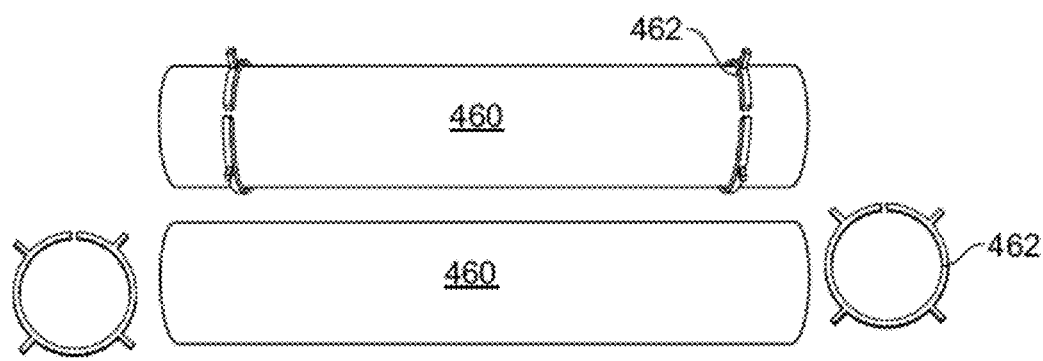
FIG. 29 is a photograph of two hardened inserts for use as with the substrates shown in FIG. 28.
Figure 30:
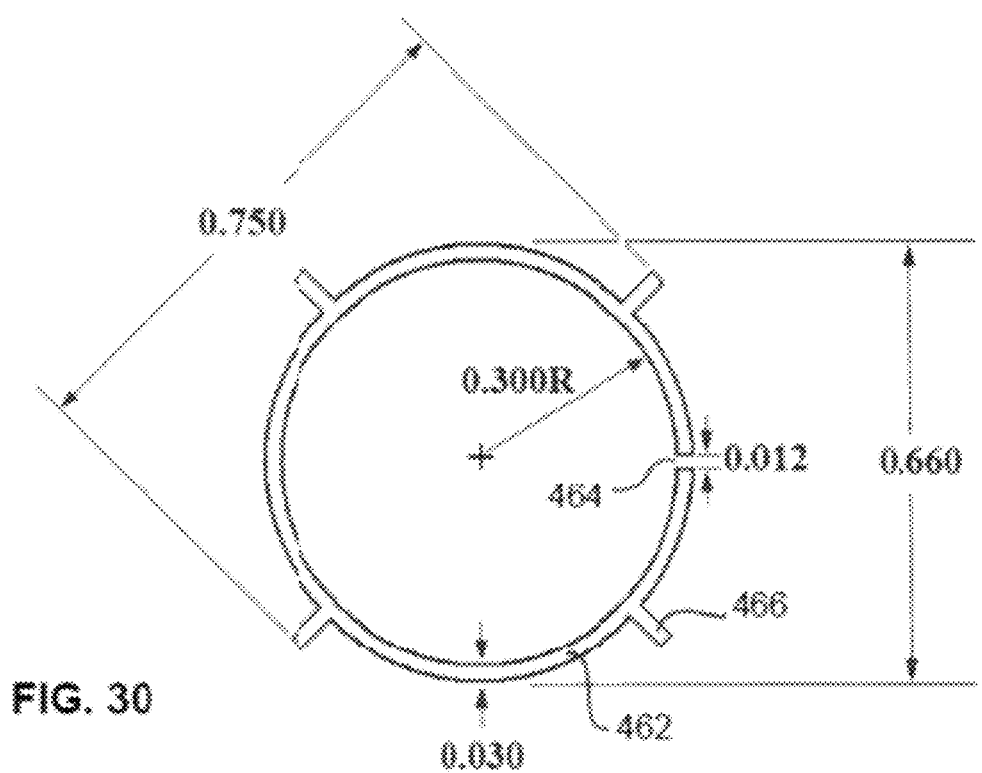
FIG. 30 is a plan view of a spacer shown in FIG. 29.

Two such inserts 460 are shown in FIG. 29, preferably made from sintered tungsten carbide. In another embodiment, the insert(s) 460 may be sintered shapes of one or more other carbides (e.g. chromium carbide, molybdenum carbide, vanadium carbide, etc.). Porous preforms of various carbides may also be used in another embodiment, including tungsten carbide (WC/W$_2$C), chromium carbide, molybdenum carbide, vanadium carbide, and other carbides. Such porous preforms may be provided in pure carbide form in one embodiment. In a further embodiment, the insert(s) 460 may be formed of a ceramic or other material. If ceramic is used, one or more techniques to enhance wetting and/or bonding of the brazing material on the ceramic surface may be used (e.g. active brazing), including such techniques as described below. Preferably, spacers 462 are made from steel with a split hoop 464 and multiple legs 466, and split hoop 464 is spring-like so that spacer 462 stays in place when slid onto one of inserts 460. One such spacer 462 is shown in detail in FIG. 30.

Figure 31:
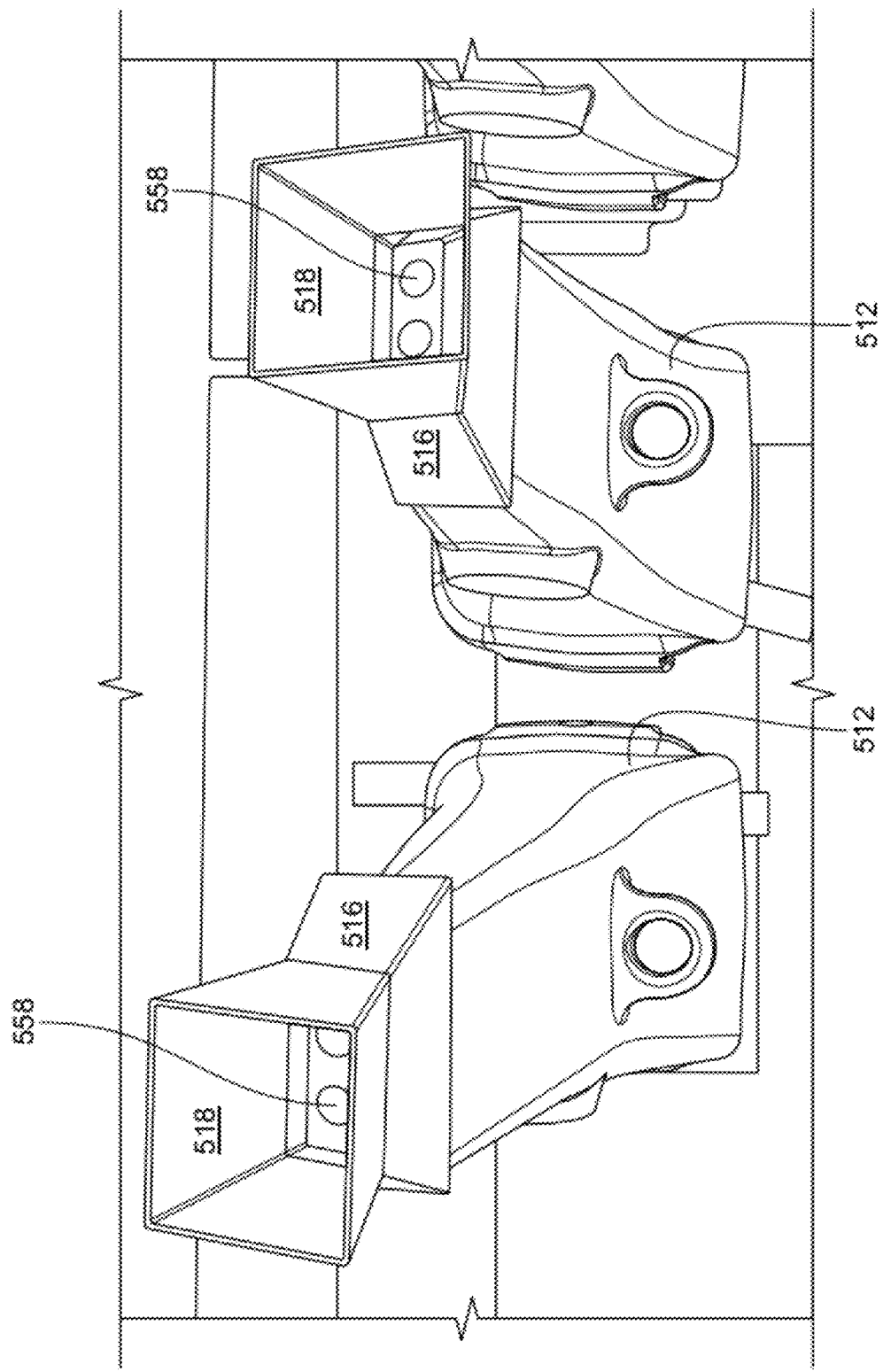
FIG. 31 is a photograph of two examples of the embodiment of a substrate shown in FIG. 27, each example shown with a shell welded in place, ready to receive a proper amount of hard particles and an infiltrant brazing powder.
Figure 32:
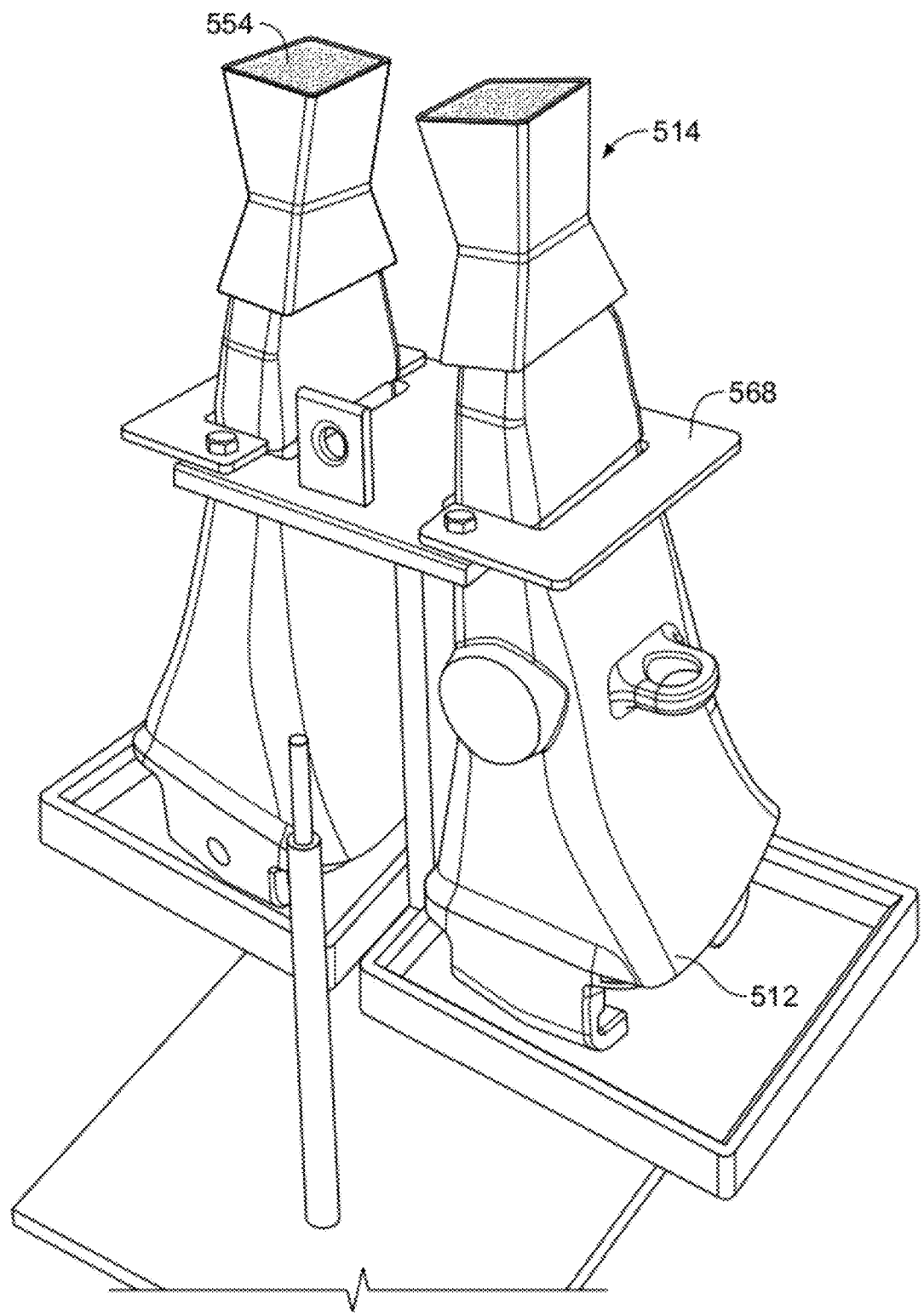
FIG. 32 is a photograph of two examples of the embodiment of a substrate and shell shown in FIG. 28, each example shown with the shell filled with infiltrant brazing powder.

FIG. 31 is a depiction of two examples of yet another alternative embodiment, each including a substrate in the form of a point 512, and each shown with a shell 514 welded in place, ready to receive a proper amount of hard particles and an infiltrant brazing material, generally as described above. FIG. 32 shows two assemblies ready for an infiltration cycle, each having a point 512 and a shell 514, filled with hard particles (not visible) and brazing material 554. Optionally, a jig 568 is removably attached to each point 512, to help stabilize each point 512 during handling, and during loading and unloading of a furnace, as shown in FIG. 33.

Figure 33:
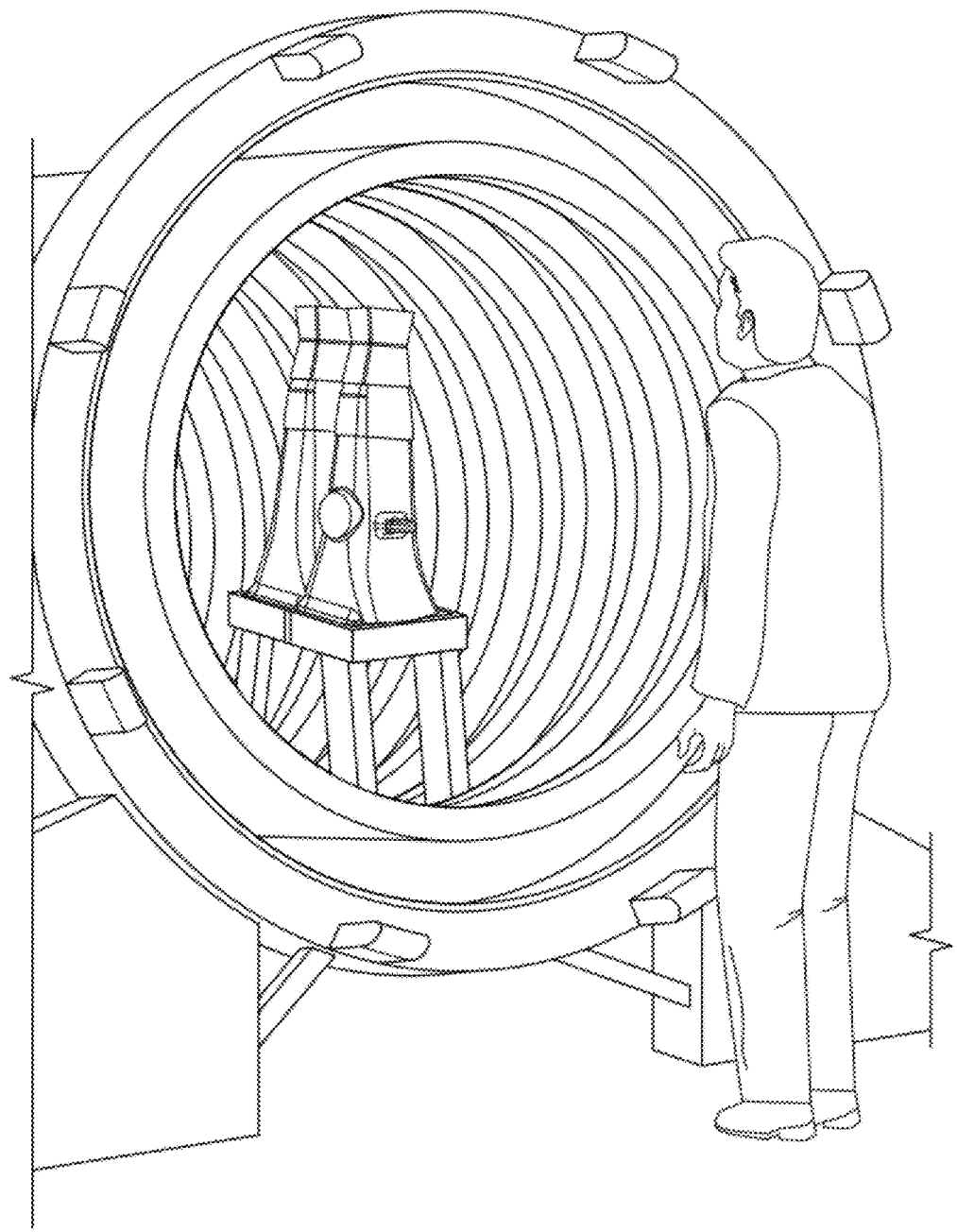
FIG. 33 is a photograph of the two examples from FIG. 32, loaded into a furnace.
Figure 34:
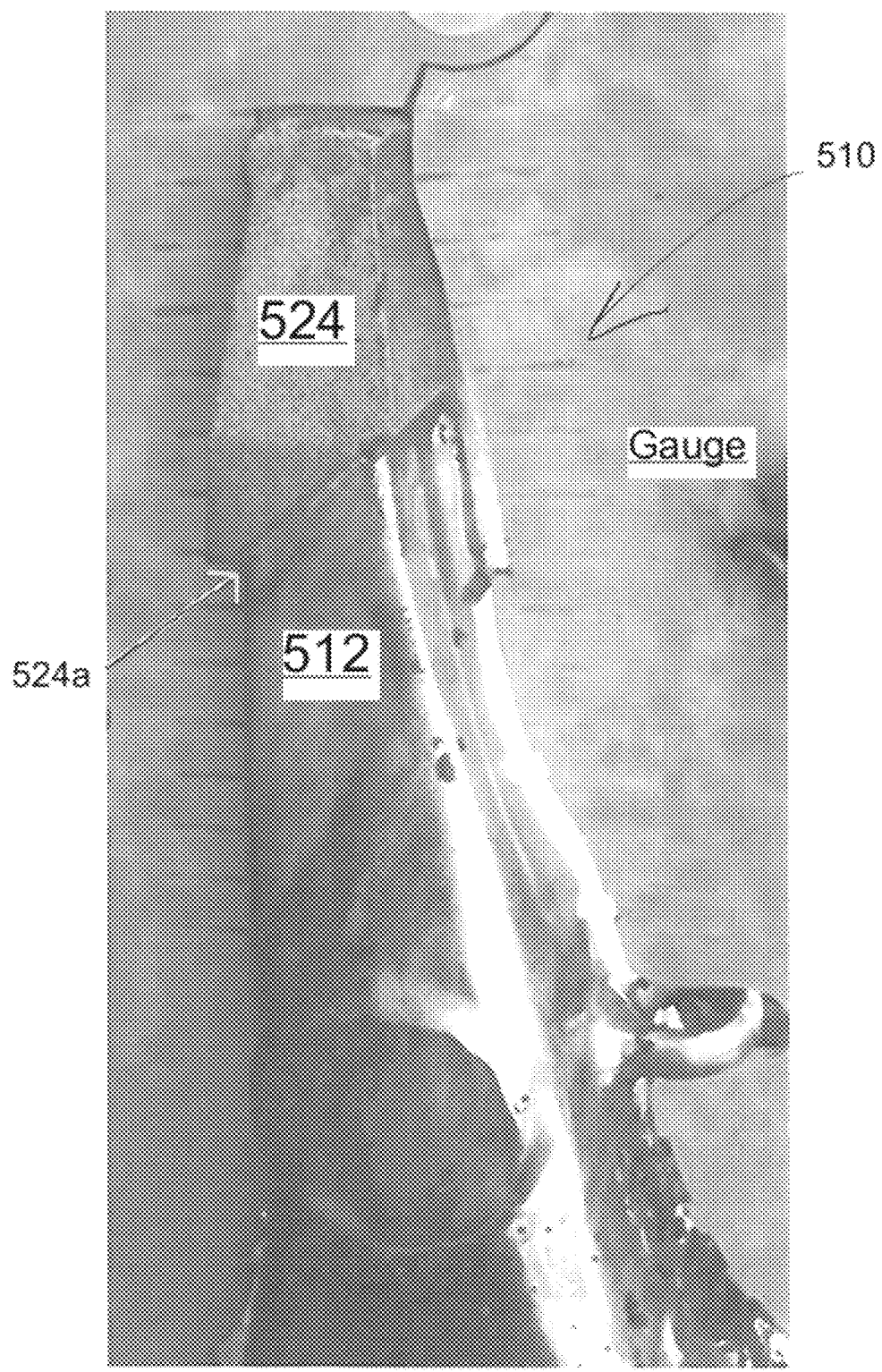
FIG. 34 is a photograph of one of the examples from FIGS. 32 and 33, after the shell has worn away during initial digging.

A finished, partially-worn substrate in the form of a hardfaced point 510 according to the embodiment of FIGS. 31-33, is shown in FIG. 34. Hardfaced point 510 was made placing the assembly of FIGS. 32 and 33 in a furnace and then heating and cooling the assembly as part of an infiltration cycle as described below. The resulting hardfaced point 10 was used in digging to wear away expendable shell 514, no longer visible in FIG. 34. The grey background surrounding hardfaced point 510 is a removable gauge that measures how much material is worn away during use of hardfaced point 510. As shown, hardfaced point 510 has been hardfaced in such a way that hardfacing material 524 is "on top" of the primary surfaces of point 512, so that there is a sharp, angular transition of the outer surface, progressing from point 512 onto hardfacing material 524, indicated at 524a. In certain applications, this angular surface configuration may offer specific benefits. In particular, the resulting enlarged digging end of a point, in which hardfacing material 524 is standing above the surrounding surface of point 512, may effectively protect adjacent unhardfaced surfaces by means of a shadowing effect, without the need for the expense or weight of hardfacing material. Selective addition of hard-faced material may protect areas subject to substantial wear, and such hard facing material may be unnecessary on other regions of the point.

The thin metal shells of the present disclosures are particularly useful when adding hardfacing material to points that have been produced by sand casting. It is typical for mining, points cast using a green sand process to have substantial dimensional variations, such as a thickness that may vary by 0.060 inches in a region corresponding to the conformal band discussed herein, where the shell of the present disclosure would be attached. Such green-sand-cast points thus are particularly difficult to seal with non-bendable molds such as ceramic molds and graphite molds. However, the thin metal of the various shells disclosed herein may be readily deformed and bent as needed to allow proper welding of the thin metal shell to a green-sand-cast point.

Figure 35:
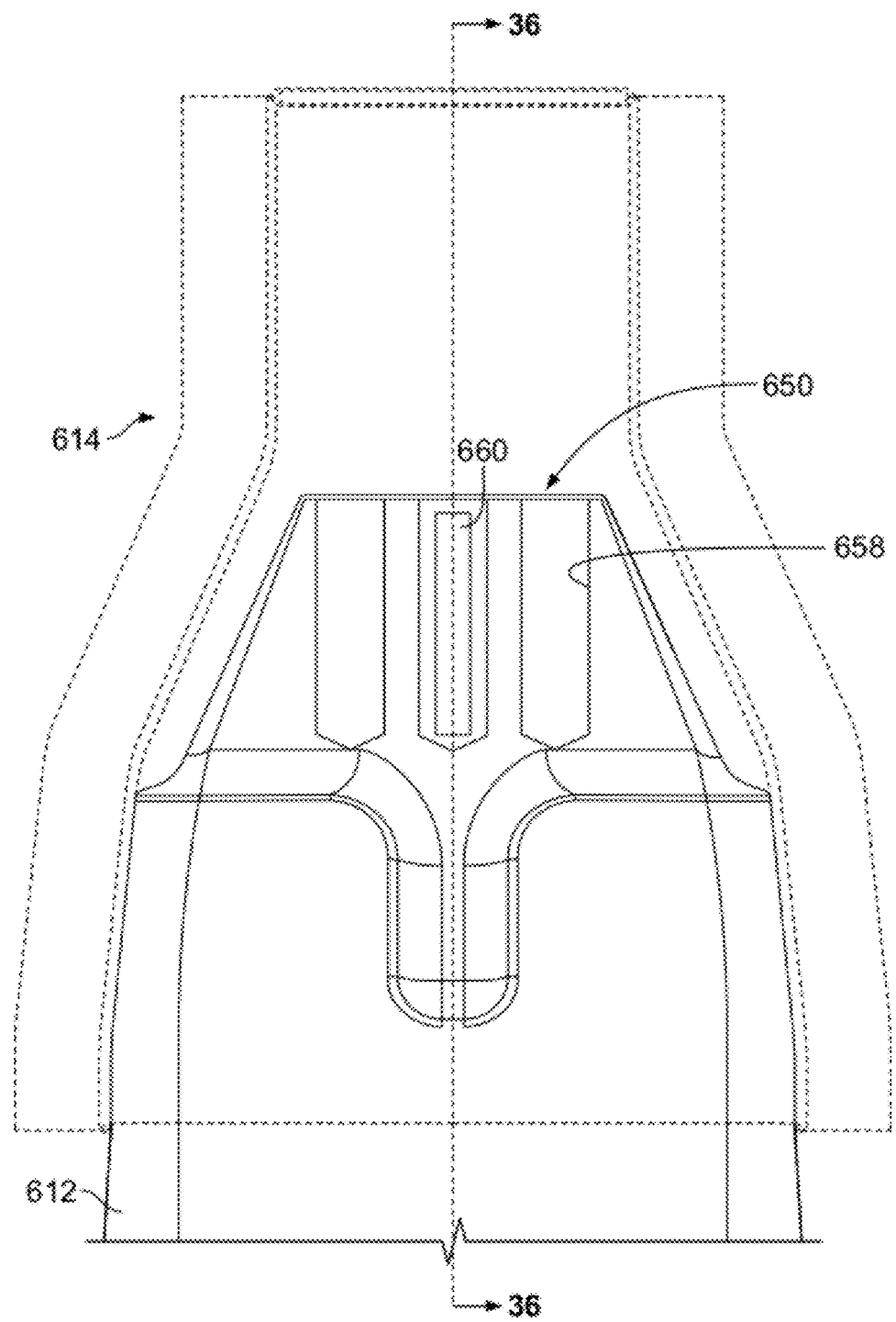
FIG. 35 is front elevation of a substrate and an attached shell, viewed similarly to FIG. 28, with a schematic representation of three holes, with a central hole including a hardened insert.
Figure 36:
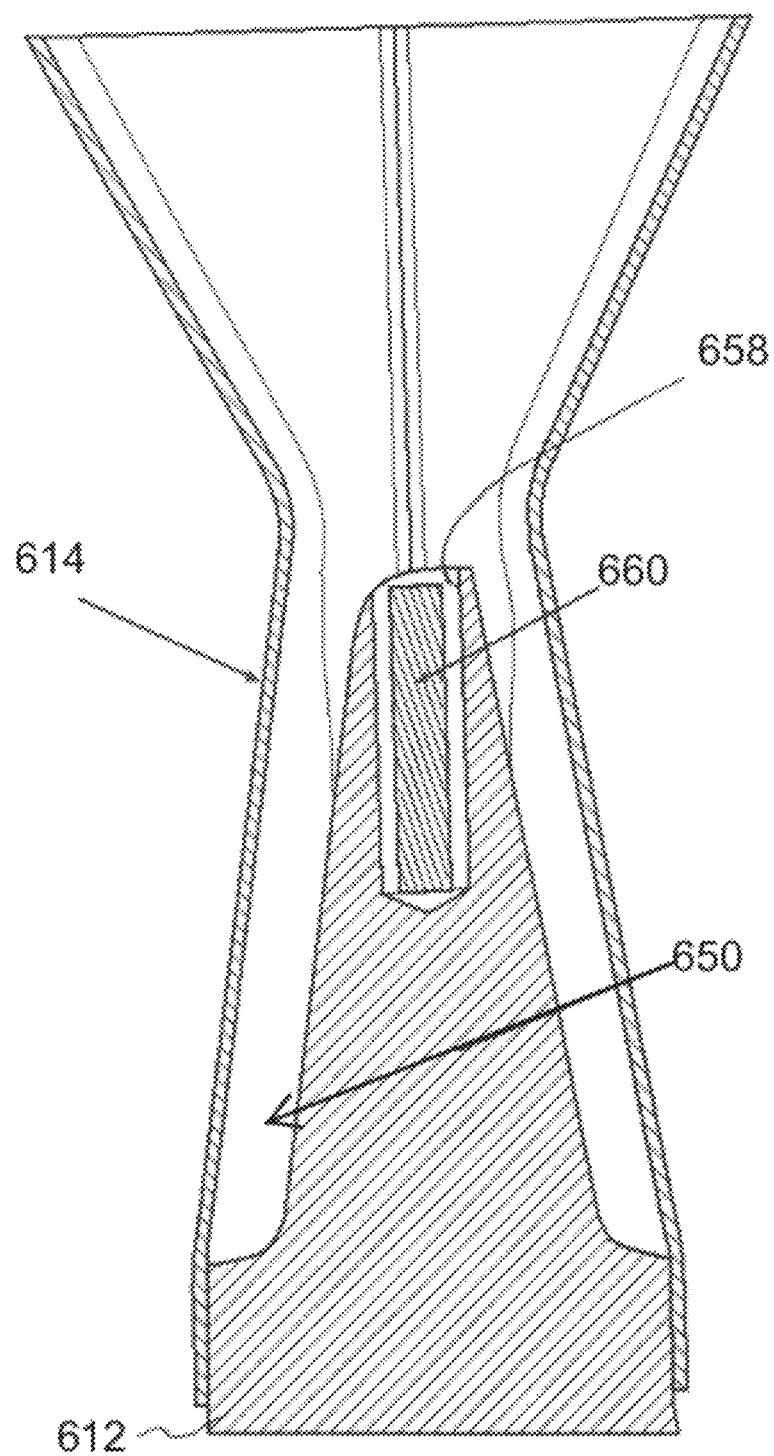
FIG. 36 is a cross sectional view of the embodiment of FIG. 35, taken generally along line 36-36 in FIG. 35.
Figure 37:
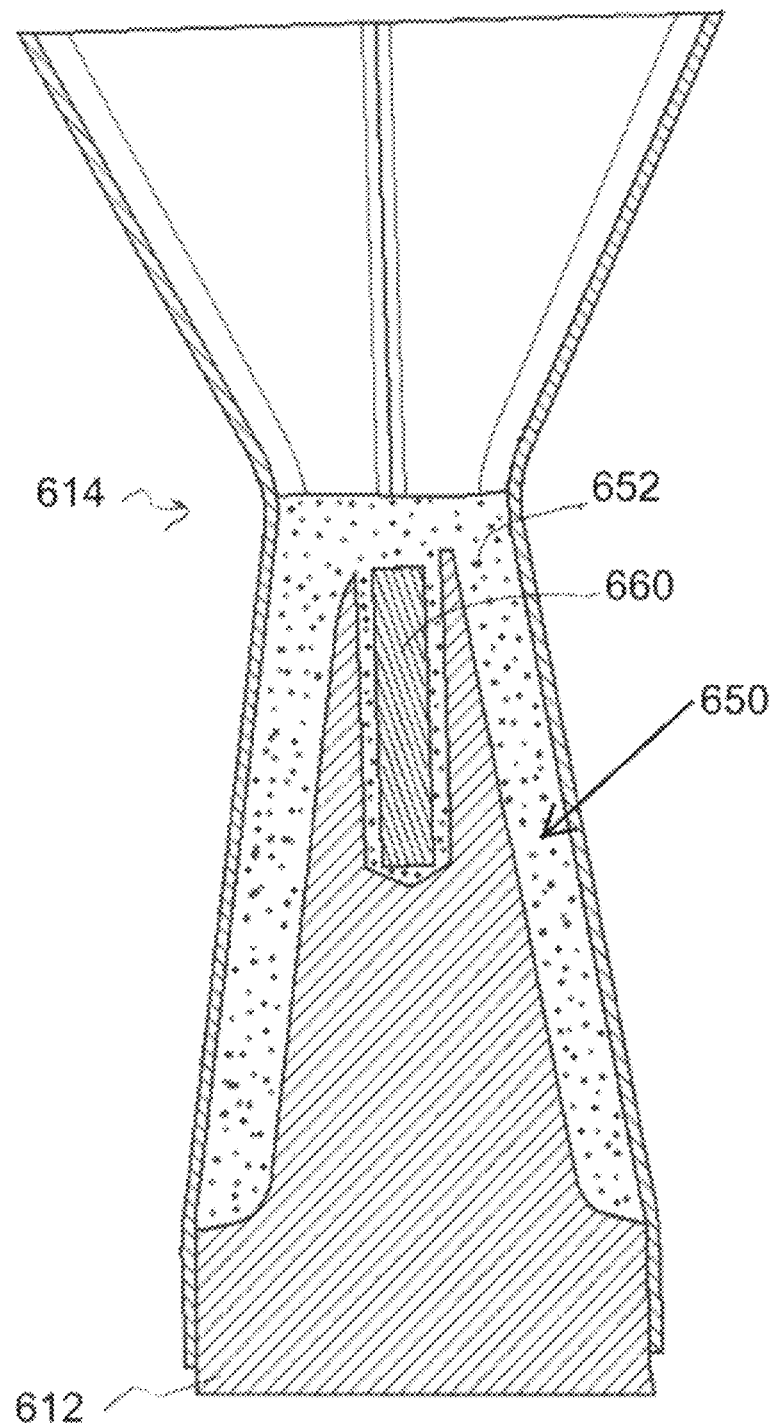
FIG. 37 is a cross sectional view of the embodiment of FIG. 36, with granular carbide particles filling a cavity defined between the substrate and the shell.
Figure 38:
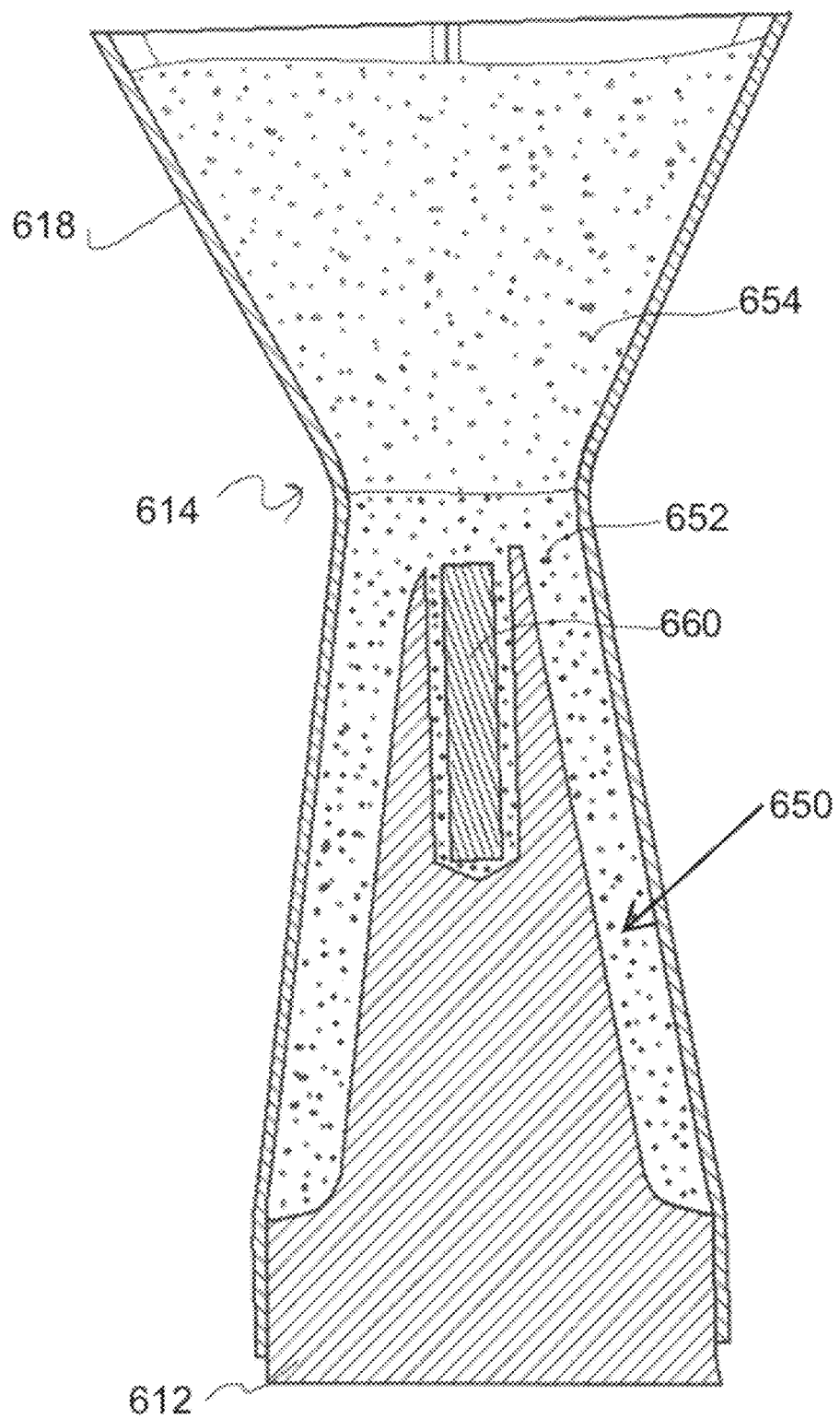
FIG. 38 is a cross sectional view of the embodiment of FIG. 37, with brazing material filling a reservoir formed by the shell, above the carbide particles.
Figure 39:
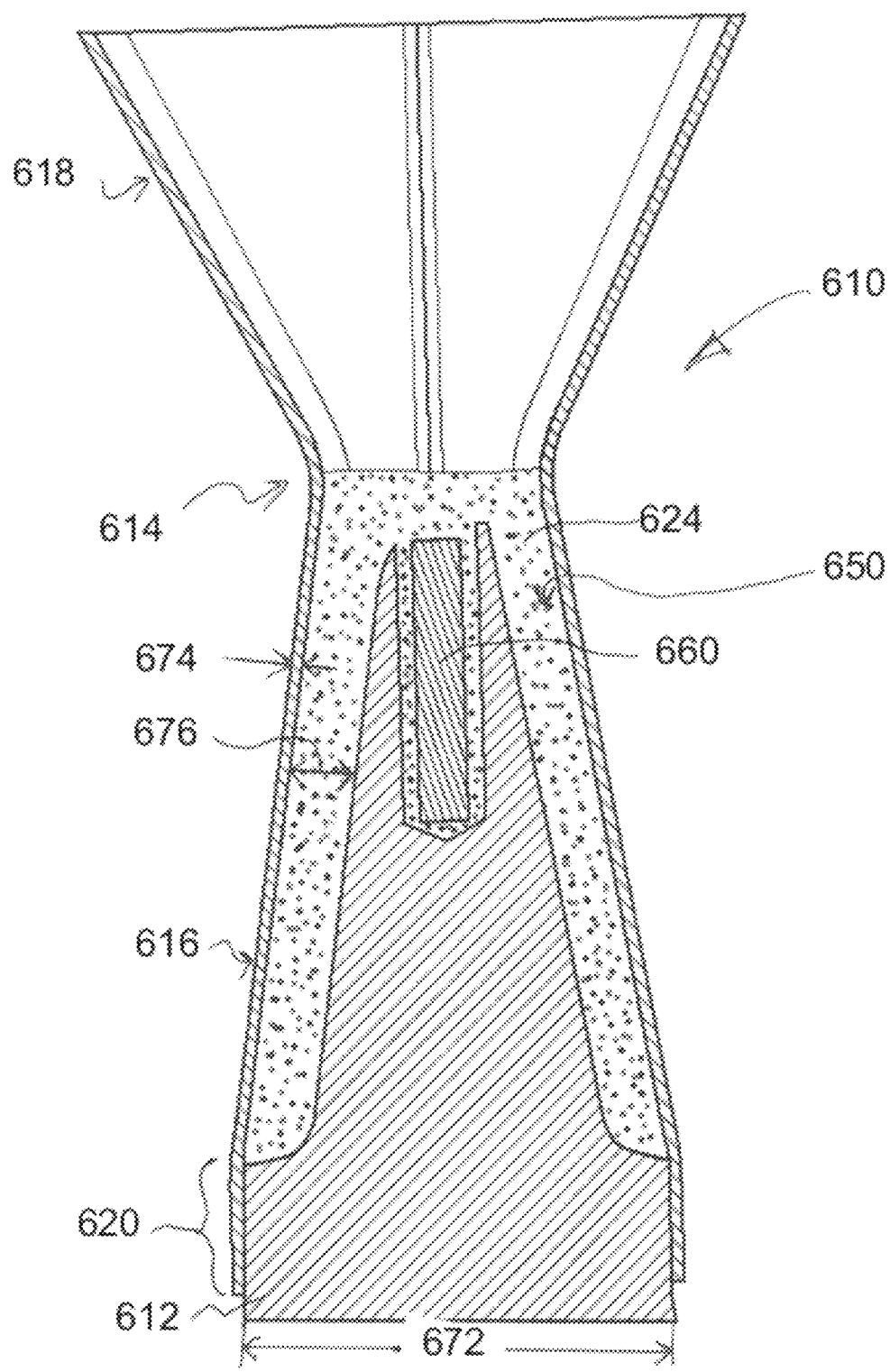
FIG. 39 shows a cross-sectional view of the embodiment of FIG. 35-38, after an infiltration brazing cycle with hardfacing material surrounding and protecting the substrate.

Yet another embodiment is shown schematically in FIG. 35, including a substrate 612 in the form of a point with three holes 658, but only a single insert 660 in a central one of holes 658, without any spacer. Filling a shell 614 with a mixture of hard particles and brazing material, and then heating and cooling this assembly through an infiltration cycle results in a hardfaced wearpart. FIGS. 36-39 show sections through the central one of holes 658, and illustrate processing steps through which hard metal insert 660 is bonded to hole 658, at the same time an external hardfacing is applied to substrate 612. These steps are represented in the cross-sectional views of FIGS. 36-39, with FIG. 39 showing a cross section of a finished hardfaced wearpart 610, including a layer of hardfacing material 624 surrounding and protecting a distal end of substrate 612. In other embodiments, the insert 660 may be received in a different hole 658 and/or the substrate 612 may include inserts 660 in multiple holes.

Approximate relative thicknesses are shown in FIG. 39 for substrate 612, shell 614, and layer of hardfacing material 624. For example, a thickness 672 is identified for substrate 612, a thickness 674 is identified for shell 614, and a thickness 676 is identified for layer of hardfacing material 624. Thickness 676 also represents a thickness for cavity 650. Sample values for these thicknesses are as follows:

Substrate Thickness 672 near conformal band: 3.450 inches;
Shell Thickness 674 throughout shell: 0.105 inches;
Hardfacing Thickness 676: 0.438 inches.

Figure 40:
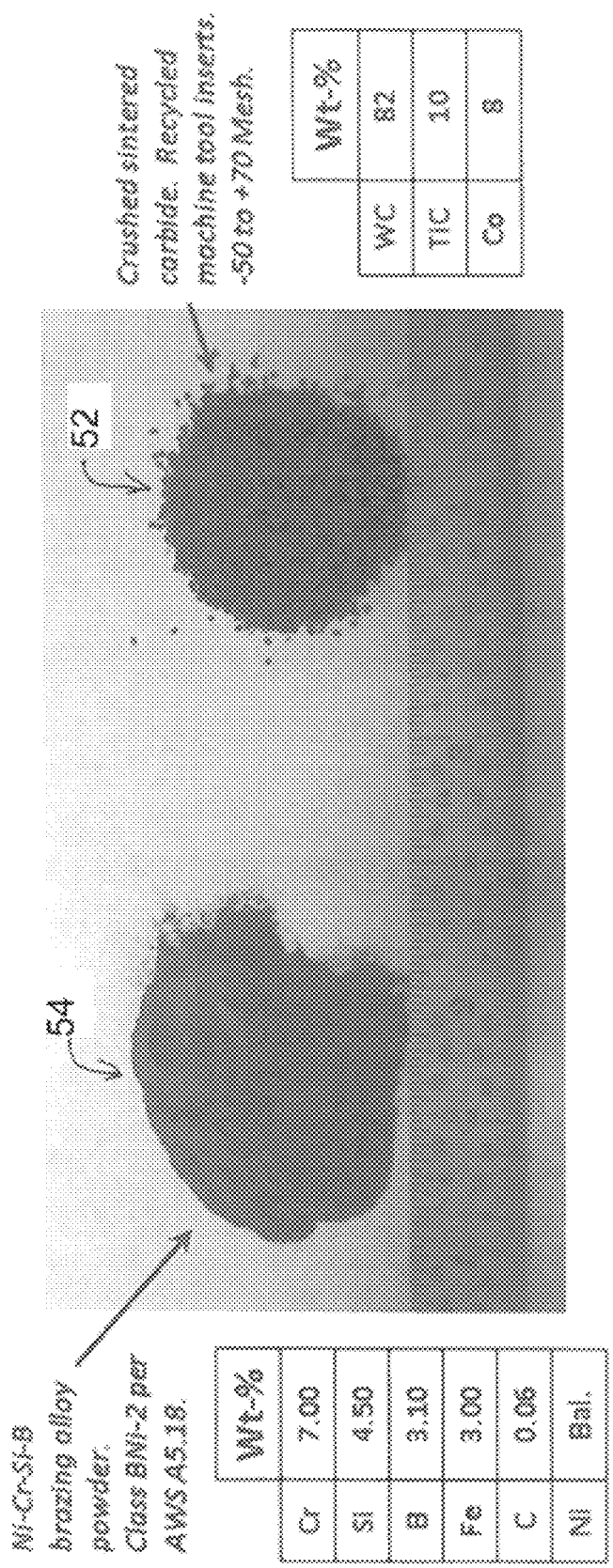
FIG. 40 is a photograph of granular carbide, on the right, and brazing alloy powder on the left.

FIG. 40 shows two powders, including granular carbide 52, on the right, and brazing alloy powder 54 on the left.

Tungsten carbide is one example of hard particles that are particularly well suited to use as part of a hard-faced wear part made according to the present disclosures. Pure carbides such as WC or WC/W$_2$C may be used, as well as mixtures of various carbides. Also, suitable granular material may be made from crushed sintered carbide material, such as recycled machine tool inserts. The most suitable size of the particulate material depends on the intended use of the wear part, but sizes in the range of −50 Mesh to +70 Mesh are suitable for many applications. The following alloy of tungsten carbide, titanium carbide, and cobalt has been found to produce particularly effective hard-faced wear parts such as mining points or tool tips:

| Formula | Wt-% | Notes |
|---|---|---|
| WC | 82 | W = Tungsten |
|  |  | C = Carbon |
| TiC | 10 | Ti = Titanium |
| Co | 8 | Co = Cobalt |

Other carbides that may be used as the hard particles in the composite material include cast tungsten carbide (WC/$W_2C$), tungsten monocarbide (WC), chromium carbide, titanium carbide, molybdenum carbide, vanadium carbide, columbium carbide, chrome white iron shot or grit, among other materials, including mixtures of such materials. As described above, the hard material may be used in a different form, such as a porous preform, a monolithic piece, or other structure. In a further embodiment, the hard material may be formed of a ceramic material. If a ceramic is used, one or more techniques may be incorporated to enhance wetting and/or bonding of the ceramic surface by the brazing material. For example, the surface of the ceramic may be coated with a metallic material or other material to enhance wetting by the brazing material. As another example, an active brazing technique may be used, where the brazing material includes a material that deposits on the ceramic surface (e.g. titanium) to enhance wetting and bonding of the brazing material to the ceramic surface. Still further types of hard materials may be used in other embodiments. As described above, the hard material may preferably have higher hardness and superior wear resistance to the surface of the substrate to which the hard material is bonded.

A particularly good choice of brazing alloy powder includes Ni—Cr—Si—B brazing alloy powder that conforms to Class BNi-2 per AWS A5.18.

|  | Wt-% |
|---|---|
| Cr | 7.00 |
| Si | 4.50 |
| B | 3.10 |
| Fe | 3.00 |
| C | 0.06 |
| Ni | Balance |

Other types of brazing materials may possibly be used, as long as such materials are compatible with both the substrate and the hard particles, and such materials are suitable for a particular brazing method. Brazing materials may include pure metals such as copper or silver, but are more typically standard brazing alloys having a nickel base, copper base, or silver base. Brazing materials may also include other copper-rich alloys, and low melting copper-nickel alloys. Other types of brazing materials that may be used include pure copper, silicon bronze, titanium copper, chromium copper, spinodal bronze, tin bronze, commercial nickel base brazing alloys (BNi-1, BNi-2, etc.), commercial cobalt base brazing alloys (e.g. BCo-1) or other types of brazing metals and alloys, including precious metals and alloys. As described above, the brazing material may be provided in powdered or other particulate form in one embodiment. The brazing material may be in a different (i.e. non-powdered) form in another embodiment. For example, in one embodiment, the brazing material may be in the form of one or more slugs of cast or wrought material. Such slugs may be made at a pre-determined weight targeted for a specific brazing application, providing quick and efficient installation of the brazing material in the assembly.

Figure 41:
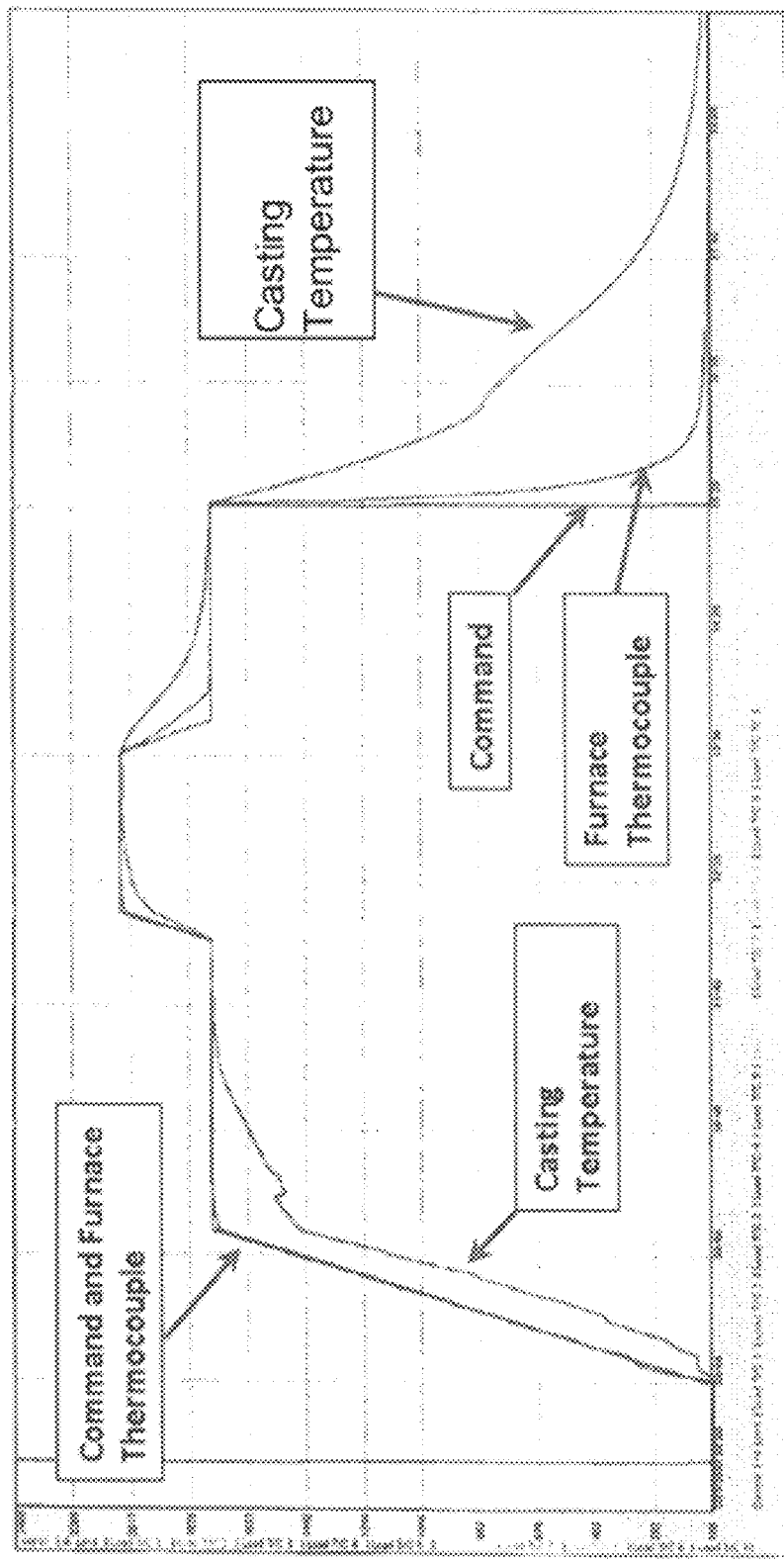
FIG. 41 is a graph representing a sample furnace cycle, with temperature along the vertical axis, and time along the horizontal axis.

FIG. 41 shows one example of a furnace cycle for the brazing operation using a hard material including tungsten carbide and Ni—Cr—Si—B brazing alloy powder, with temperature along the vertical axis. In general, the thermal cycle for the brazing operation involves first heating to a temperature slightly below the melting temperature of the brazing material and holding to stabilize the temperature in the entire assembly (including thick and thin sections). Then, the assembly is heated (preferably quickly) to a higher temperature above the melting point of the brazing material to melt the brazing material and allow it to infiltrate the spaces between the hard particles. This period may be relatively short, such as 30 minutes to 1 hour in one embodiment. The temperature is then cooled to just below the solidus temperature of the brazing material, to allow the brazing material to solidify and bond to the hard particles and the substrate, and holding until the temperature is stabilized throughout the assembly. Finally, the temperature is cooled so that the part can be removed from the furnace. It is understood that the length of time that temperatures must be held to stabilize throughout the assembly may be influenced by the size and geometry of the substrate and/or the shell, as larger/thicker components may need longer to heat or cool. The temperature of the furnace and castings (such as an assembly of a substrate, a shell, hard particles and brazing material) increases and then decreases over time, as shown. The sample furnace cycle of FIG. 41 takes approximately 7-hours, as represented along the horizontal axis, and the brazing step may be performed at approximately 2050° F. for 30-60 minutes in one embodiment.

Figure 42:
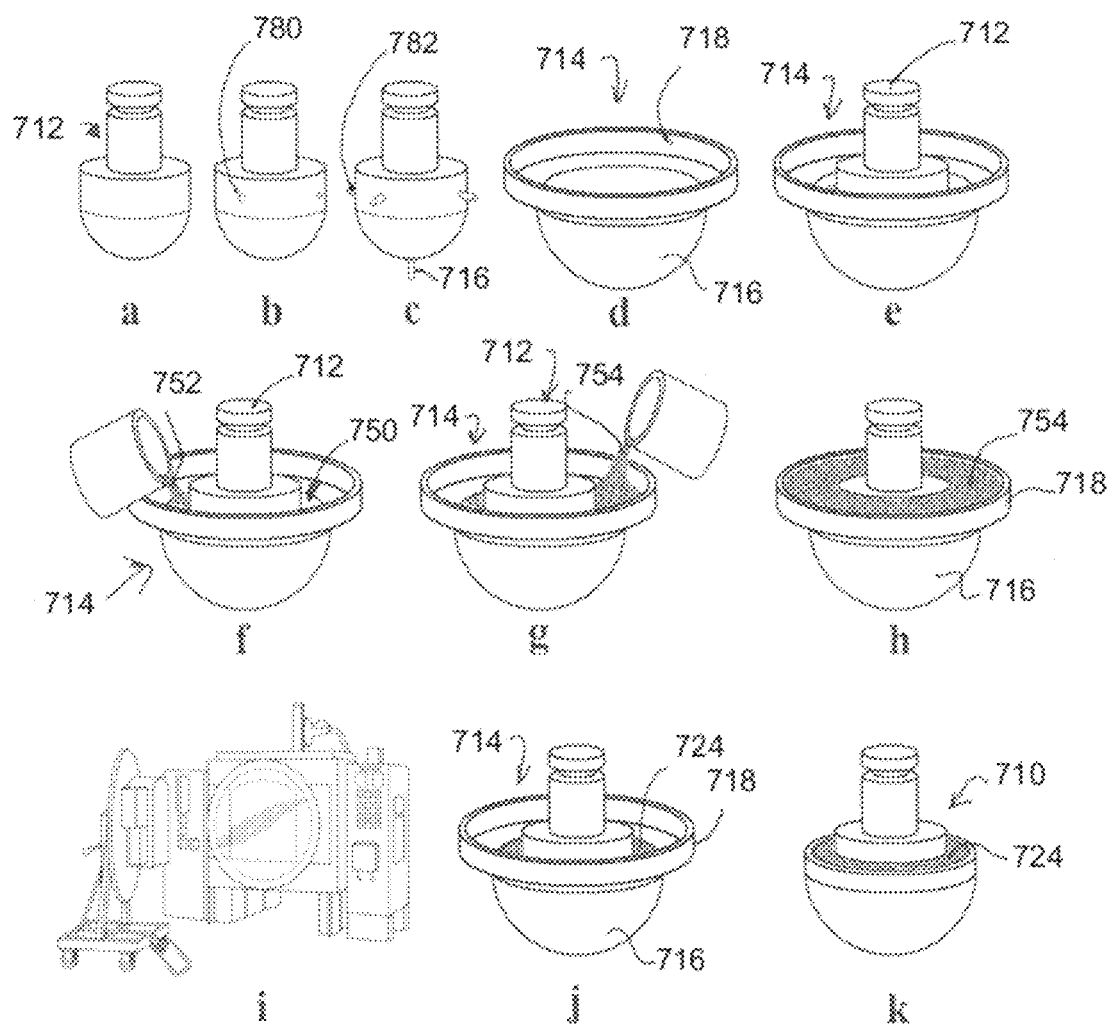
FIG. 42 shows multiple views, labeled a-k, as part of manufacturing another embodiment of a wearpart. The different drawings 42a-42k illustrate selected processing steps as part of infiltration hardfacing a dual roll crusher tip.

FIG. 42 shows multiple views, labeled a-k, as part of manufacturing another embodiment of a wearpart 710. The different drawings 42a-42k illustrate selected processing steps as part of infiltration hardfacing a dual roll crusher tip. The resulting hardfaced roll crusher tip has a substrate and thin metal shell substantially separated but bonded together by infused composite hardfacing material, with minimal contact between the substrate and the thin metal shell.

FIG. 42a shows a substrate 712, prepared by machining, casting or forging. Shell spacing pin holes 780 are drilled, formed, or shaped in substrate 712, as shown in FIG. 42b, and corresponding shell spacers in the form of pins 782 are installed in holes 780, as shown in FIG. 42c. Pins 782 will be used to suspend substrate 712 within a thin metal shell, with desired spacing between substrate 712 and the shell defined by a length of pins 782. The primary purpose of pins 782 is to keep shell 714 and substrate 712 properly spaced apart until cavity 750 is filled with hard particles 752. Pins 782 need only be large enough to survive this filling step of the methods disclosed herein. Accordingly, pins 782 may be made out of various materials, ranging from soft steel pins to pre-manufactured hardened sintered tungsten carbide pins.

FIG. 42d shows a sheet metal shell 714, which may be prepared by deep drawing, hydroforming, and/or cutting and welding, as is known in the art of forming sheet metal molds. Substrate 712, with protruding pins 782 is then placed inside shell 714, as shown in FIG. 42e. Turning to FIG. 42f, hard particles 752 may be placed in a cavity 750 defined between substrate 712 and shell 714, and optionally tamped, vibrated, or otherwise packed into cavity 750 to define a hard particle layer between substrate 712 and shell 714. In FIG. 42g, infiltrant material powder 754 is shown being placed above this hard particle layer, held within a predefined volume in a reservoir 718, preferably formed as an integral portion of shell 714. Reservoir 718 may be sized relative to cavity 750 to provide an optimal quantity of infiltration brazing material 754 to infiltrate and bond hard particles 752 into a composite hardfacing layer. This is represented graphically in FIG. 42*h*, with an assembly ready for an infiltration cycle.

FIG. 42*i* shows a furnace ready for an infiltration cycle, such as described above. FIG. 42*j* shows the assembly of FIG. 42*i*, after infiltration cycle complete (j), with reservoir 718 still in place. Preferably, reservoir 718 is removed from shell 714, by cutting or other techniques, leaving a finished wear-resistant composite product 710, as shown in FIG. 42*k*.

While shell 714 is shown with a spherical lower surface that will typically need to be held in a fixture, other embodiments of a similarly shaped shell may be self-supporting. Furthermore, shell spacing pins 782 may be omitted if substrate 712 is held by a heat-resisting alloy fixture which also locates shell 714 in a desired position relative to substrate 712. Substrate 712 is thereby suspended above and within sheet metal shell 714 during the infiltration process. In yet other embodiments, any such fixture which locates shell 714 in a desired position relative to substrate 712 may be removed after hard particles 752 are packed into place. Hard particles 752 generally do not dissolve or melt during the infiltration process, so hard particles 752 will reliably support substrate 712 during the infiltration process. This allows such fixtures to be removed before placing any assembly of the components in a furnace, such as an assembly of substrate 712, shell 714, hard particles 752, and brazing material 754. Still other embodiments may hang shell 714 from substrate 712. For example, shell 714 could be made so as to hang from a groove, not shown, in a stem of a hub formed as part of substrate 712.

Methods according to the present disclosure may be used with a furnace or retort that employs an atmosphere of hydrogen, argon, or other type of reducing or inert atmosphere, instead of a vacuum furnace. When brazing in such non-vacuum furnaces, it is best to prevent entrapment of gas within the hard particles, as infiltration proceeds. The brazing powder may melt fairly simultaneously, percolating down as a contiguous molten layer, through the hard particles. Adding venting at low points in the thin shell allows gases trapped in the hard particles to escape as the molten brazing material percolates down. Preferably, a vent tube or multiple vent tubes are attached to the thin metal shell at appropriate low points, and the tube or tubes extend upward to a level higher than a final level of molten brazing material during final stages of infiltration brazing.

Figure 43:
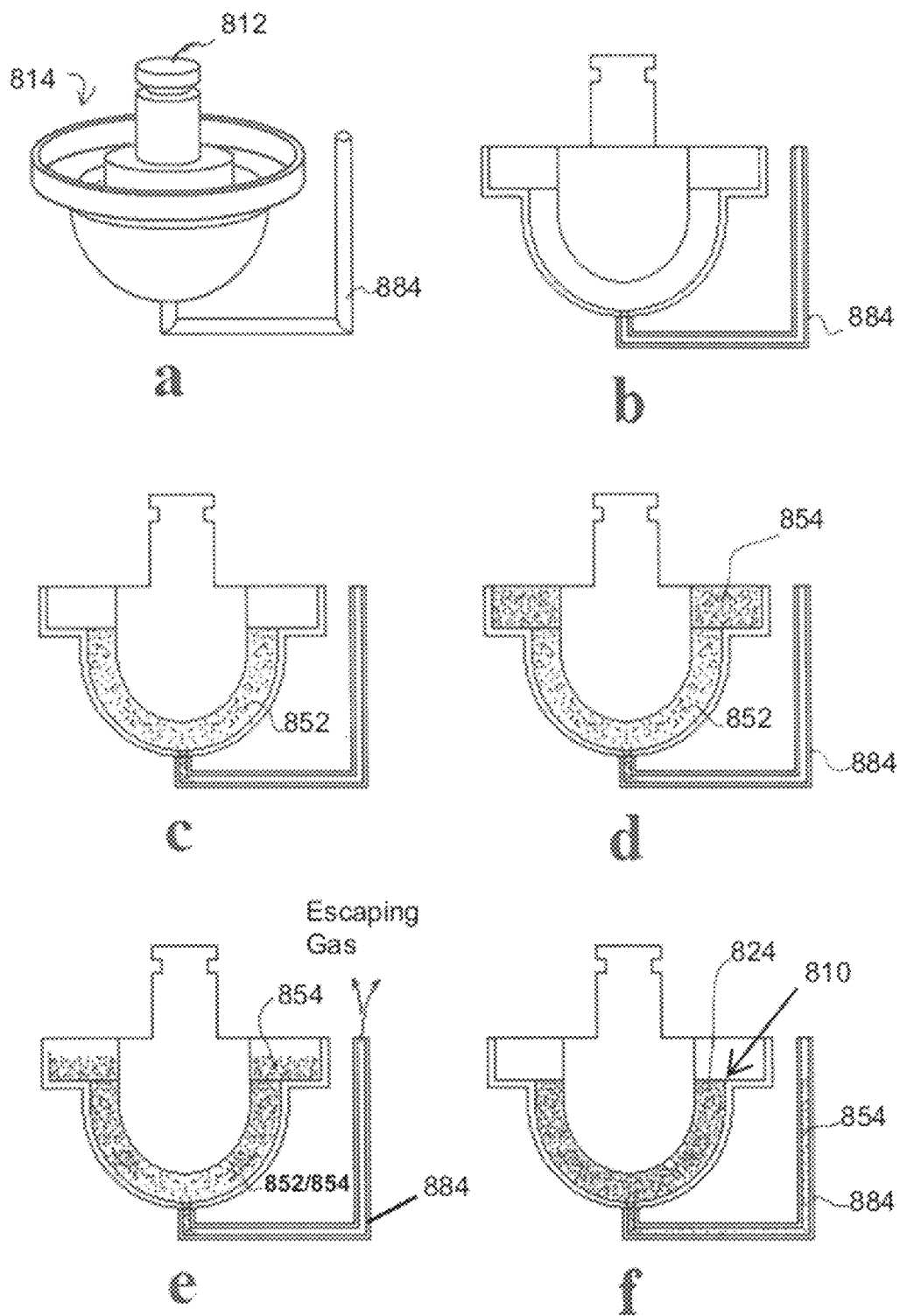
FIG. 43 shows multiple views, labeled a-f, as part of manufacturing another embodiment of a wearpart. The different drawings 43a-43f illustrate selected processing steps as part of infiltration hardfacing a dual roll crusher tip, using a shell formed with a venting tube.

One embodiment of a steel shell 814 for use in non-vacuum furnaces is shown in FIGS. 43*a*-43*f*. A vent tube 884 extends from a low point of shell 814 to prevent gas entrapment during brazing infiltration. Vent tube 884 is attached to shell 814 at a site or sites subject to gas entrapment. FIG. 43*b* represents a cross-sectional view of substrate 812, shell 814, and vent tube 884. Hard particulate material 852 is poured into cavity 850, between substrate 812 and shell 814, as shown in FIG. 43*c*. Infiltrant material 854 is then added above hard particle layer 852, as shown in FIG. 43*d*. Molten infiltrant material 854 is shown partially penetrating layer of hard particles 852, with gas escaping from vent tube 884, in FIG. 43*e*. After cooling, the hard particle layer and infiltrant material form a composite 824, with at least some of infiltrant material 854 filling vent tube 884, as shown in FIG. 43*f*. Vent tube 884 and infiltrant material 854 are typically easily cut off the resulting hard-faced wearpart 810.

Figure 44:
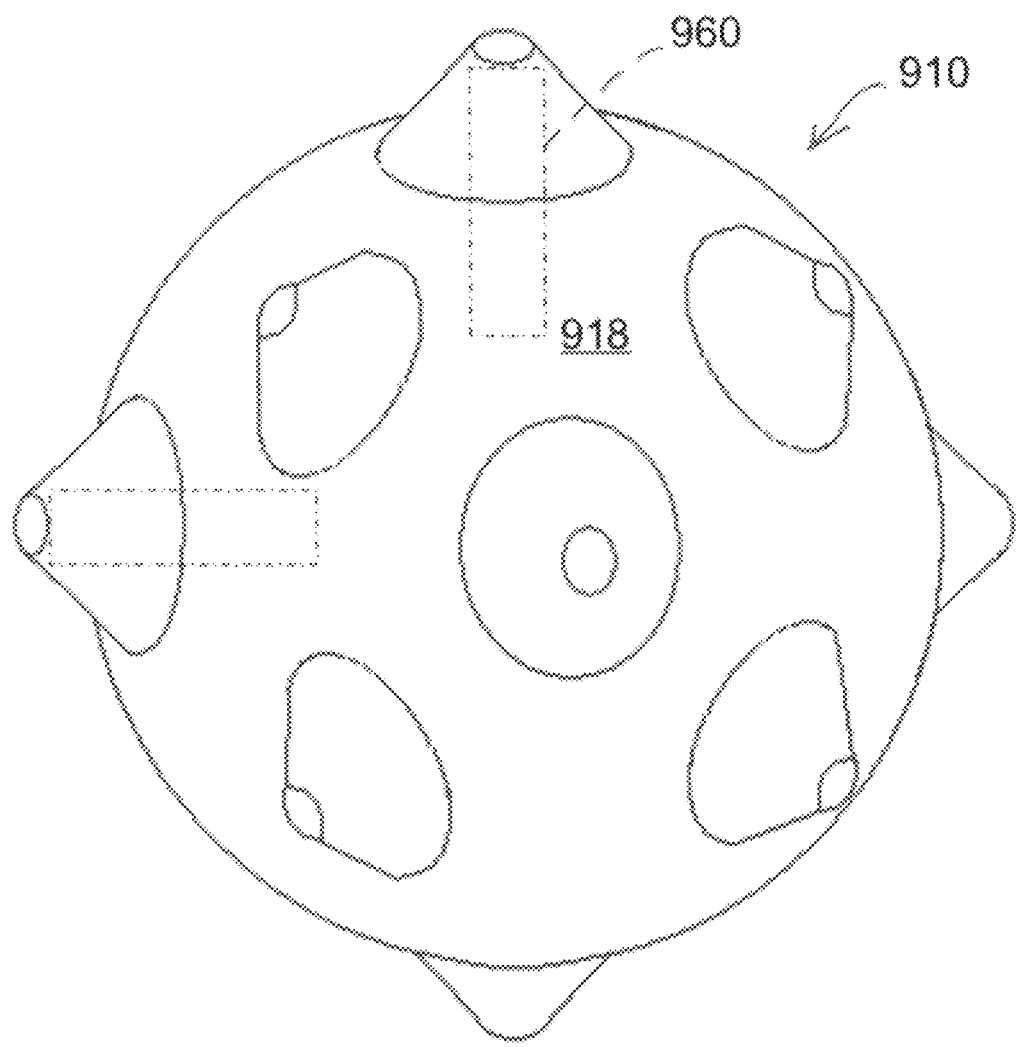
FIG. 44 shows a perspective view of another embodiment of a hardfaced wearpart, with a spherical structure having a particularly complex surface shape.

FIG. 44 shows a spherical structure having a particularly complex surface shape. This wear part is not intended to represent any particular tool, other than to show a complex tool that could be hardfaced according to the disclosures herein. For example, it could represent an infiltration hardfaced grinding ball with a particularly complicated exterior shape. A finished wear-resistant composite product 910 includes pre-manufactured hardened sintered tungsten carbide inserts, two of which are shown schematically as dashed lines 960, bonded to an underlying substrate with infused composite hardfacing material. Manufacture of grinding ball 910 using prior art techniques would require a complicated multi-piece mold, probably made using graphite or ceramic materials. The combination of a thin sheet metal mold, a preformed substrate, hardened carbide particles, and infiltration brazing creates a much more economical process for manufacturing hard-faced tools with complicated surface geometry.

Figure 45:
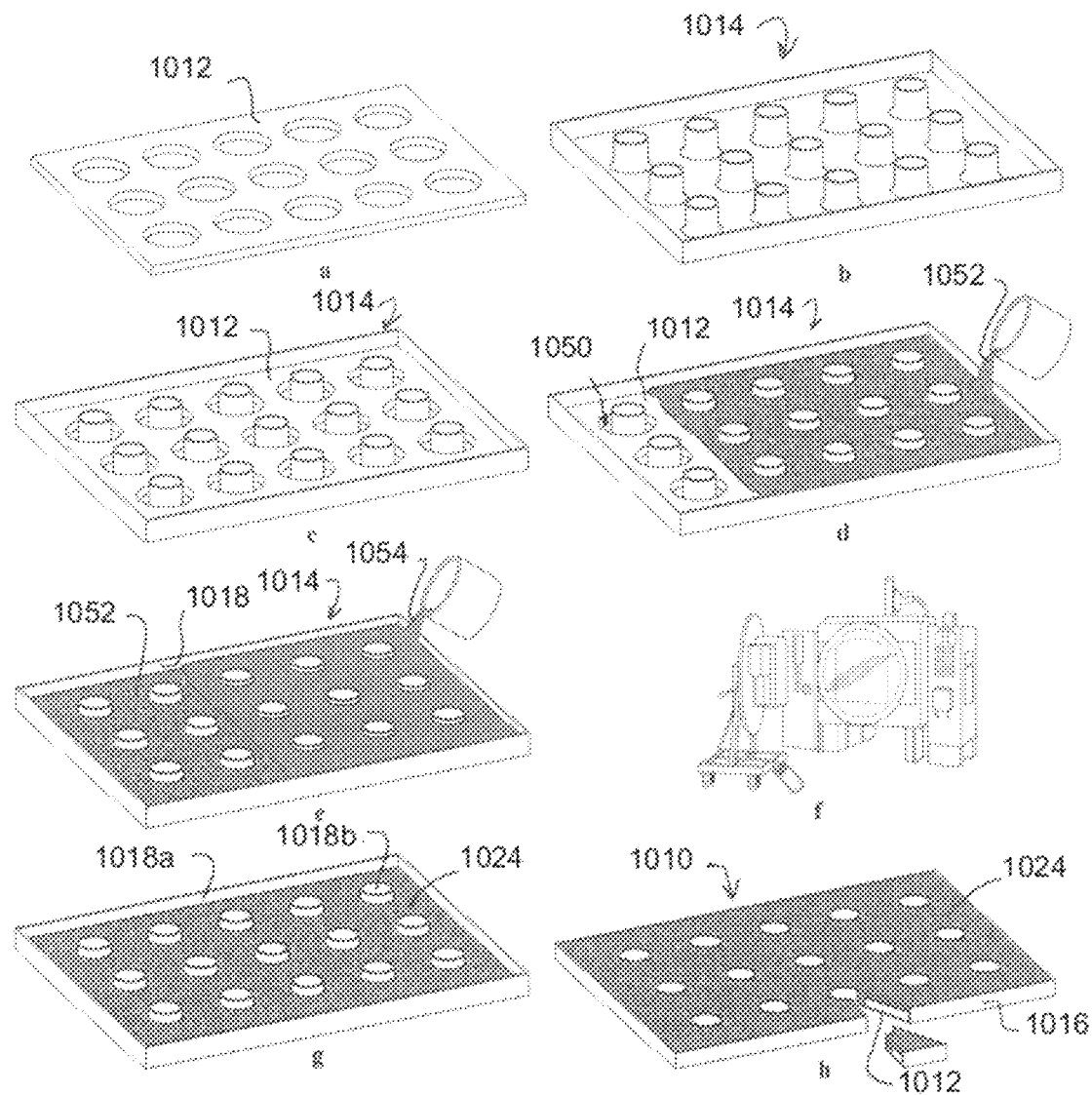
FIG. 45 shows multiple views, labeled a-k, as part of manufacturing another embodiment of a wearpart. The different drawings 45a-45k illustrate selected processing steps as part of infiltration hardfacing a trammel screen for use in mineral dressing.

FIG. 45 shows multiple views, labeled a-k, as part of manufacturing another embodiment of a wearpart 1010. The different drawings 45*a*-45*k* illustrate selected processing steps as part of infiltration hardfacing a trammel screen for use in mineral dressing. The resulting hardfaced trammel screen may have a substrate and thin metal shell substantially separated but bonded together by infused composite hardfacing material, with minimal contact between the substrate and the thin metal shell. Alternatively, the substrate and thin metal shell may contact in selected locations, with the shell supporting the substrate during an infiltration cycle. For example, a plurality of shoulders (not shown) may be formed in selected locations of shell 1014, and substrate may rest on and be supported by these shoulders. In other examples, conformal bands or conformal portions (not shown) of shell 1014 may be welded to substrate 1012.

FIG. 45*a* shows a substrate 1012, typically prepared by machining, casting or forging. FIG. 45*b* shows a corresponding shell 1014, and substrate 1012 is shown supported in shell 1014 in FIG. 45*c*. Pins (not shown) may be used to suspend substrate 1012 within thin metal shell 1014, with desired spacing between substrate 1012 and shell 1012 defined by a length of the pins (not shown) as similarly shown in FIG. 42.

FIG. 45*d* shows hard particles 1052 being poured onto substrate 1012. Hard particles 1052 may be pushed into a cavity 1050 defined between substrate 1012 and shell 1014, and optionally tamped, vibrated, or otherwise packed into cavity 1050 to define a hard particle layer between substrate 1012 and shell 1014. In FIG. 45*e*, infiltrant material powder 1054 is shown being placed in a reservoir 1018, above hard particle layer 1052. FIG. 45*f* shows a furnace ready for an infiltration cycle. FIG. 45*g* shows the assembly of FIG. 45*e*, after being fully loaded with an appropriate amount of infiltrant material powder, and after being heated and cooled through a complete infiltration cycle. Preferably, selected portions of the sheet metal are removed from shell 1014, by cutting or other techniques, leaving a finished wear-resistant composite product 1010, as shown in FIG. 45*h*. For example, upper edges 1018*a* of a surrounding wall may be cut off, and upper caps 1018*b* defining through-holes may be cut off.

If appropriate choices are made regarding the substrate material for a tool, the shell material, and the brazing material, as well as the type and size distribution of the particulate material in the hardfacing layer, it is possible to accommodate thermal and transformation strains so as to prevent cracking of the hardfacing layer, as well as any hard metal insert. In one embodiment, the brazing process may be designed so that the infiltrated material has an overall coefficient of thermal expansion that is between the coefficient of thermal expansion of the hard particles and the coefficient of thermal expansion of the substrate. For example, many of the embodiments disclosed herein include a product having a steel substrate and a mild steel shell, with a hardfacing layer of infiltrated cast tungsten carbide particles. Certain steels have a coefficient of thermal expansion of approximately 6.5 microinches per inch per degree-F. at temperatures below the austenite range, as found for AISI 1008 Steel. Selecting copper or copper-based alloys as the infiltrating material and selecting a particle size distribution giving 50% cast tungsten carbide will give an average coefficient of thermal expansion of 6.1 microinches per inch per degree-F. in the infiltrated material. Providing infiltrated material having an average coefficient of thermal expansion that is relatively similar to a coefficient of thermal expansion for the underlying substrate and the outer layer of sheet metal means that all of the components will expand and contract at approximately similar rates. This limits any tendency of the infiltrated material to crack or spall, particularly during cooling after the infiltration cycle, or during heating that may occur later, in use of the hardfaced tool.

Trommel screens such as the example illustrated in FIG. 45h can often exceed 1 meter in the length and width dimensions. Items such as this offer a clear illustration where the present invention can offer significant advantages in terms of overcoming thermal expansion problems during the infiltration process. Hard materials which might be selected for wear resistance may have thermal expansion characteristics which differ markedly from those of the hardened steel materials which might be used as a substrate, the low-carbon steel materials which might be used as an expendable shell, or the copper-nickel brazing alloy which might be used as a brazing material. As these items get larger, such as 1 meter in the length and width, thermal expansion rates of different elements become more important.

Ceramic and graphite molds have rates of thermal expansion that are very different from the rate of thermal expansion for the types of steel alloy typically used as a substrate for wear parts. This can lead to problems such as distortion of the finished part, unexpected variations in hardfacing thickness, or even to separation of various parts of the mold assembly during the thermal process, allowing the molten infiltrating material to spill in the furnace. The low-carbon steel materials of the present disclosure are more likely to have rates of thermal expansion that are more similar to the rate of thermal expansion for the types of steel alloy typically used as such a substrate. Thus, the combination of a steel alloy substrate, a low carbon steel thin metal shell, hard particles having a particle size distribution giving approximately 50% cast tungsten carbide, and copper as an infiltrating material offers a significant advantage over prior art hardfacing of steel substrates that required use of ceramic and graphite molds.

The following table gives several examples of coefficients of thermal expansion for selected hard materials, for low carbon steel (a typical shell material), and copper (a typical brazing material). It is understood that this table provides examples for the sake of illustration and other materials may be used as the hard material, the shell, the brazing material, etc.

| Material | Thermal Expansion Coefficient (Microinches/in/° F.) |
|---|---|
| Macrocrystalline Tungsten Carbide (WC) | 3.6 |
| Cast Tungsten Carbide (WC/W$_2$C) | 2.9 |
| Chromium Carbide (Cr$_3$C2) | 5.7 |
| Titanium Carbide | 4.1 |
| Diamond | 2.1 |
| AISI 1008 Steel | 6.5 |
| Copper | 9.2 |

The combination of a steel substrate, a thin metal shell, and a properly selected mixture of hard particles having a specific size distribution, and an infiltrating material, results in substantial benefits. This combination offers a greater ability to accommodate thermal and transformational strains, and the resulting dimensional changes, particularly when compared to conventional graphite or ceramic molds. The products and methods of the present disclosure lead to less risk of warping, less risk of unwanted thickness variations in the resulting hardfacing, and less risk of a damaged mold spilling molten metal brazing material inside a furnace during an infiltration cycle.

In addition, materials such as steel undergo phase transformations which are accompanied by dimensional changes. For example, when dealing with carbon and low alloy steels, the steel expands with increasing temperature. However, at approximately 1333 degrees-F., transformation of the steel to a different crystal structure begins. This transformation results in a decrease in dimensions until the transformation is complete and then the material again expands (at a different rate) with further increase of temperature. On cooling, transformations again occur, with associated expansion-contraction-expansion of dimensions, until the infiltration cycle is complete. Accommodating all of these expansions and contractions is easier with the disclosed methods using a thin metal shell as a mold, than when using a graphite mold or ceramic mold. With the methods of the present disclosure, both the substrate to be hardfaced and the mold containing the components of the hardfacing material are made out of steel, so both the substrate and the shell will be going through similar transformations, expansions, and contractions. While there may be some variations as to coefficients of thermal expansion and transformation temperatures, these variations for a thin metal mold and a metal substrate are substantially less than such variations for a graphite mold or ceramic mold and a metal substrate. It is therefore very difficult to use a graphite mold or a ceramic mold with a metal substrate to make a large, planar Trommel screens such as the example illustrated in FIG. 45h, without substantial risk of cracking and/or spalling of the hardfacing coating.

Furthermore, if the particulate material is intended to perform a wear-resisting function, consideration of the particle size distribution may be required in order to give adequate wear resistance. For such cases in general, the size distribution must be such that the interparticle spacing is smaller than the size of the abrasive grains encountered in the application. This prevents the hard particles from being undermined and lost. In one embodiment, a particle size of −50 to +70 mesh (as described above) may be sufficient for most applications, such as if the abrasive grains in the application are not appreciably smaller than 70 mesh. For finer abrasives, the particle size distribution should be sized approximately the same or smaller than the abrasive size.

The disclosed embodiments may also be utilized to renew or refurbish a worn, previously used hardfaced wearpart. For example, in one embodiment, a shell as described above is connected to a substrate in the form of a hardfaced wearpart, and the hard material (e.g. hard particles) is introduced into the shell to be in close proximity to the substrate. The hard material can then be bonded to the substrate by brazing as described above. It is understood that the brazing material may be bonded to the pre-existing (worn) hardfacing material, the underlying original substrate, or both. The hard material and/or the brazing material may be the same as used in the original hardfacing material in one embodiment.

Several of the disclosed embodiments show a steel substrate used to form a wearpart, with hard material covering the entire or substantially the entire outer operating surface (e.g. the ground engaging surface) of the wearpart. This may allow use of softer steel, because the entirety of the steel is protected by hardfacing material. These embodiments offer advantages, particularly if softer steel has better resistance to fracturing, such as where softer steel has a higher toughness than other harder steels. Softer substrate materials may also have better weldability. Furthermore, softer substrate materials are usually much easier to make into an initial substrate to be hardfaced, and such initial substrates made of softer steels are therefore less expensive to make that similarly shaped initial substrates made from harder steels.

It should be understood that the shell in any of the disclosed embodiments does not necessarily need to closely conform to the exact shape of the substrate. For instance, the shell could be formed so as to give greater thicknesses at high-wear locations such as corners or angular edges of points. Similarly, "ribs" or "vanes" could be created by the resulting hardfacing layer, at particular locations on the substrate of the tool. Such ribs or vanes may be helpful for controlling the flow of abrasive material in which the component may be operating, or for directing movement of earthen material being impacted by the resulting composite wear-resistant tool.

It should also be understood that any features, components, structures, techniques, etc., that are described with respect to one embodiment herein may be used or usable in connection with any other embodiments described herein, unless explicitly noted otherwise.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A wear part for earth engaging equipment comprising:
    a substrate including a base portion for attachment to the earth engaging equipment and a working portion for engaging earthen material during operation of the earth engaging equipment, the working portion including a surface;
    an expendable sheet metal shell connected by welding or brazing to the substrate, a portion of the sheet metal shell being spaced from the substrate to define a cavity between the surface of the substrate and the shell; and
    a composite material substantially filling the cavity and forming a coating on at least a portion of the surface of the substrate, the composite material comprising a hard particulate material infiltrated with a metallic brazing material, wherein the composite material is bonded to the surface of the substrate and the shell.

2. The wear part of claim 1, wherein the shell includes a conformal band around an entire periphery of the shell in surface-to-surface contact with the substrate, and the shell is connected to the substrate by welding or brazing at least along the conformal band.

3. The wear part of claim 2, wherein the substrate has a bonding surface in surface-to-surface contact with the conformal band, and at least a portion of the substrate within the cavity is inset with respect to the bonding surface such that the composite material has an outer surface that is generally flush with the bonding surface.

4. The wear part of claim 1, wherein the particulate material comprises tungsten carbide, and the metallic brazing material comprises a Ni—Cr—Si—B brazing alloy.

5. The wear part of claim 1, wherein the substrate has a hole in the surface and an insert rod in the hole, and wherein the hole and the rod are covered by the composite material.

6. The wear part of claim 1 wherein the sheet metal shell substantially surrounds the substrate.

7. The wear part of claim 1 wherein the substrate includes a first surface over which the composite material is received and a second surface adjacent the first surface to which the sheet metal shell is secured, and wherein the first surface is recessed relative to the second surface such that the composite material is generally flush with the second surface.

8. The wear part of claim 1 wherein the base portion includes a cavity for mounting the substrate on the earth engaging equipment.

9. The wear part of claim 8 wherein the working portion includes a narrowing bit to facilitate digging, and the sheet metal shell and the composite material overlie at least a portion of the bit.

10. The wear part of claim 1 wherein the working portion includes a plurality of surfaces facing in different directions that are each at least partially covered by the composite material.

11. The wear part of claim 1 wherein the composite material is a continuous and uninterrupted coating on the surface of the working portion.

12. The wear part of claim 1 wherein the working portion includes a front end that faces in the direction of movement of the wear part relative to the earthen material during operation of the earth engaging equipment, and the composite material and the shell overlie and cover the front end.

13. A hardfaced wear part for earth engaging equipment comprising:
    a tool including a mounting structure for attaching to the earth engaging equipment, a working portion for interacting with earthen materials during operation of the earth engaging equipment, a coated surface on the working portion, and a bonding surface located proximate the coated surface;
    a composite hardfacing material forming a coating on the coated surface, the composite hardfacing material comprising a hard particulate material infiltrated with a metallic brazing material, wherein the metallic brazing material is bonded to the coated surface to connect the composite hardfacing material to the tool; and a sheet metal shell in contact with, bonded to and surrounding the composite material, the shell having a conformal band in contact with the bonding surface of the tool, wherein the shell is connected to the tool by welding or brazing at least between the conformal band and the bonding surface.

14. The hardfaced wear part of claim 13, wherein the particulate material comprises tungsten carbide, and the metallic brazing material comprises a Ni—Cr—Si—B brazing alloy.

15. The hardfaced wear part of claim 13, wherein the tool has a hole in the surface and an insert rod in the hole, and wherein the hole and rod are covered by the composite hardfacing material.

16. The hardfaced wear part of claim 13 wherein the coated surface is recessed relative to the bonding surface such that the composite hardfacing material is generally flush with the bonding surface.

17. The hardfaced wear part of claim 13 wherein the mounting structure includes a cavity for mounting the tool on the earth engaging equipment.

18. The hardfaced wear part of claim 17 wherein the coated surface includes a narrowing bit to facilitate digging, and the sheet metal shell and the composite hardfacing material overlie at least a portion of the bit.

19. The hardfaced wear part of claim 13 wherein the coated surface includes a plurality of walls facing in different directions that are each at least partially covered by the composite hardfacing material.

20. The hardfaced wear part of claim 19 wherein the composite hardfacing material is a continuous and uninterrupted coating on the plurality of walls.

21. The hardfaced wear part of claim 13 wherein the tool includes a front end that faces in the direction of movement of the wear part relative to the earthen material during operation of the earth engaging equipment, and the composite material and the shell overlie and cover the front end.

22. A ground-engaging wear part for ground engaging machinery comprising:

a substrate having a mounting structure for attaching to the ground engaging machinery, and a working portion for interacting with earthen materials during operation of the ground engaging machinery, the working portion having a surface;

a wear resistant composite material including a hard particulate material infiltrated by a metallic brazing material bonded to the surface of the substrate and forming a coating on the surface; and a sheet metal shell connected to the substrate by welding or brazing to form a mold with the substrate and define a cavity between the surface and the shell, the substrate and the shell being cooperatively configured to contain the hard particulate material and the brazing material during infiltration of the hard particulate material, wherein the composite material is bonded to the shell.

23. The ground-engaging wear part of claim 22, wherein the shell extends around an entire periphery of the substrate.

24. The ground-engaging wear part of claim 22, wherein the substrate has a hole in the surface, and an insert rod received in the hole.

25. The ground-engaging wear part of claim 22 wherein the substrate includes a first surface over which the composite material is received and a second surface adjacent the first surface to which the sheet metal shell is secured, and the first surface is recessed relative to the second surface such that the composite material is generally flush with the second surface.

26. The ground-engaging wear part of claim 22 wherein the mounting structure includes a cavity for mounting the substrate on the ground engaging machinery.

27. The ground-engaging wear part of claim 26 wherein the working portion includes a narrowing bit to facilitate digging, and the sheet metal shell and the composite material overlie at least a portion of the bit.

28. The wear part of claim 22 wherein the substrate includes a plurality of surfaces facing in different directions that are each at least partially covered by the composite material.

29. The wear part of claim 22 wherein the composite material is a continuous and uninterrupted coating on the surface of the substrate.

30. The wear part of claim 22 wherein the working portion of the substrate includes a front end that faces in the direction of movement of the wear part relative to the earthen material during operation of the earth engaging equipment, and the composite material and the shell overlie and cover the front end.

31. A wear part for earth engaging equipment comprising:

a substrate including a mounting structure for attaching to the earth engaging equipment, an operating portion to engage the ground during operation of the earth engaging equipment, a first surface and a second surface proximate the first surface, the operating portion including at least the first surface, and the first surface being recessed relative to the second surface;

a metal shell connected to the substrate by welding or brazing to the second surface to define a cavity between the first surface of the substrate and the shell; and a composite material substantially filling the cavity and forming a coating on the first surface of the substrate, the composite material comprising a hard particulate material infiltrated with a metallic brazing material that is bonded to the first surface and the shell, the composite material including an outer surface that is generally flush with the second surface.

32. The wear part of claim 31, wherein the shell includes a conformal band around an entire periphery of the shell in surface-to-surface contact with the second surface of the substrate, and the shell is connected to the substrate by welding or brazing at least along the conformal band.

33. The wear part of claim 31, wherein the shell has a conformal band conforming to at least a portion of the second surface.

34. The wear part of claim 31 wherein the first surface of the substrate includes a plurality of walls facing in different directions that are each at least partially covered by the composite material.

35. The wear part of claim 31 wherein the composite material is a continuous and uninterrupted coating on the first surface.

36. The wear part of claim 31 wherein the shell is formed of sheet metal.

37. The wear part of claim 31 wherein the shell substantially surrounds the substrate.

38. The wear part of claim 31 wherein the mounting structure includes a cavity for mounting the wear part on the earth engaging equipment.

39. The wear part of claim 38 wherein the operating portion includes a narrowing bit to facilitate digging.

40. The wear part of claim 31 wherein the substrate includes a front end that faces in the direction of movement of the wear part relative to the earthen material during operation of the earth engaging equipment, and the composite material and the shell overlie and cover the front end.

41. A wear part for earth engaging equipment comprising:
- a substrate having a base portion to attach to the earth engaging equipment and a working portion to engage earthen materials;
- a shell including a securing portion secured directly to the substrate by welding or brazing, and a containing portion spaced from the substrate, wherein the shell defines a mold with the substrate; and
- a composite material including a hard particulate material infiltrated by a metallic brazing material contained within the containing portion of the shell, the composite material covering at least a portion of the working portion of the substrate.

42. The wear part of claim 41 wherein the working portion of the substrate includes a plurality of surfaces facing in different directions that are each at least partially covered by the composite material.

43. The wear part of claim 42 wherein the composite material is a continuous and uninterrupted coating on the working portion.

44. The wear part of claim 41 wherein the composite material is a continuous and uninterrupted coating on the working portion.

45. The wear part of claim 41 wherein the shell is formed of sheet metal.

46. The wear part of claim 45 wherein the shell substantially surrounds the substrate.

47. The wear part of claim 46 wherein the substrate includes a first surface over which the composite material is received and a second surface adjacent the first surface to which the shell is directly secured, and wherein the first surface is recessed relative to the second surface such that the composite material is generally flush with the second surface.

48. The wear part of claim 41 wherein the shell substantially surrounds the substrate.

49. The wear part of claim 41 wherein the substrate includes a first surface over which the composite material is received and a second surface adjacent the first surface to which the shell is directly secured, and wherein the first surface is recessed relative to the second surface such that the composite material is generally flush with the second surface.

50. The wear part of claim 41 wherein the base portion of the substrate includes a cavity for mounting the substrate on the earth engaging equipment.

51. The wear part of claim 50 wherein the working portion includes a narrowing bit to facilitate digging.

52. The wear part of claim 51 wherein the working portion of the substrate includes a front end that faces in the direction of movement of the wear part relative to the earthen material during operation of the earth engaging equipment, and the composite material and the shell overlie and cover the front end.

53. The wear part of claim 41 wherein the working portion of the substrate includes a front end that faces in the direction of movement of the wear part relative to the earthen material during operation of the earth engaging equipment, and the composite material and the shell overlie and cover the front end.

* * * * *